US012605930B2

(12) United States Patent
Kobayashi

(10) Patent No.: US 12,605,930 B2
(45) Date of Patent: Apr. 21, 2026

(54) HEAD CHIP AND LIQUID EJECTING HEAD

(71) Applicant: SEIKO EPSON CORPORATION, Tokyo (JP)

(72) Inventor: Haruki Kobayashi, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 193 days.

(21) Appl. No.: 18/587,061

(22) Filed: Feb. 26, 2024

(65) Prior Publication Data

US 2024/0286406 A1 Aug. 29, 2024

(30) Foreign Application Priority Data

Feb. 27, 2023 (JP) ................................ 2023-028648

(51) Int. Cl.
*B41J 2/14* (2006.01)

(52) U.S. Cl.
CPC .. *B41J 2/14233* (2013.01); *B41J 2002/14491* (2013.01)

(58) Field of Classification Search
CPC .................... B41J 2/14072; B41J 2002/14491
See application file for complete search history.

(56) References Cited

U.S. PATENT DOCUMENTS

| | | | | |
|---|---|---|---|---|
| 2016/0009087 A1* | 1/2016 | Okui | .................... | B41J 2/14072 29/830 |
| 2019/0263120 A1* | 8/2019 | Tomimatsu | .......... | B41J 2/14233 |
| 2020/0198332 A1* | 6/2020 | Hasegawa | ............ | B41J 2/04593 |
| 2023/0014022 A1* | 1/2023 | Yoshida | ............... | B41J 2/14209 |

FOREIGN PATENT DOCUMENTS

JP 2016-020031 A 2/2016

* cited by examiner

*Primary Examiner* — Scott A Richmond
(74) *Attorney, Agent, or Firm* — Harness, Dickey & Pierce, P.L.C.

(57) ABSTRACT

A liquid ejecting head includes a first head chip that includes a first wiring member having flexibility, and a relay substrate that includes a first terminal group α and is electrically coupled to the first wiring member. The first wiring member includes a first terminal group A that is adhered or bonded to the first terminal group α of the relay substrate, and a first terminal group B that is not adhered or bonded to the relay substrate, and the first terminal group A is compatible with the first terminal group B.

18 Claims, 54 Drawing Sheets

HEAD CHIP AND LIQUID EJECTING HEAD

The present application is based on, and claims priority from JP Application Serial Number 2023-028648, filed Feb. 27, 2023, the disclosure of which is hereby incorporated by reference herein in its entirety.

BACKGROUND

1. Technical Field

The present disclosure relates to a head chip that ejects a liquid from a nozzle, a liquid ejecting head having the head chip, and more particularly, to a head chip and an ink jet recording head that eject an ink as a liquid.

2. Related Art

There is disclosed a liquid ejecting head including a plurality of head chips that eject a liquid, a wiring member bonded to each of the plurality of head chips, and a relay substrate to which end portions of a plurality of wiring members are bonded (for example, see JP-A-2016-20031).

In JP-A-2016-20031, since the relay substrate and the wiring member are bonded to each other, an electrical coupling portion between the relay substrate and the wiring member can be reduced. However, since the relay substrate and the wiring member are bonded to each other, it is not easy to release the electrical coupling between the head chip and the relay substrate. Therefore, for example, when at least one of the plurality of head chips provided in the liquid ejecting head failed, it is necessary to replace the liquid ejecting head itself, and the non-failed head chips, the relay substrate, and the like are made useless. In addition, for example, when the relay substrate failed, a plurality of non-failed head chips are discarded. It is conceivable to forcibly release bonding between a terminal of the relay substrate and a terminal of the wiring member. However, in this case, the terminal of the relay substrate and the terminal of the wiring member are damaged, and it is not possible to reuse both the head chip and the relay substrate. Such a problem is not limited to a configuration in which one liquid ejecting head includes a plurality of head chips, and similarly exists even in a configuration in which one liquid ejecting head includes one head chip. Further, such a problem similarly exists even in a configuration in which the relay substrate and the wiring member are adhered to each other by a conductive adhesive.

SUMMARY

According to an aspect of the present disclosure, there is provided a liquid ejecting head including a first head chip that includes a first wiring member having flexibility and ejects a liquid, and a relay substrate that includes a first terminal group α and is electrically coupled to the first wiring member. The first wiring member includes a first terminal group A that is adhered or bonded to the first terminal group α of the relay substrate, and a first terminal group B that is not adhered or bonded to the relay substrate. The first terminal group A is compatible with the first terminal group B.

According to another aspect of the present disclosure, there is provided a liquid ejecting head including a first head chip that includes a first wiring member having flexibility and ejects a liquid, and a relay substrate electrically coupled to the first wiring member. The relay substrate includes a first terminal group α that is adhered or bonded to the first wiring member, and a first terminal group β which is not adhered or bonded to the first wiring member. The first terminal group α is compatible with the first terminal group β.

According to still another aspect of the present disclosure, there is provided a head chip including a nozzle plate that includes a plurality of nozzles ejecting a liquid, a common wiring group, and a plurality of terminal groups that are wired in common to the common wiring group and are compatible with each other.

DESCRIPTION OF EMBODIMENTS

Figure 1:
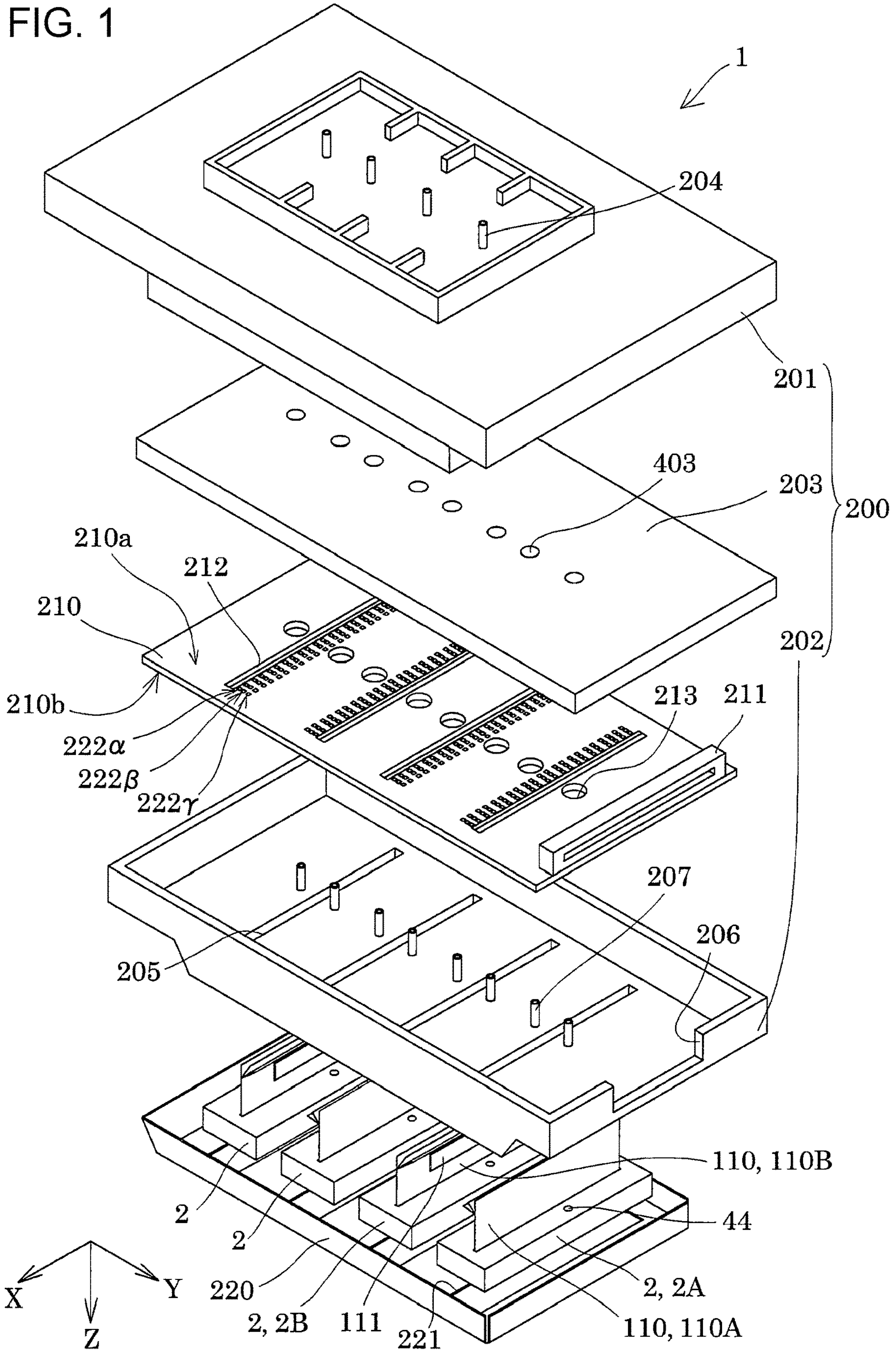
FIG. 1 is an exploded perspective view of a liquid ejecting head according to a first embodiment.

Hereinafter, the present disclosure will be described in detail based on embodiments. However, the following description illustrates an aspect of the present disclosure, and can be freely changed within the scope of the present disclosure. Those having the same reference signs in each of the drawings indicate the same members, and the description thereof is omitted as appropriate. In each of the drawings, X, Y, and Z represent three spatial axes orthogonal to each other. In the present specification, directions along these axes are set as an X-direction, a Y-direction, and a Z-direction. A direction where the arrow in each of the drawings is the positive (+) direction, and a direction opposite to the arrow is the negative (−) direction. In addition, the directions of three spatial axes that do not limit the positive direction and the negative direction will be described as the X-axis direction, the Y-axis direction, and the Z-axis direction.

Further, in the present disclosure, the phrase that "an A point and a B point are wired" means that the A point and the B point are directly joined to each other or indirectly joined to each other via an electric wire (also called a wiring) made of an electrical conductor having an electrical conductivity of $10^6$ S/m or more at 20° C. regardless of whether or not a state where a current may flow between the A point and the B point, that is, from the A point to the B point, or from the B point to the A point. Here, the "state where a current may flow" means that, when electric power is supplied to a connector of a liquid ejecting head, a current flows between an A point and a B point in the liquid ejecting head, that is, a state where energization is performed between the A point and the B point.

Further, in the present disclosure, the phrase that "an A point and a B point are electrically coupled" means a state where the A point and the B point are directly coupled or the A point and the B point are coupled via a wiring, and thus a current may flow between the A point and the B point. In other words, this phrase means that the A point and the B point are conductive.

Further, in the present disclosure, the phrase that "an A point and a B point are not electrically coupled" means a state where, even when electric power is supplied to the connector of the liquid ejecting head, no current flows between the point A and the point B. That is, this phrase includes not only a case where an electric wire path including the A point and an electric wire path including the B point are in an insulating state, but also a case where the point A and the point B are wired, but a current does not flow between the point A and the B point. The latter case means, for example, a state where one end of the electric wire path including at least one of the A point and the B point is an open end, in other words, not directly coupled to any electrical conductor, and thus no current flows between the point A and the point B.

First Embodiment

Figure 2:
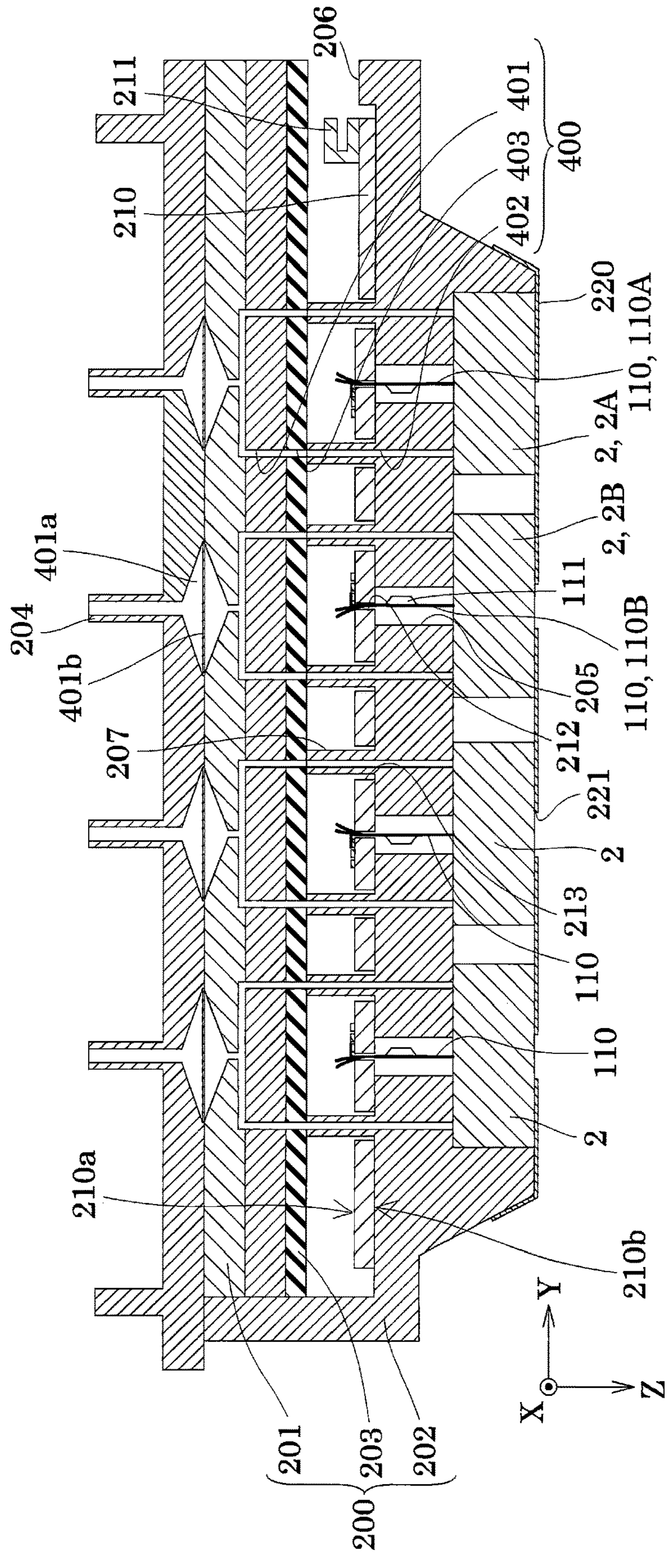
FIG. 2 is a cross-sectional view of the liquid ejecting head according to the first embodiment.
Figure 3:
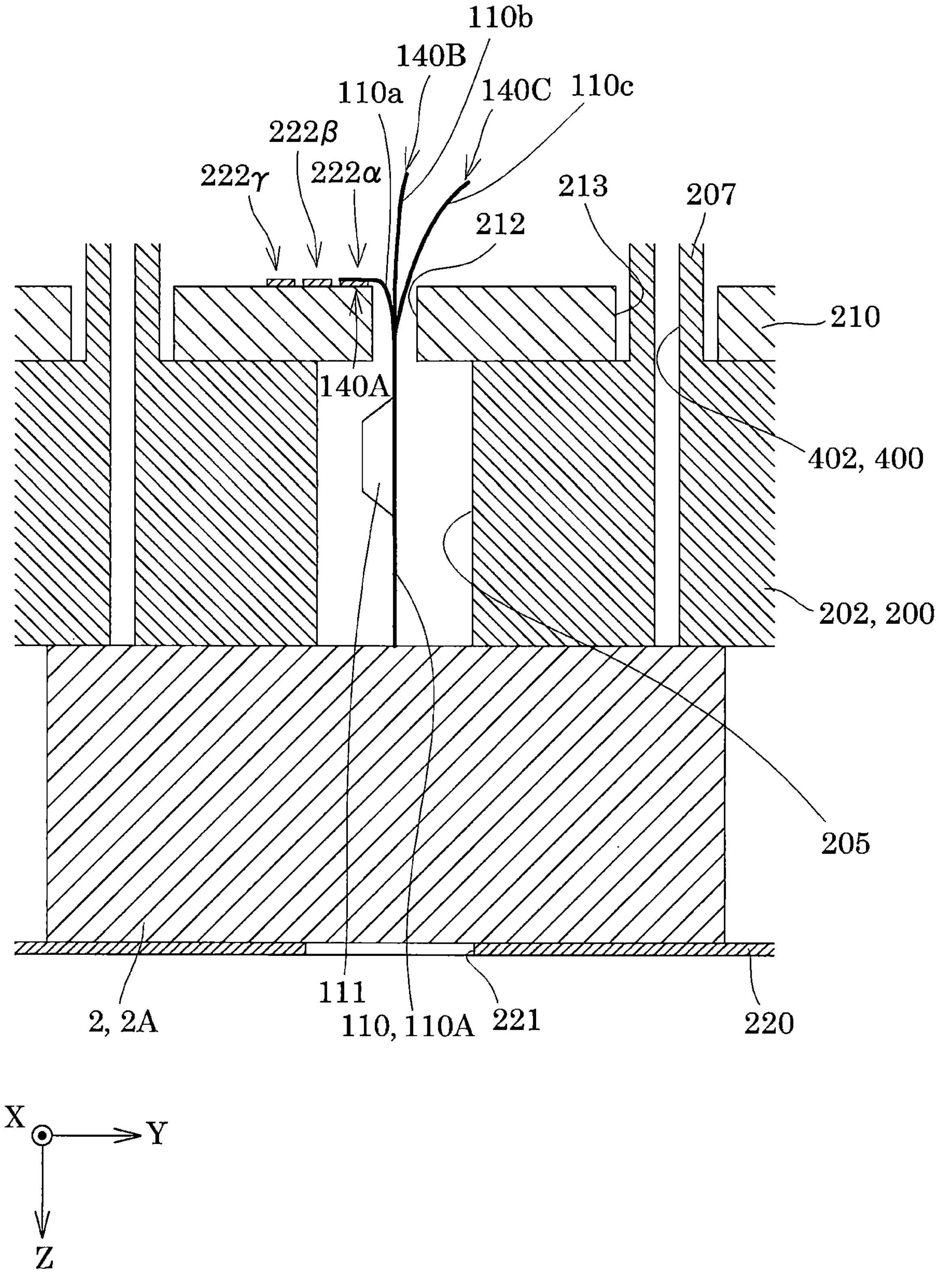
FIG. 3 is an enlarged cross-sectional view of a main portion of the liquid ejecting head according to the first embodiment.

FIG. 1 is an exploded perspective view of a liquid ejecting head 1 according to a first embodiment of the present disclosure. FIG. 2 is a cross-sectional view of a main portion of the liquid ejecting head 1. FIG. 3 is an enlarged cross-sectional view of the main portion of the liquid ejecting head 1.

As illustrated in FIGS. 1 to 3, the liquid ejecting head 1 includes a head chip 2, a flow path member 200 having a flow path 400, a relay substrate 210, and a cover head 220.

The flow path member 200 includes a first flow path member 201 provided with a first flow path 401, a second flow path member 202 provided with a second flow path 402, and a sealing member 203 that couples the first flow path 401 and the second flow path 402 to each other in a liquid-tight state. The first flow path member 201, the sealing member 203, and the second flow path member 202 are stacked in the +Z direction in this order.

In the present embodiment, the first flow path member 201 is configured by stacking three members in the Z-axis direction. The first flow path member 201 includes a coupling portion 204 coupled to a liquid storage section in which an ink that is a liquid is stored. In the present embodiment, it is assumed that the coupling portion 204 protrudes in a tubular shape in the −Z direction from the surface of the first flow path member 201 in the −Z direction. The liquid storage section may be directly coupled to the coupling portion 204 or may be coupled via a supply pipe or the like such as a tube. The first flow path 401 to which the ink from the liquid storage section is supplied is provided inside such a coupling portion 204. The first flow path 401 includes a flow path extending in the Z-axis direction, a flow path extending along a stacking interface of the stacked members, and the like. In addition, a widened liquid reservoir 401*a* having an inner diameter wider than other regions is provided in the middle of the first flow path 401. A filter 401*b* that captures foreign matters such as dust and air bubbles contained in the ink is provided in the liquid reservoir 401*a*. In addition, in the present embodiment, one first flow path member 201 includes four coupling portions 204 and four independent first flow paths 401. Each first flow path 401 is branched into two paths on the downstream of the liquid reservoir 401*a*.

The second flow path member 202 includes a second flow path 402 communicating with each first flow path 401. The first flow path 401 and the second flow path 402 are liquid-tightly coupled to each other via the sealing member 203. For the sealing member 203, a material which has liquid resistance to liquids such as ink used in the liquid ejecting head 1 and is elastically deformable, for example, a rubber, elastomer or the like may be used. Such a sealing member 203 is provided with a coupling flow path 403 penetrating in the Z-axis direction. The first flow path 401 and the second flow path 402 communicate with each other via the coupling flow path 403. That is, the flow path 400 of the flow path member 200 includes the first flow path 401, the second flow path 402, and the coupling flow path 403.

The head chip 2 is held on the surface of the second flow path member 202 facing the +Z direction. The liquid ejecting head 1 in the present embodiment holds a plurality of head chips, and in the present embodiment, the liquid ejecting head 1 holds four head chips 2 as an example. The number of head chips 2 held by the liquid ejecting head 1 is not particularly limited thereto, and may be one or plural (two or more). In the present embodiment, the four head chips 2 are arranged side by side in the Y-axis direction to be located at the same position in the X-axis direction. The arrangement of the plurality of head chips 2 is not particularly limited thereto.

The second flow path 402 communicates with each inlet 44 of such a head chip 2. In the present embodiment, at least one of the four head chips 2 is referred to as a head chip 2A, and at least one other than the head chip 2A is referred to as a head chip 2B. In the present embodiment, the head chip 2 located at the end in the +Y direction is referred to as a head chip 2A, and the head chip 2 that is located in the −Y direction with respect to the head chip 2A and located near the head chip 2A is referred to as a head chip 2B. When the head chip 2A and the head chip 2B are not distinguished from each other, the head chip 2A and the head chip 2B are referred to as the head chip 2 below.

In addition, the second flow path member 202 is provided with a wiring insertion hole 205 for inserting a wiring member 110 of each head chip 2. In the present embodiment, one wiring insertion hole 205 is provided for each head chip 2. That is, in the present embodiment, four wiring insertion holes 205 in total are provided for the four head chips 2. The wiring member 110 of the head chip 2 is flowed out to the surface side of the second flow path member 202 facing the −Z direction via the wiring insertion hole 205.

In the Z-axis direction, the relay substrate 210 to which the wiring members 110 of the plurality of head chips 2 are commonly coupled is provided between the second flow path member 202 and the sealing member 203. The relay substrate 210 is formed of a hard rigid substrate with no flexibility. Wirings, electronic components, and the like (not illustrated) are mounted on the relay substrate 210. In the present embodiment, as an electronic component, a connector 211 to which an external wiring (not illustrated) provided outside the liquid ejecting head 1 is coupled is illustrated. A printing signal for controlling the head chip 2 is input to the relay substrate 210 from the external wiring via the connector 211, and is supplied from the relay substrate 210 to each head chip 2. An external wiring opening portion 206 for inserting an external wiring coupled to the connector 211 is provided on the side wall of the flow path member 200, that faces the connector 211. The external wiring is coupled to the connector 211 of the relay substrate 210, which is provided inside the flow path member 200, via the external wiring opening portion 206.

The relay substrate 210 is provided with a wiring insertion hole 212 for flowing out the wiring member 110 of the head chip 2 to the surface side facing the −Z direction. One wiring insertion hole 212 is provided for each head chip 2, and four wiring insertion holes 212 in total are provided.

In addition, the relay substrate 210 is provided with a protrusion portion insertion hole 213 provided to penetrate the relay substrate 210 in the Z-axis direction. A protrusion portion 207 in which the second flow path 402 is provided is provided on the surface of the second flow path member 202 facing the −Z direction to protrude in the −Z direction. The protrusion portion 207 is inserted in the −Z direction side of the relay substrate 210 via the protrusion portion insertion hole 213, and thus is coupled to the coupling flow path 403.

The cover head 220 is fixed to the surface of the flow path member 200 facing the +Z direction. In the present embodiment, the cover head 220 has a size enough for covering four head chips 2. The cover head 220 is provided with an exposure opening portion 221 that exposes a nozzle 21 of the head chip 2 in the +Z direction independently for each head chip 2. An ink is ejected from the nozzle 21 exposed from the exposure opening portion 221 in the +Z direction.

Figure 4:
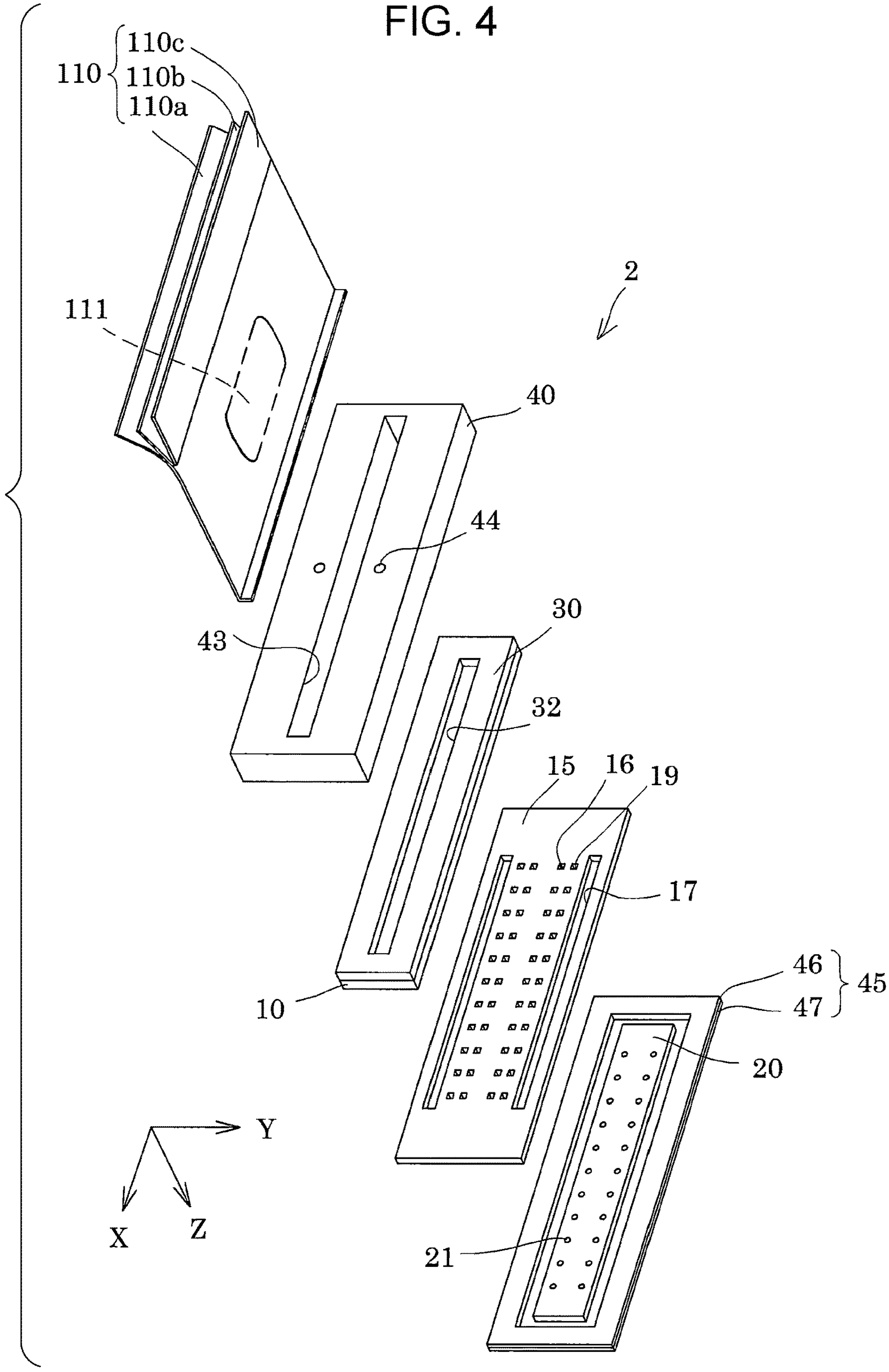
FIG. 4 is an exploded perspective view of a head chip according to the first embodiment.
Figure 5:
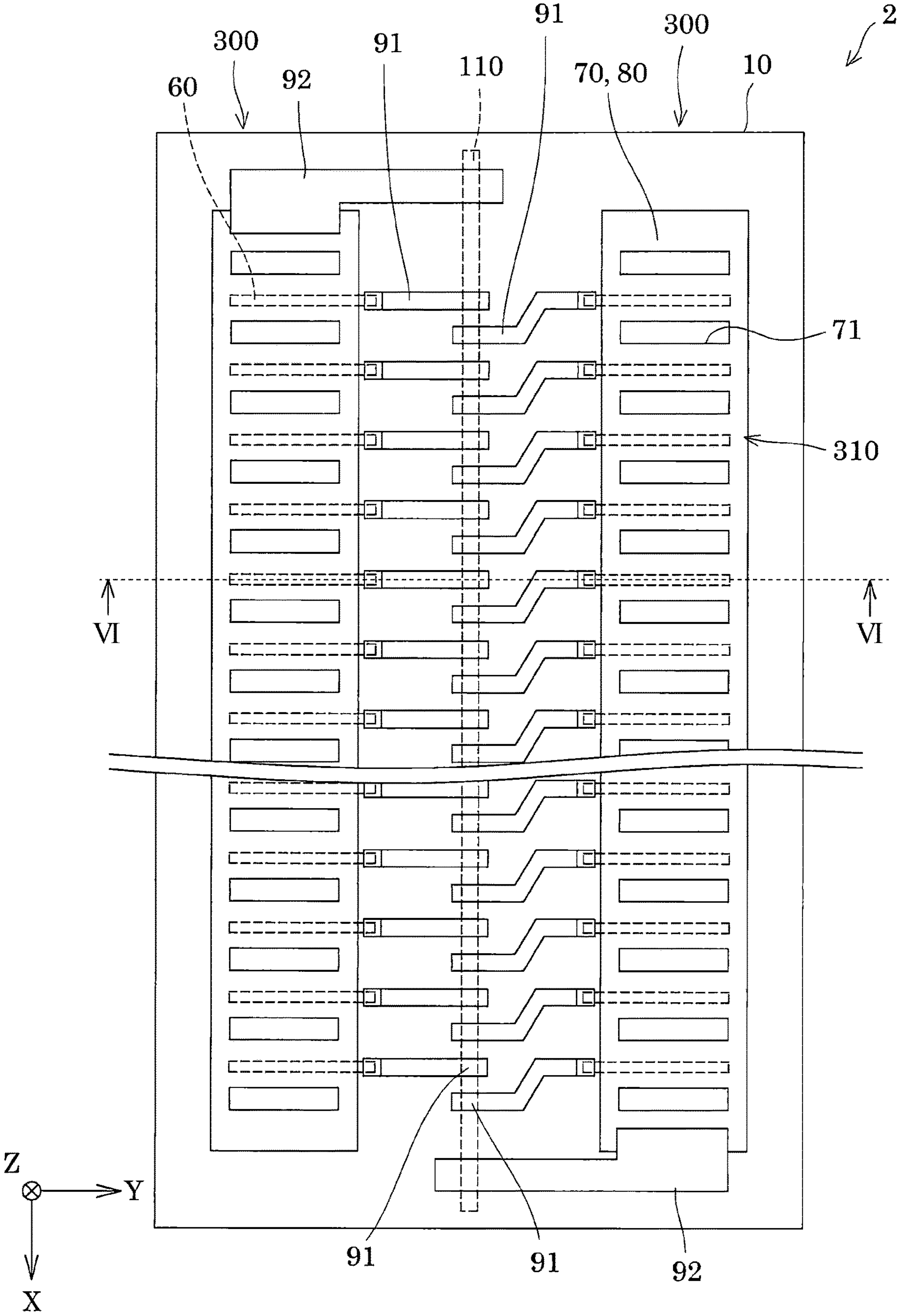
FIG. 5 is a plan view of a flow path forming substrate for the head chip according to the first embodiment.
Figure 6:
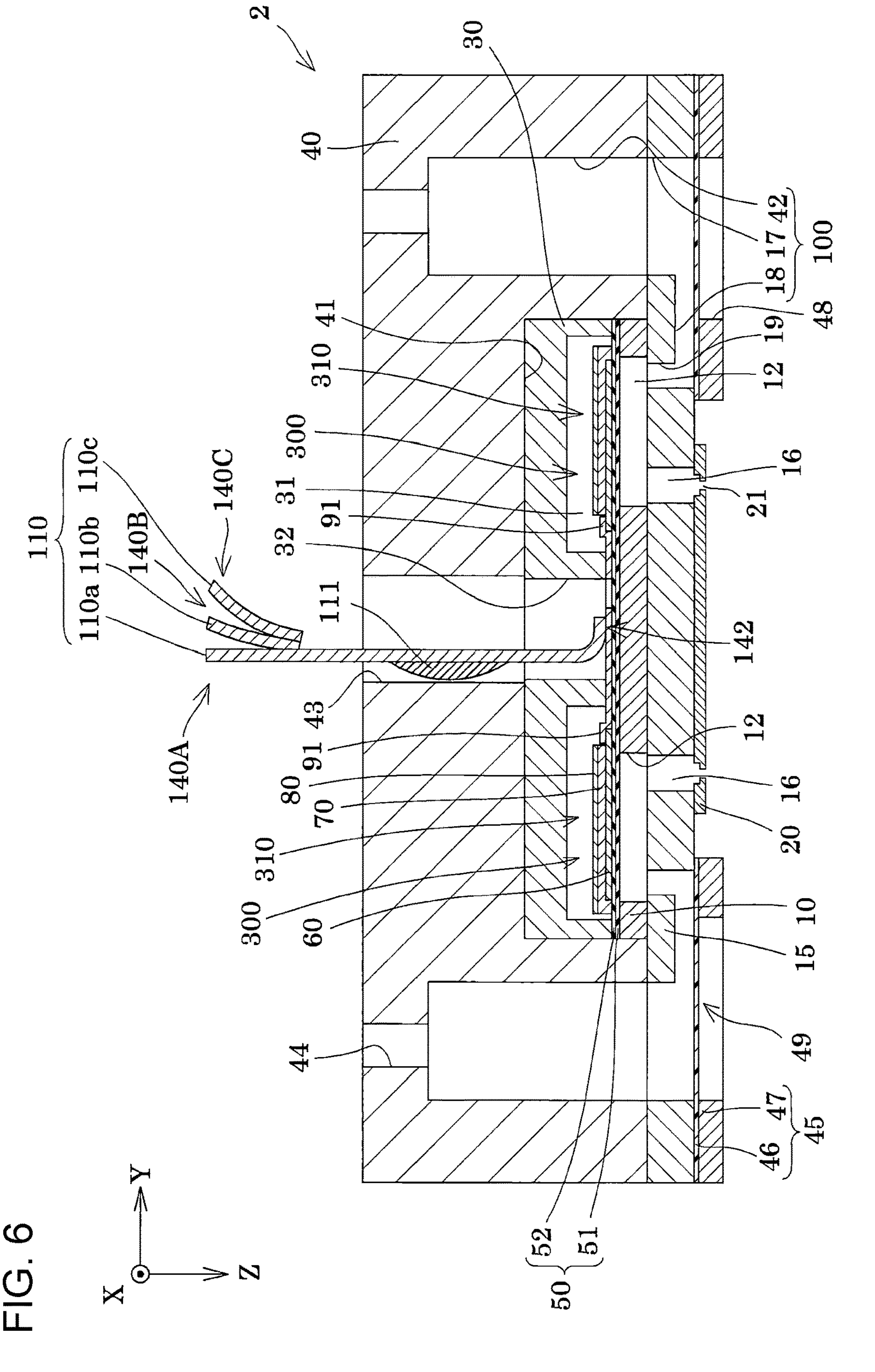
FIG. 6 is a cross-sectional view of the head chip according to the first embodiment.

Here, the head chip 2 in the present embodiment will be described with reference to FIGS. 4 to 6. FIG. 4 is an exploded perspective view of the head chip 2 according to the first embodiment of the present disclosure. FIG. 5 is a plan view of a flow path forming substrate 10. FIG. 6 is a cross-sectional view of the head chip 2 taken along line VI-VI in FIG. 5. Each direction of the head chip 2 will be described based on the directions when mounted on the liquid ejecting head 1, that is, the X-axis direction, the Y-axis direction, and the Z-axis direction. However, unlike FIGS. 2 and 3, FIGS. 4 and 6 illustrate a state before a first flexible portion **110*a* of the wiring member 110 is bent, that is, a state before the first flexible portion 110*a* and the relay substrate 210** are coupled to each other.

As illustrated in FIGS. 4 to 6, the head chip 2 in the present embodiment includes one nozzle plate 20 in which a plurality of nozzles 21 are formed, the flow path forming substrate 10, a communication plate 15, a protective substrate 30, a case member 40, a piezoelectric actuator 300, and the wiring member 110.

The flow path forming substrate 10 is made of, for example, a silicon substrate, a glass substrate, an SOI substrate, or various ceramic substrates. On the flow path forming substrate 10, a plurality of pressure chambers 12 are disposed side by side along the X-axis direction. The plurality of pressure chambers 12 are disposed on a straight line along the X-axis direction such that positions in the Y-axis direction are the same. The two pressure chambers 12 adjacent to each other in the X-axis direction are partitioned by partition walls which are not illustrated. In addition, in the present embodiment, two rows of pressure chambers 12 in which the pressure chambers 12 are arranged side by side in the X-axis direction are provided in the Y-axis direction. The disposition of the pressure chambers 12 is not particularly limited thereto. For example, the plurality of pressure chambers 12 may be disposed along the X-axis direction in a staggered manner.

The communication plate 15 and the nozzle plate 20 are sequentially stacked on the surface of the flow path forming substrate 10 facing the +Z direction. A diaphragm 50 and the piezoelectric actuator 300 are sequentially stacked on the surface of the flow path forming substrate 10 facing the −Z direction.

The communication plate 15 is formed of a plate-shaped member bonded to the surface of the flow path forming substrate 10 facing the +Z direction. The communication plate 15 is provided with a nozzle communication passage 16 through which the pressure chamber 12 and the nozzle 21 communicate with each other. The communication plate 15 is provided with a first manifold portion 17 and a second manifold portion 18 that form a portion of a manifold 100 serving as a common liquid chamber with which the plurality of pressure chambers 12 commonly communicate. The first manifold portion 17 is provided to penetrate the communication plate 15 in the Z-axis direction. Further, the second manifold portion 18 is provided to open on the surface on the side facing the +Z direction without penetrating the communication plate 15 in the Z-axis direction. The communication plate 15 is provided with a supply communication passage 19 that communicates with one end portion of the pressure chamber 12 in the Y-axis direction, independently for each pressure chamber 12. The supply communication passage 19 communicates between the second manifold portion 18 and the pressure chambers 12 to supply the ink in the manifold 100 to the pressure chambers 12. As such a communication plate 15, a silicon substrate, a glass substrate, an SOI substrate, various ceramic substrates, a metal substrate such as a stainless steel substrate, or the like can be used.

The nozzle plate 20 is bonded to the side of the communication plate 15 opposite to the flow path forming substrate 10, that is, to the surface facing the +Z direction. A plurality of nozzles 21 communicating with the respective pressure chambers 12 via nozzle communication passages 16 are formed in the nozzle plate 20. In the present embodiment, the plurality of nozzles 21 are disposed to be arranged in a row along the X-axis direction. In the present embodiment, two nozzle rows, in which the nozzles 21 are arranged side by side along the X-axis direction, are provided at a distance in the Y-axis direction. In the two nozzle rows arranged side by side in the Y-axis direction, the nozzles 21 forming each row may be disposed in a state of deviating from each other by half a pitch in the X-axis direction. As such a nozzle plate 20, a silicon substrate, a glass substrate, an SOI substrate, various ceramic substrates, a metal substrate such as a stainless steel substrate, an organic substance such as a polyimide resin, or the like can be used.

In the present embodiment, the diaphragm 50 includes an elastic film 51 that is provided on the flow path forming substrate 10 side and is formed of silicon oxide, and an insulator film 52 that is provided on the surface of the elastic film 51 facing the −Z direction and is formed of zirconium oxide. The diaphragm 50 may be formed of only the elastic film 51 or only the insulator film 52, and may have a configuration in which other films are provided in addition to the elastic film 51 and the insulator film 52.

The piezoelectric actuator 300 includes a first electrode 60, a piezoelectric layer 70, and a second electrode 80 that are sequentially stacked on the diaphragm 50 in the −Z direction. Such a piezoelectric actuator 300 is also referred to as a piezoelectric element, and refers to a portion including the first electrode 60, the piezoelectric layer 70, and the second electrode 80. In addition, a portion where piezoelectric strain occurs in the piezoelectric layer 70 when a voltage is applied between the first electrode 60 and the second electrode 80 is referred to as an active portion 310. On the other hand, a portion where piezoelectric strain does not occur in the piezoelectric layer 70 is referred to as an inactive portion. That is, the active portion 310 refers to a portion where the piezoelectric layer 70 is interposed between the first electrode 60 and the second electrode 80. In the present embodiment, the active portion 310 is formed for each pressure chamber 12. That is, a plurality of active portions 310 are formed at the piezoelectric actuator 300. The plurality of active portions 310 serve as "driving elements" that cause pressure changes in the ink inside the pressure chamber 12. In general, any one of the electrodes of the active portion 310 is configured as an independent individual electrode for each active portion 310, and the other electrode is configured as a common electrode common to the plurality of active portions 310. In the present embodiment, the first electrode 60 is configured as an individual electrode, and the second electrode 80 is configured as a common electrode. The first electrode 60 may form a common electrode, and the second electrode 80 may form an individual electrode.

Here, as illustrated in FIGS. 5 and 6, the first electrode 60 forms an individual electrode that is separated for each pressure chamber 12 and is independent for each active portion 310. As illustrated in FIGS. 5 and 6, the piezoelectric layer 70 is continuously provided over the X-axis direction with a predetermined width in the Y-axis direction. As illustrated in FIG. 5, the piezoelectric layer 70 is formed with a plurality of recess portions 71 at positions that do not overlap the first electrode 60. The recess portions 71 may not be provided. Such a piezoelectric layer 70 is configured, for example, by using a piezoelectric material made of a perovskite structure composite oxide represented by the general formula $ABO_3$. As illustrated in FIGS. 5 and 6, the second electrode 80 is continuously provided on the −Z direction side opposite to the first electrode 60 of the piezoelectric layer 70, and constitutes a common electrode common to the plurality of active portions 310. The second electrode 80 is continuously provided in the X-axis direction so that the Y-axis direction has a predetermined width.

In addition, an individual lead electrode 91, which is a lead-out wiring, is drawn out from the first electrode 60. A common lead electrode 92, which is a lead-out wiring, is drawn out from the second electrode 80. The wiring member 110 formed of a flexible substrate having flexibility as described above is coupled to the end portions of the individual lead electrode 91 and the common lead electrode 92 opposite to the end portions thereof coupled to the piezoelectric actuator 300. A drive signal selection circuit 111 is mounted on the wiring member 110. The drive signal selection circuit 111 has a plurality of switching elements for selecting whether or not to supply a drive signal for driving each active portion 310 to each active portion 310. That is, the wiring member 110 in the present embodiment is a chip-on-film (COF). The drive signal selection circuit 111 may not be provided in the wiring member 110. That is, the wiring member 110 may be a flexible flat cable (FFC), a flexible printed circuits (FPC), and the like. The wiring member 110 provided in the head chip 2A is referred to as a wiring member 110A, and the wiring member 110 provided in the head chip 2B is referred to as a wiring member 110B. When the wiring member 110A and the wiring member 110B are not distinguished from each other, the wiring member 110A and the wiring member 110B are referred to as the wiring member 110 below.

As illustrated in FIGS. 4 and 6, the protective substrate 30 having approximately the same size as the flow path forming substrate 10 is bonded to the surface of the flow path forming substrate 10 facing the −Z direction. The protective substrate 30 includes an accommodation portion 31 which is a space for protecting the piezoelectric actuator 300. The accommodation portion 31 is independently provided for each row of the piezoelectric actuators 300 arranged in the X-axis direction. Two accommodation portions 31 are formed to be arranged in the Y-axis direction. A through-hole 32 penetrating in the Z-axis direction is provided between the two accommodation portions 31 disposed to be arranged in the Y-axis direction, in the protective substrate 30. The end portions of the individual lead electrode 91 and the common lead electrode 92 drawn from the electrodes of the piezoelectric actuator 300 are extended to be exposed in the through-hole 32. The individual lead electrode 91 and the common lead electrode 92 are electrically coupled to the wiring member 110 in the through-hole 32. As such a protective substrate 30, for example, a substrate made of a silicon substrate, a glass substrate, an SOI substrate, and various ceramic substrates is used similarly to the flow path forming substrate 10.

As illustrated in FIG. 6, the case member 40 is fixed on the protective substrate 30 to define, together with the flow path forming substrate 10, the manifold 100 communicating with the plurality of pressure chambers 12. The case member 40 has substantially the same shape as the communication plate 15 described above in plan view, and is bonded to the protective substrate 30 and also bonded to the communication plate 15 described above. Such a case member 40 has a recessed portion 41 having a depth for accommodating the flow path forming substrate 10 and the protective substrate 30 on the protective substrate 30 side. The case member 40 is provided with a third manifold portion 42 communicating with the first manifold portion 17 of the communication plate 15. The first manifold portion 17 and the second manifold portion 18 provided in the communication plate 15 and the third manifold portion 42 provided in the case member 40 configure the manifold 100 of the present embodiment. The manifold 100 is provided for each row of the pressure chambers 12, that is, two manifolds 100 in total are provided. Each manifold 100 is continuously provided in the X-axis direction in which the pressure chambers 12 are arranged side by side, and the supply communication passages 19 that communicate each of the pressure chambers 12 and the manifold 100 are arranged side by side in the X-axis direction. The case member 40 is provided with an inlet 44 that communicates with the manifolds 100 to supply an ink to each of the manifolds 100. In addition, the case member 40 is provided with a coupling port 43 through which the wiring member 110 is inserted to communicate with the through-hole 32 of the protective substrate 30. The wiring member 110 is flowed out to the surface side of the liquid ejecting head 1 facing the −Z direction, via the coupling port 43. As the case member 40, a metal material, a resin material, or the like can be used.

A compliance substrate 45 is provided on the surface of the communication plate 15 on the +Z direction side where the first manifold portion 17 and the second manifold portion 18 are open. The compliance substrate 45 seals the openings of the first manifold portion 17 and the second manifold portion 18 on the +Z direction side. Such a compliance substrate 45 includes a sealing film 46 made of a flexible thin film and a fixation substrate 47 made of a hard material such as metal in the present embodiment. Since a region of the fixation substrate 47 facing the manifold 100 is an opening 48 that is completely removed in the thickness direction, one surface of the manifold 100 is a compliance portion 49 which is a flexible portion sealed only by the flexible sealing film 46. The head chip 2 is fixed to the cover head 220 by fixing the surface of the fixation substrate 47 facing the +Z direction to the surface of the cover head 220 facing the −Z direction.

Figure 7:
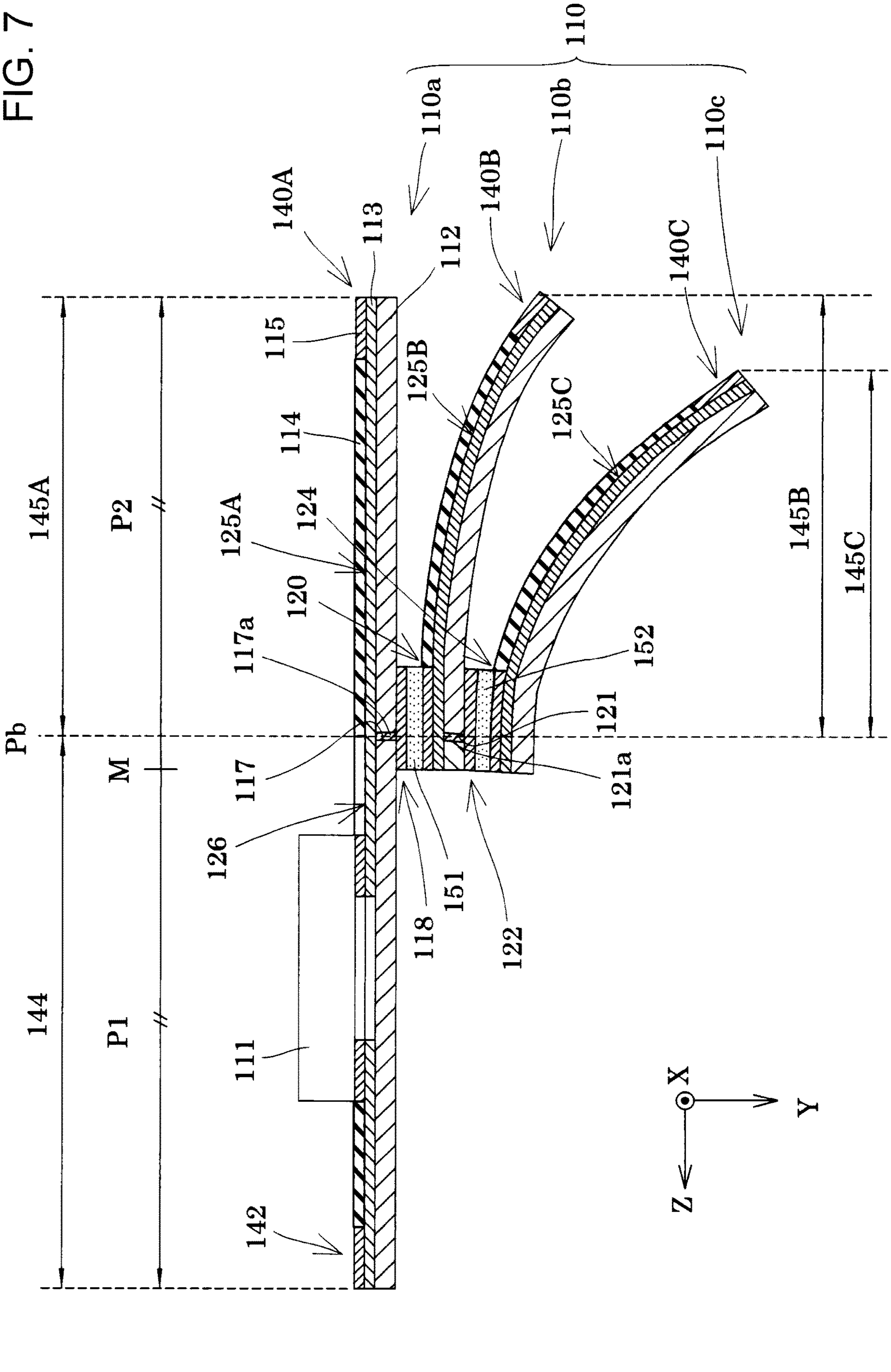
FIG. 7 is a cross-sectional view of a wiring member according to the first embodiment.
Figure 8:
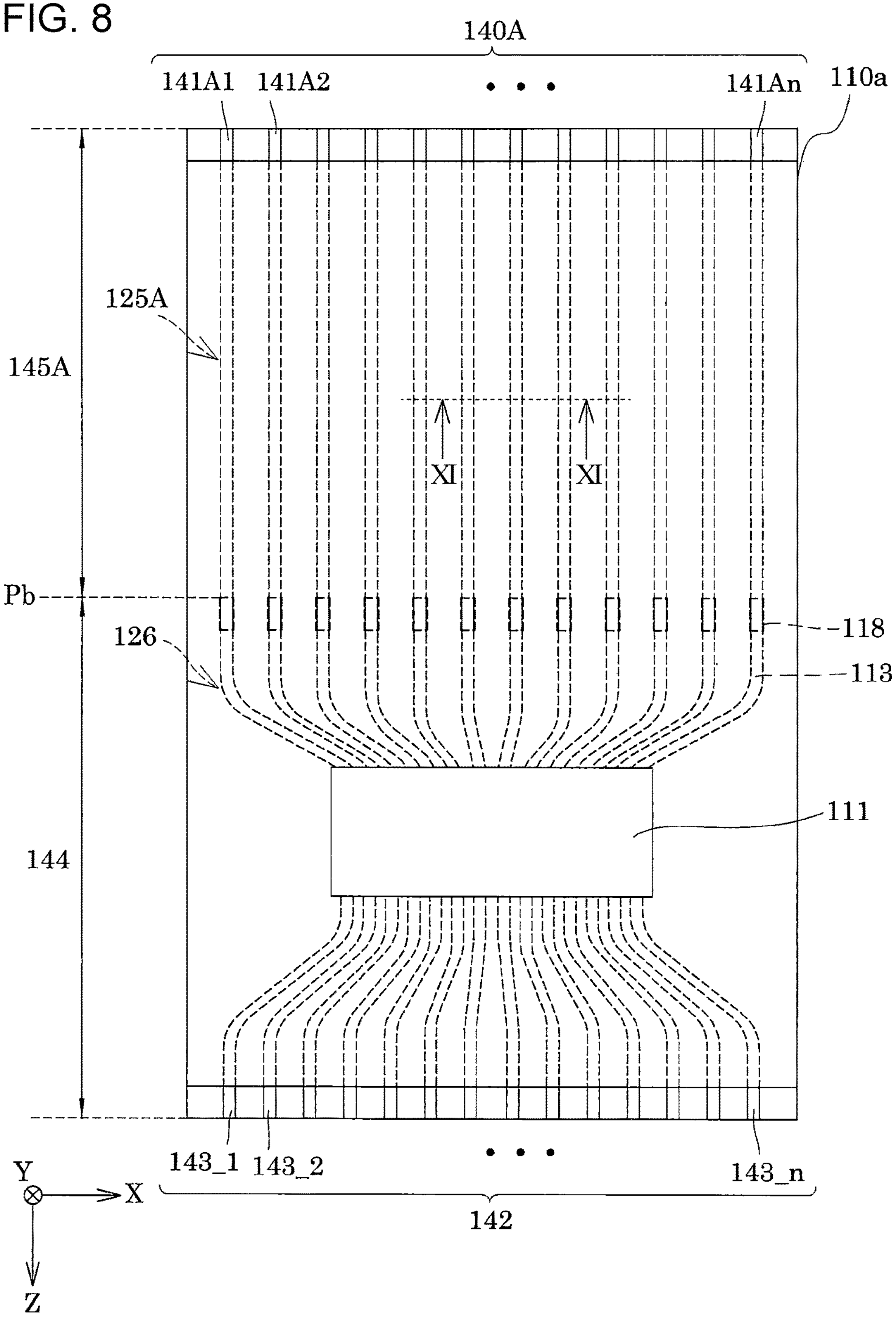
FIG. 8 is a plan view of a first flexible portion according to the first embodiment.
Figure 9:
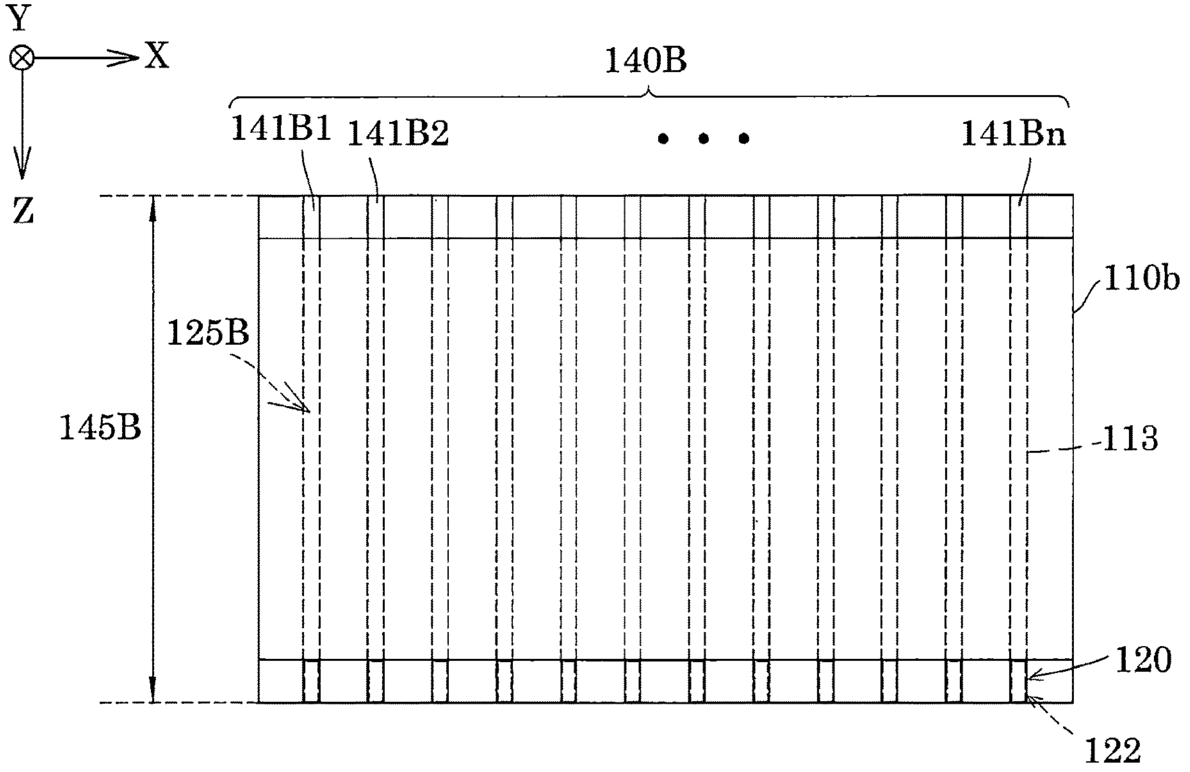
FIG. 9 is a plan view of a second flexible portion according to the first embodiment.
Figure 10:
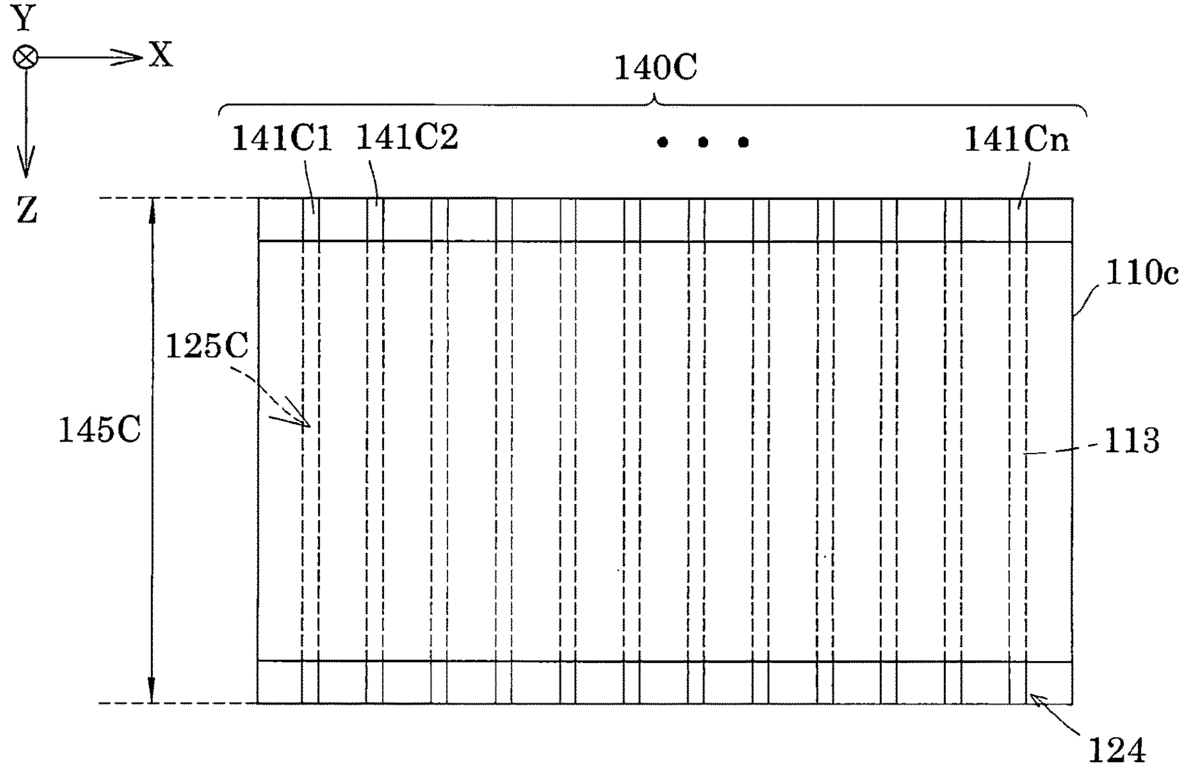
FIG. 10 is a plan view of a third flexible portion according to the first embodiment.
Figure 11:
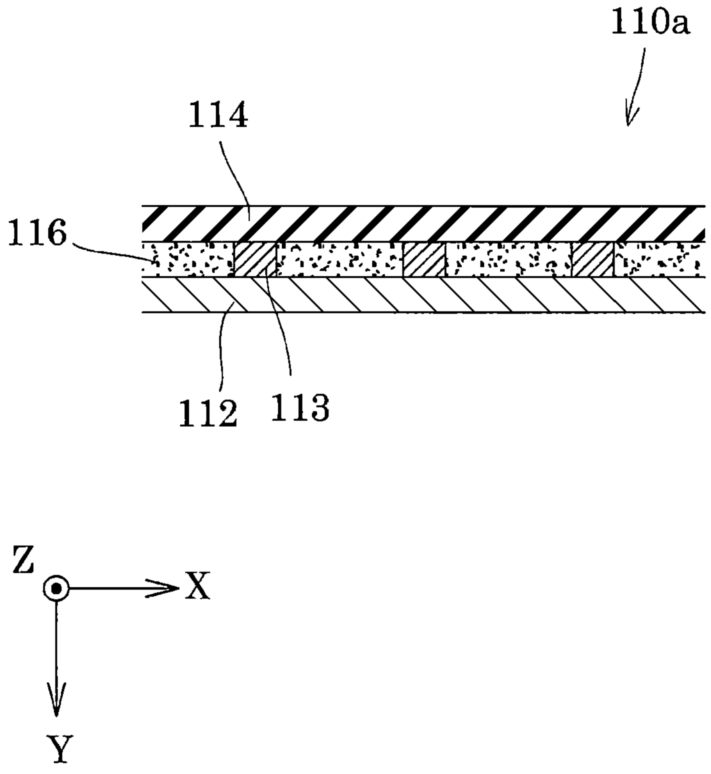
FIG. 11 is a cross-sectional view of the first flexible portion according to the first embodiment.

The wiring member 110 provided in such a head chip 2 will be further described with reference to FIGS. 7 to 11. FIG. 7 is a cross-sectional view of the wiring member 110. FIG. 8 is a plan view of the first flexible portion 110*a*. FIG. 9 is a plan view of a second flexible portion 110*b*. FIG. 10 is a plan view of a third flexible portion 110*c*. FIG. 11 is a cross-sectional view taken along the line XI-XI of FIG. 8. FIGS. 7 to 11 illustrate the spatial axes of X, Y, and Z based on a state before the head chip 2 is mounted on the liquid ejecting head 1, that is, the wiring member 110 illustrated in FIG. 4.

As illustrated in FIGS. 7 and 11, the basic configuration of the wiring member 110 includes a base 112, a plurality of wirings 113, and a cover 114. The base 112 is formed of a material having flexibility and an insulating property, for example, a resin material such as polyimide. The wirings 113 are formed on one surface of the base 112 in a predetermined shape by metal foils of copper (Cu), gold (Au), silver (Ag), and tin (Sn), or the like. The cover 114 has an insulating property and covers a wiring other than a terminal, which is coupled to an electronic component such as the drive signal selection circuit 111 or other wirings. The plurality of wirings 113 in the present embodiment are formed by a copper foil. The stacking direction of the base 112, the wirings 113, and the cover 114 corresponds to a "thickness direction of the wiring member 110". The terminal of the wiring 113 is provided with a conductive layer 115 formed by plating with tin (Sn), gold (Au), or the like. That is, a portion of the wiring 113 at which the conductive layer 115 is provided serves as a terminal, and an aggregate of the terminals serves as a terminal group. The cover 114 is a film-like member having an insulating property, and is adhered to the base 112 by an adhesive 116. Therefore, the wiring 113 is filled with the adhesive 116 between the base 112 and the cover 114. The adhesive 116 is an adhesive having an insulating property. The adhesive 116 may be interposed between the wiring 113 and the cover 114. The cover 114 is not limited to the film-like member, and a solder resist or the like may be used.

Although details will be described later, the wiring member 110 includes a terminal group 140A, a terminal group 140B, a terminal group 140C, an individual wiring group 125A wired to the terminal group 140A, and an individual wiring group 125B wired to the terminal group 140B, and an individual wiring group 125C wired to the terminal group 140C. When the individual wiring groups 125A to 125C are not distinguished from each other, the individual wiring groups are referred to as an individual wiring group 125. The wiring member 110 further includes a common wiring group 126 wired in common to the plurality of individual wiring groups 125A to 125C. In other words, each of the individual wiring groups 125A to 125C is an individual wiring group 125 branched from the common wiring group 126.

As illustrated in FIGS. 6 to 11, the wiring member 110 in the present embodiment includes the first flexible portion 110*a*, the second flexible portion 110*b*, and the third flexible portion 110*c*. The first flexible portion 110*a*, the second flexible portion 110*b*, and the third flexible portion 110*c* are disposed in the +Y direction in this order.

The first flexible portion 110*a* includes a drive-side coupling terminal group 142 having one end of one surface, which is coupled to the individual lead electrode 91 and the common lead electrode 92. The drive-side coupling terminal group 142 includes a plurality of terminals 143_1 to **143_*n* arranged side by side in the X-axis direction. When the plurality of terminals 143_1 to 143_*n* are not distinguished from each other, the terminals are referred to as a terminal 143**.

The first flexible portion 110*a* includes a terminal group 140A at the other end of one surface. The terminal group 140A includes a plurality of terminals 141A1 to 141An arranged side by side in the X-axis direction. When the terminals 141A1 to 141An are not distinguished from each other, the terminals are referred to as a terminal 141A. n is an integer equal to or more than 2. That is, the terminal group 140A includes n pieces of terminals.

The drive signal selection circuit 111 is mounted on the wiring 113 on one surface of the first flexible portion 110*a*. As illustrated in FIGS. 7 and 8, a portion of the common wiring group 126 is located between the drive signal selection circuit 111, and the terminal group 140A and the terminal group 140B, and the rest of the common wiring group 126 is located between the drive signal selection circuit 111 and the drive-side coupling terminal group 142. With this configuration, the manufacturing cost and the size of the wiring member 110 can be reduced as compared with the case where the drive signal selection circuit 111 is disposed in the middle of each individual wiring group 125. In the present embodiment, all of the plurality of wirings 113 forming the common wiring group 126 are coupled to the drive signal selection circuit 111, but some wirings 113 may not be coupled to the drive signal selection circuit 111.

A first branch terminal group 118 is provided on the other surface of the first flexible portion 110*a*. The first branch terminal group 118 is wired to each of the wirings 113 between the drive signal selection circuit 111 and the terminal group 140A via a through-hole 117 penetrating the base 112. The first branch terminal group 118 includes a plurality in the first branch terminals arranged side by side in the X-axis direction. A coupling wiring 117*a* is provided inside the through-hole 117. One end of the coupling wiring 117*a* is wired to the wiring 113 of the first flexible portion 110*a*, and the other end of the coupling wiring 117*a* is wired to the first branch terminal group 118. In this manner, the terminal group 140A and the first branch terminal group 118 are wired to each other.

In the present embodiment, a plurality of wirings 113 from the first branch terminal group 118 to the terminal group 140A correspond to the individual wiring group 125A. Further, a plurality of wirings 113 from the drive-side coupling terminal group 142 to the first branch terminal group 118 correspond to the common wiring group 126. Here, a portion of the wiring member 110 having the common wiring group 126, that is, a portion of the first flexible portion 110*a* from the drive-side coupling terminal group 142 to the first branch terminal group 118 is set as a body portion 144 of the wiring member 110. The body portion 144 is a portion including the drive-side coupling terminal group 142. In addition, a portion of the wiring member 110 having the individual wiring group 125A, that is, a portion of the first flexible portion 110*a* having the individual wiring group 125A is set as an end portion 145A of the wiring member 110. The end portion 145A is a portion including the terminal group 140A, and is branched from the body portion 144 at a branch position Pb.

That is, the first flexible portion 110*a* includes the body portion 144 and the end portion 145A. The common wiring group 126, the first branch terminal group 118, and the terminal group 140A of the first flexible portion 110*a* are wired by the individual wiring group 125A. In the present embodiment, a case where the first flexible portion 110*a* has a configuration in which the body portion 144 and the end portion 145A are integrally provided, that is, a configuration in which the wirings 113 forming the common wiring group 126 and the wirings 113 forming the individual wiring group 125A are continuously provided on the same layer has been described. The present disclosure is not particularly limited thereto. For example, the first flexible portion 110*a* may separate the body portion 144 and the end portion 145A from each other, and wire the common wiring group 126 and the individual wiring group 125A to each other by welding with a conductive adhesive, soldering, or brazing, or the like. The solder is, for example, an alloy containing tin as a main component, and is a material different from materials of wirings and terminals formed on the flexible substrate and the rigid substrate. Examples of lead-free solders include SnAg-based materials, SnAgCu-based materials, SnBi-based materials, SnZnBi-based materials, and SnCu-based materials. The conductive adhesive is an adhesive having conductivity by containing conductive particles (also known as fillers) of gold, silver, copper, nickel, carbon, and the like in an epoxy-based, phenol-based, acrylic-based, urethane-based adhesive, or the like.

The wiring 113 is provided on one surface of the second flexible portion 110*b*, which faces the first flexible portion 110*a* of the base 112. A first coupling terminal group 120 is provided at one end of the wiring 113 of the second flexible portion 110*b*. The first coupling terminal group 120 includes a plurality in the first coupling terminals arranged side by side in the X-axis direction. The first coupling terminal group 120 is wired to the first branch terminal group 118 of the first flexible portion 110*a*. In the present embodiment, the first coupling terminal group 120 is wired to the first branch terminal group 118 via a solder 151. The first coupling terminal group 120 and the first branch terminal group 118 may be wired to each other by not only soldering, but also welding with a conductive adhesive, brazing, or the like.

The terminal group 140B is provided at the other end of the wiring 113 of the second flexible portion 110*b*. The terminal group 140B has a plurality of terminals 141B1 to 141Bn arranged side by side in the X-axis direction. When the terminals 141B1 to 141Bn are not distinguished from each other, the terminals are referred to as the terminal 141B. That is, the wiring 113 of the first flexible portion 110*a* is wired to the terminal group 140B via the wirings 113 of the first branch terminal group 118, the first coupling terminal group 120, and the second flexible portion 110*b*. In other words, the body portion 144 of the first flexible portion 110*a* includes the common wiring group 126 wired in common to the terminal group 140A and the terminal group 140B. That is, the terminal group 140A and the terminal group 140B are indirectly joined via the wirings 113 that form the common wiring group 126.

A second branch terminal group 122 wired to the wiring 113 of the second flexible portion 110*b* via a through-hole 121 is provided on the other surface of the second flexible portion 110*b*. The second branch terminal group 122 includes a plurality of second branch terminals arranged side by side in the X-axis direction. A coupling wiring 121*a* is provided inside the through-hole 121. One end of the coupling wiring 121*a* is wired to the wiring 113 of the second flexible portion 110*b*, and the other end of the coupling wiring 121*a* is wired to the second branch terminal group 122. In this manner, the terminal group 140B and the second branch terminal group 122 are wired to each other. The second branch terminal group 122 is disposed at a position overlapping the first coupling terminal group 120 in the Y-axis direction which is the thickness direction.

In the present embodiment, a plurality of wirings 113 from the first coupling terminal group 120 to the terminal group 140B correspond to the individual wiring group 125B. Here, a portion of the wiring member 110 having the individual wiring group 125B, that is, the second flexible portion 110*b* is referred to as an end portion 145B of the wiring member 110. The end portion 145B is a portion including the terminal group 140B, and is branched from the body portion 144 at a branch position Pb. The second flexible portion 110*b* includes the first coupling terminal group 120, the second branch terminal group 122, and the terminal group 140B, which are wired by the individual wiring group 125B.

The wiring 113 is provided on one surface of the third flexible portion 110*c*, which faces the second flexible portion 110*b* of the base 112. A second coupling terminal group 124 is provided at one end of the wiring 113 of the third flexible portion 110*c*. The second coupling terminal group 124 includes a plurality of second coupling terminals arranged side by side in the X-axis direction. The second coupling terminal group 124 is wired to the second branch terminal group 122 of the second flexible portion 110*b*. In the present embodiment, the second coupling terminal group 124 is wired to the second branch terminal group 122 via a solder 152. The second coupling terminal group 124 and the second branch terminal group 122 may be wired to each other by not only soldering, but also welding with a conductive adhesive, brazing, or the like.

The terminal group 140C is provided at the other end of the wiring 113 of the third flexible portion 110*c*. The terminal group 140C has a plurality of terminals 141C1 to 141Cn arranged side by side in the X-axis direction. When the terminals 141C1 to 141Cn are not distinguished from each other, the terminals are referred to as the terminal 141C. When the terminals 141A to 141C are not distinguished from each other, the terminals are referred to as a terminal 141. As described above, each of the terminal group 140A, the terminal group 140B, and the terminal group 140C includes n pieces of terminals 141. Therefore, each of the terminals 140A1 to 140An, each of the terminals 140B1 to 140Bn, and each of the terminals 140C1 to 140Cn are wired to each other via each of the plurality of wirings 113 of the common wiring group 126. Further, each of the terminals 143_1 to 143*n* of the drive-side coupling terminal group 142 is wired to each of the terminals 140A1 to 140An, is wired to each of the terminals 140B1 to 140Bn, and is wired to each of the terminals 140C1 to 140Cn.

That is, the wirings 113 of the first flexible portion 110*a* wires the wirings 113 of the first branch terminal group 118, the first coupling terminal group 120, and the second flexible portion 110*b* to the terminal group 140A and the terminal group 140B via the wirings 113 of the second branch terminal group 122, and the second coupling terminal group 124, and the third flexible portion 110*c*. In other words, the body portion 144 of the first flexible portion 110*a* includes the common wiring group 126 wired in common to the terminal group 140A, the terminal group 140B, and the terminal group 140C. That is, the terminal group 140A, the terminal group 140B, and the terminal group 140C are indirectly joined via the common wiring group 126.

In the present embodiment, wirings 113 from the second coupling terminal group 124 to the terminal group 140C correspond to the individual wiring group 125C. When the individual wiring groups 125A to 125C are not distinguished from each other, the individual wiring groups are referred to as an individual wiring group 125. Here, a portion of the wiring member 110 having the individual wiring group 125C, that is, the third flexible portion 110*c* is set as an end portion 145C of the wiring member 110. When the end portions 145A to 145C are not distinguished from each other, the end portions are referred to as the end portion 145. The end portion 145C is a portion including the terminal group 140C, and is branched from the body portion 144 at a branch position Pb. The third flexible portion 110*c* includes the second coupling terminal group 124 and the terminal group 140C, which are wired by the individual wiring group 125C.

As described above, the plurality of wirings 113 of the body portion 144 of the first flexible portion 110*a* correspond to the common wiring group 126 wired in common to the terminal group 140A, the terminal group 140B, and the terminal group 140C. The phrase of being wired in common means that the common wiring group 126 is directly or indirectly joined and wired to the individual wiring group 125A wired to the terminal group 140A, the individual wiring group 125B wired to the terminal group 140B, and the individual wiring group 125C wired to the terminal group 140C.

In the present embodiment, the terminal group 140A is adhered to or bonded to a terminal group 222α of the relay substrate 210. Further, the terminal group 140B and the terminal group 140C are not adhered or bonded to the relay substrate 210. The terminal group 140A, the terminal group 140B, and the terminal group 140C are compatible with each other. That is, the head chip 2 in the present embodiment includes the nozzle plate 20 having the plurality of nozzles 21, the common wiring group 126, and the plurality of terminal groups 140A to 140C that are commonly wired to the common wiring group 126 and are compatible with each other.

Here, the phase of "being compatible" means that, even when the terminal group 140B is coupled to the relay substrate 210 instead of the terminal group 140A, the same operation or processing can be performed, that is, the same result can be obtained when the same signal is transmitted and received. For example, the phase that the terminal group 140A and the terminal group 140B are compatible with each other includes a case where the number of the terminals 141A1 to 141An of the terminal group 140A is equal to the number of the terminals 141B1 to 141Bn of the terminal group 140B. In addition, the phrase that the terminal group 140A and the terminal group 140B are compatible with each other includes a case where the lengths of the terminals 141A1 to 141An of the terminal group 140A in the side-by-side arrangement direction are equal to the lengths of the terminals 141B1 to 141Bn of the terminal group 140B in the side-by-side arrangement direction. In addition, the phrase that the terminal group 140A and the terminal group 140B are compatible with each other includes a case where the area of the surface of each of the terminals 141A1 to 141An of the terminal group 140A is equal to the area of the surface of each of the terminals 141B1 to 141Bn of the terminal group 140B. In addition, the phrase that the terminal group 140A and the terminal group 140B are compatible with each other includes a case where the terminals 141A1 to 141An of the terminal group 140A and the terminals 141B1 to 141Bn of the terminal group 140B are disposed in the same order. In addition, the phrase that the terminal group 140A and the terminal group 140B are compatible with each other includes a case where the terminal group 140A and the terminal group 140B are coupled to the same common wiring group 126. Although the compatibility between the terminal group 140A and the terminal group 140B has been described above, the same applies to the compatibility between the terminal group 140A and the terminal group 140C, and to the compatibility between the terminal group 140B and the terminal group 140C. The definition of "being compatible" in the present specification is similarly applied in the following description.

Figure 12:
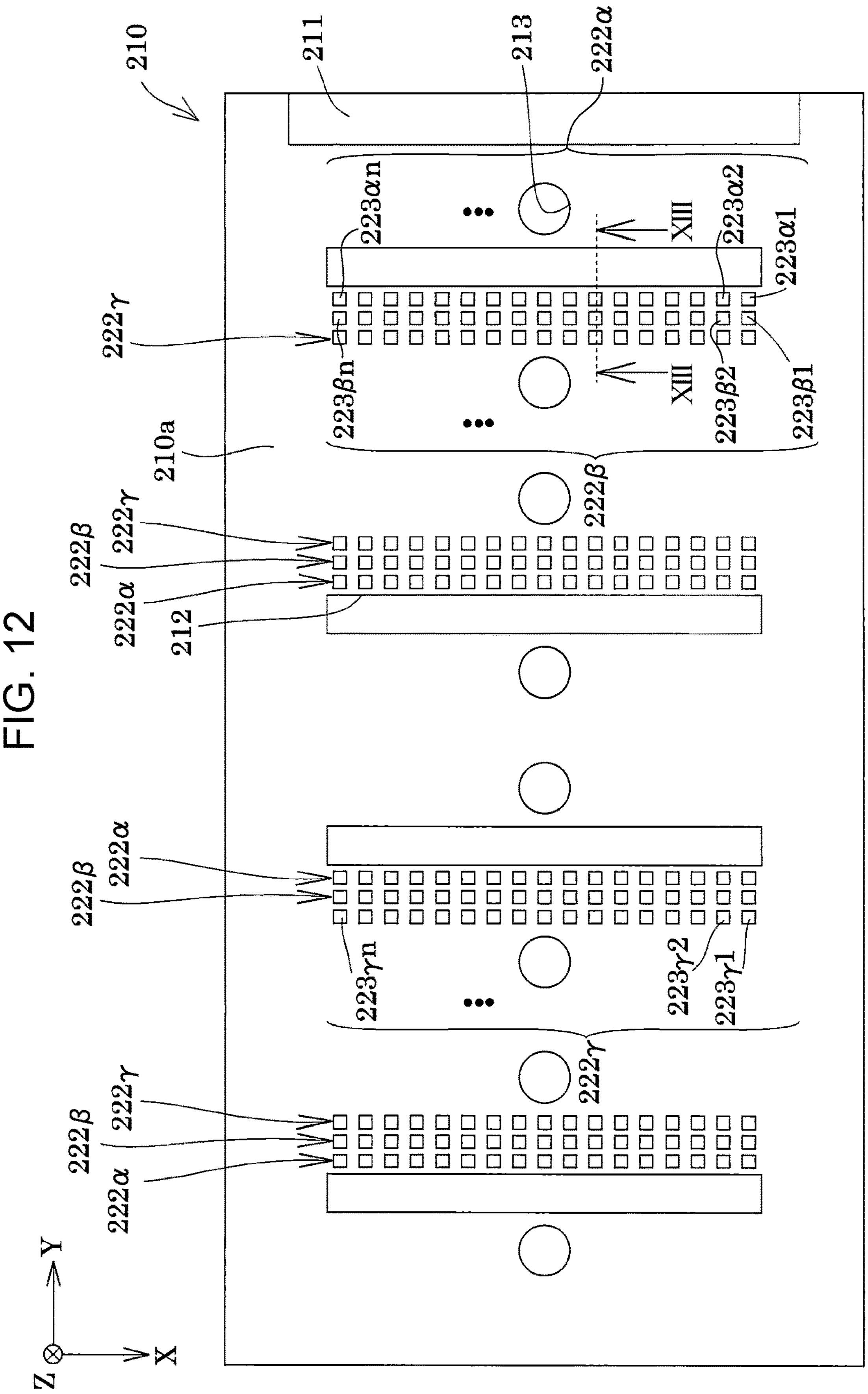
FIG. 12 is a plan view of a relay substrate according to the first embodiment.
Figure 13:
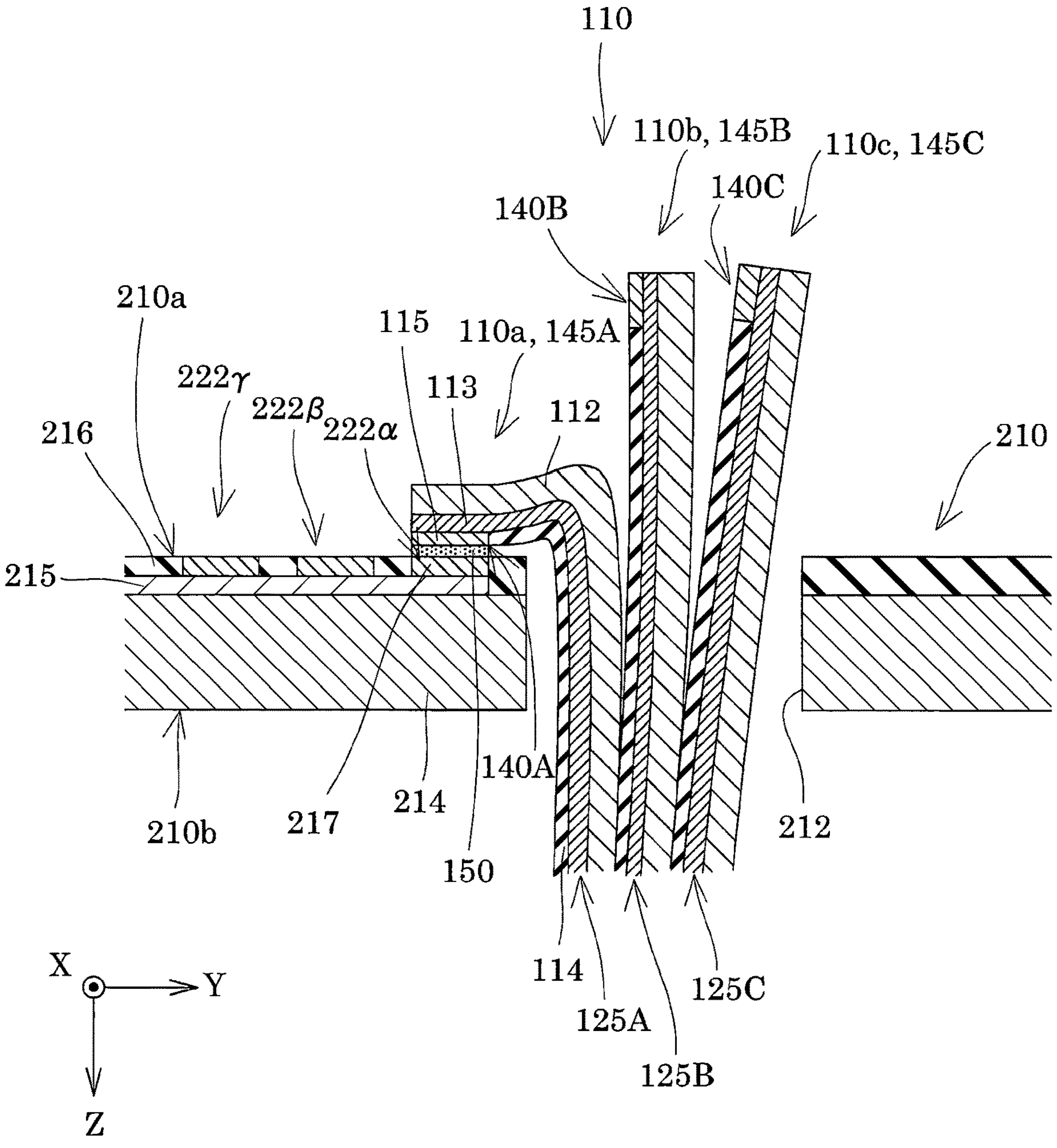
FIG. 13 is a cross-sectional view of the relay substrate according to the first embodiment.

Details of the relay substrate 210 to which the wiring member 110 of the head chip 2 is coupled will be further described with reference to FIGS. 12 and 13. FIG. 12 is a plan view of the relay substrate 210 as viewed in the +Z direction. FIG. 13 is a cross-sectional view taken along the line XIII-XIII of FIG. 12.

As illustrated in FIGS. 12 and 13, the relay substrate 210 is, in the present embodiment, made of a hard rigid substrate having no flexibility. The relay substrate 210 includes, for example, a hard base material 214, a plurality of wirings 215, and a protective material 216. The wirings 215 are formed on one surface of the base material 214 in a predetermined shape by metal foils of copper (Cu), gold (Au), silver (Ag), and tin (Sn), or the like. The protective material 216 covers the wiring 215 other than the terminals to which other wirings such as the wiring member 110 or electronic components are coupled. The plurality of wirings 113 in the present embodiment are formed by a copper foil. The hard base material 214 is, for example, a glass fiber impregnated with an epoxy resin, or paper impregnated with a phenol resin or an epoxy resin. The terminal of the wiring 215 is provided with a conductive layer 217 formed by plating with tin (Sn), gold (Au), or the like. A portion of the wiring 215 at which the conductive layer 217 is provided serves as a terminal, and an aggregate of the terminals serves as a terminal group. The protective material 216 has a film shape having an insulating property, and is adhered to the base material 214 by an adhesive (not illustrated) or the like. The protective material 216 is not limited to a film-like material, and a solder resist or the like may be used.

The relay substrate 210 has a first surface 210*a* facing the −Z direction and a second surface 210*b* facing the +Z direction. In addition, the relay substrate 210 includes a terminal group 222α, a terminal group 222β, and a terminal group 222γ that are electrical coupling terminals to the head chip 2, on the first surface 210*a*. The electrical coupling terminal is a terminal group 222 that can be electrically coupled to the head chip 2, and includes a terminal that is actually coupled and a terminal that is not actually coupled.

The terminal group 222α includes a plurality of terminals 223α1 to 223αn arranged side by side in the X-axis direction. The terminal group 222β includes a plurality of terminals 223β1 to 223βn arranged side by side in the X-axis direction. The terminal group 222γ includes a plurality of terminals 223γ1 to 223γn arranged side by side in the X-axis direction. When the terminals 223α1 to 223αn are not distinguished from each other, the terminals are referred to as a terminal 223α. When the terminals 223β1 to 223βn are not distinguished from each other, the terminals are referred to as a terminal 223β. When the terminals 223γ1 to 223γn are not distinguished from each other, the terminals are referred to as a terminal 223γ. When the terminals 223α to 223γ are not distinguished from each other, the terminals are referred to as a terminal 223.

The terminal group 222α, the terminal group 222β, and the terminal group 222γ are disposed on one side of the wiring insertion hole 212 in the Y-axis direction, and are arranged side by side along the Y-axis direction. Each of the terminal groups 222α to 222γ includes n pieces of terminals 223, similarly to the terminal group 140. The number of the terminals 223 provided in the terminal group 222 may be different from the number of the terminals 141 provided in the terminal group 140. For example, when the terminal 223α1 of the terminal group 222α is a terminal commonly coupled to the terminal 141A1 and the terminal 141A2 of the terminal group 140A, the number of terminals 223α provided in the terminal group 222α may be smaller than the number of terminals 141A provided in the terminal group 140A.

Each of the terminals 223α1 to 223αn forming the terminal group 222α, each of the terminals 223β1 to 223βn forming the terminal group 222β, and each of the terminals 223γ1 to 223γn forming the terminal group 222γ are wired. That is, the terminal group 222α, the terminal group 222β, and the terminal group 222γ are compatible with each other.

As illustrated in FIG. 13, the terminal group 140A of the wiring member 110 is adhered or bonded to the terminal group 222α of the relay substrate 210. Here, the phrase that the terminal group 140A and the terminal group 222α are adhered or bonded to each other means that the terminals 141A1 to 141An of the terminal group 140A are electrically coupled to the terminals 223α1 to 223αn of the terminal group 222α, respectively. The phrase that the terminal group 140 and the terminal group 222α are adhered and electrically coupled to each other includes a case where the terminal group 140A and the terminal group 222α are adhered to each other by a conductive adhesive containing conductive particles, and a case where the terminal group 140A and the terminal group 222α are bonded to each other by welding with soldering, or brazing, or the like. In the present embodiment, the terminal group 140A and the terminal group 222α are bonded to each other by a solder 150.

In the present embodiment, the wiring member 110 is inserted into the wiring insertion hole 212 of the relay substrate 210, and the wiring member 110 is curved, and then the terminal group 140A of the wiring member 110 and the terminal group 222α of the relay substrate 210 are adhered or bonded to each other. That is, in the present embodiment, the wiring member 110 and the relay substrate 210 are adhered or bonded to each other on the first surface 210*a* of the relay substrate 210 facing the −Z direction. The wiring member 110 and the relay substrate 210 may be adhered or bonded to each other on the second surface 210*b* of the relay substrate 210. However, by adhering or bonding the wiring member 110 and the relay substrate 210 on the first surface 210*a* of the relay substrate 210, the flow path member 200 is unlikely to interfere with the adhesion or bonding, and thus it is possible to easily perform the adhesion or bonding.

Further, the terminal group 140B and the terminal group 140C of the wiring member 110 are not adhered or bonded to the relay substrate 210. The phrase that the terminal group 140B and the terminal group 140C are not adhered or bonded to the relay substrate 210 means that the terminal group 140B and the terminal group 140C are not electrically coupled to the electrical coupling portion of the relay substrate 210, and are not electrically coupled to any electronic component. In the present embodiment, the end portion 145B and the end portion 145C are disposed in a state of being inserted into the wiring insertion hole 212 of the relay substrate 210, that is, the end portion 145B and the end portion 145C are disposed in a state of being flowed out from the first surface 210*a* of the relay substrate 210 in the −Z direction. The end portion 145B and the end portion 145C may not be inserted through the wiring insertion hole 212, and the terminal group 140B and the terminal group 140C may be disposed in the +Z direction from the second surface 210*b*.

Preferably, the terminal group 140B and the terminal group 140C that are not adhered or bonded to the relay substrate 210 are covered with, for example, a protective tape that has an insulating property and can be detachably attached. As described above, by covering the terminal groups 140B and 140C with the protective tape or the like, it is possible to suppress an occurrence of a situation in which the terminal group 140B and the terminal group 140C come into contact with other wirings, electrical coupling portions, or the like to be short-circuited or an unexpected signal is input.

The relay substrate 210 includes a plurality of terminal group sets, which are sets of the plurality of compatible terminal groups 222α to 222γ. The number of terminal group sets corresponds to the number of head chips 2 provided in the liquid ejecting head 1. In other words, the terminal groups 222α to 222γ which are terminal group sets electrically coupled to the head chip 2A are compatible with each other, and the terminal groups 222α to 222γ which are terminal group sets electrically coupled to the head chip 2B are compatible with each other. The terminal groups 140 of each head chip 2 are compatible with each other. As a specific example, the plurality of terminal groups 140A to 140C of the head chip 2A are compatible with the plurality of terminal groups 140A to 140C of the head chip 2B. Therefore, the head chip 2 can be electrically coupled to any terminal group set of the plurality of terminal group sets, and further can be electrically coupled to any terminal group 222 of the terminal group set. That is, in the present embodiment, the terminal group 140A and the terminal group 222α are electrically coupled to each other, but the terminal group 140B or the terminal group 140C can be electrically coupled to any of the terminal groups 222α to 222γ of the relay substrate 210. Further, the terminal groups 140A to 140C of the head chip 2B can also be electrically coupled to the terminal group 222 of the terminal group set electrically coupled to the head chip 2A.

In the liquid ejecting head 1 in which the terminal group 140A of the wiring member 110 and the terminal group 222α of the relay substrate 210 are electrically coupled to each other in this manner, by electrically separating the head chip 2 and the relay substrate 210 from each other, it is possible to reuse the head chip 2 or the components of the liquid ejecting head 1 other than the head chip 2. Although details will be described later, in order to reuse the head chip 2 and the components of the liquid ejecting head 1 other than the head chip 2, an adhesion portion or a bonding portion of the first flexible portion 110*a* to the relay substrate 210 is broken, or a portion other than the adhesion portion or the bonding portion, for example, the end portion 145A is broken. At this time, even though it is not possible to reuse the terminal group 140A of the head chip 2, since the head chip 2 includes the terminal group 140B and the terminal group 140C, it is possible to reuse the head chip 2 in another liquid ejecting head 1 different from the liquid ejecting head 1 electrically coupled to the terminal group 140A and the terminal group 222α. Similarly, even though it is not possible to reuse the terminal group 222α of the relay substrate 210, since the relay substrate 210 includes the terminal group 222β and the terminal group 222γ, it is possible to couple another head chip 2 different from the electrically separated head chip 2, to the relay substrate 210. Therefore, it is possible to reuse the head chip 2, the relay substrate 210, and the like removed from the liquid ejecting head 1. Further, even when a failure occurs in a portion of the relay substrate 210 or the head chip 2, it is possible to easily perform so-called refurbished work of replacing only the failed component and regenerating the liquid ejecting head 1. Therefore, it is not necessary to discard the liquid ejecting head 1 in which some components have failed. In particular, when the liquid ejecting head 1 includes a plurality of head chips 2, it is possible to easily replace only the failed head chip 2 instead of discarding the liquid ejecting head 1 even though one head chip 2 has failed. Thus, it is possible to regenerate the liquid ejecting head 1. Electrically separating means changing a state where the electrical coupling is performed to a state where the electrical coupling is not performed. Further, electrically coupling means changing the state where the electrical coupling is not performed to the state where the electrical coupling is performed.

Here, a method of electrically separating the head chip 2 and the relay substrate 210 from each other will be described. FIGS. 14 to 19 are schematic views for describing the method of electrically separating the head chip 2 the relay substrate 210 from each other.

The head chip 2 and the relay substrate 210 are electrically separated from each other by breaking portions other than an adhesion portion or a bonding portion between the terminal group 140A and the terminal group 222α.

Figure 14:
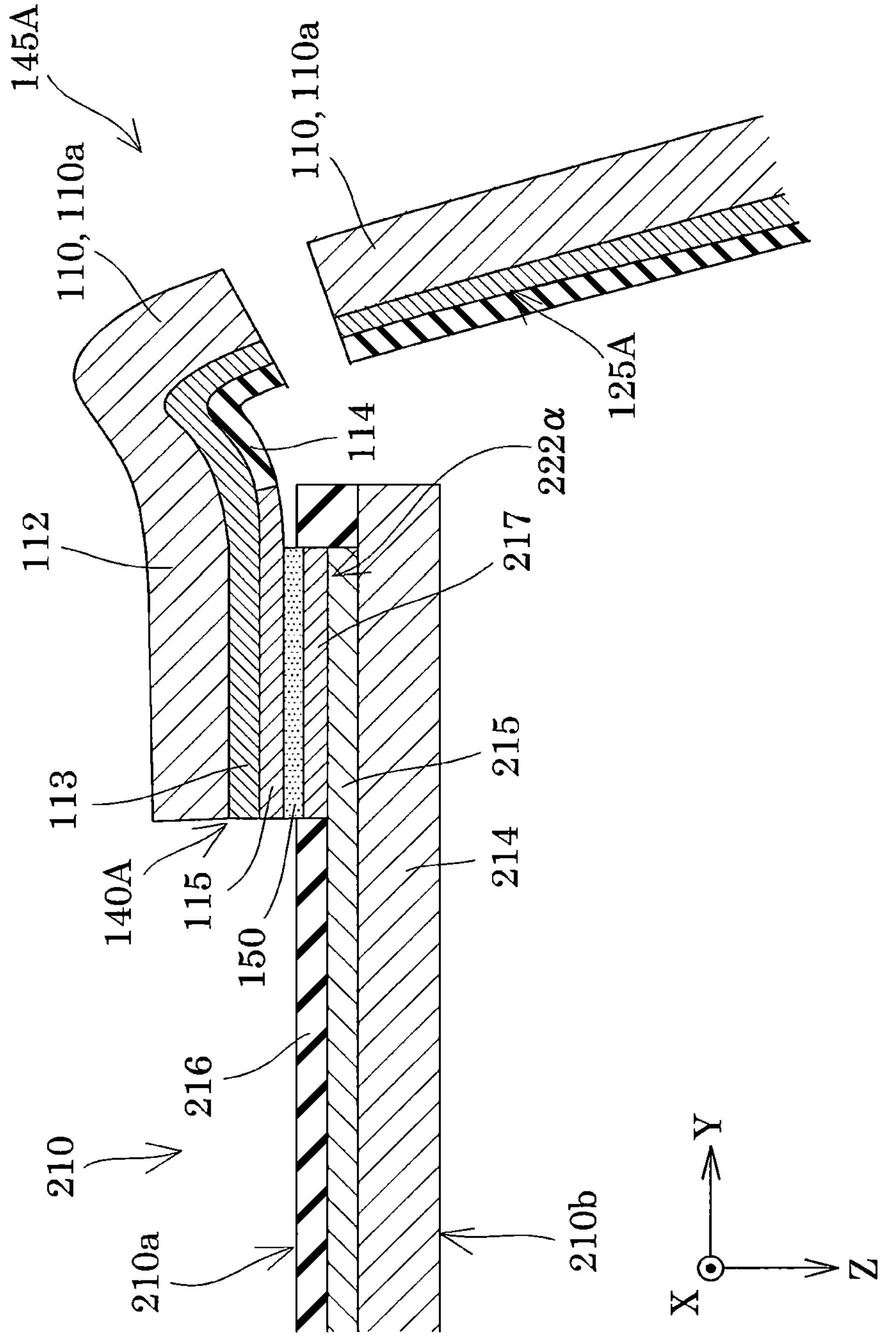
FIG. 14 is a view for describing a method of separating the head chip and the relay substrate.

Specifically, as illustrated in FIG. 14, the head chip 2 and the relay substrate 210 are electrically separated by cutting the individual wiring group 125A. At this time, it is preferable that the wiring member 110 have one end adhered or bonded to the terminal group 222α, that is, the terminal group 140A, and the other end on an opposite side of the one end, that is, the drive-side coupling terminal group 142 coupled to the individual lead electrode 91 and the common lead electrode 92, and the wiring member 110 be broken at a position closer to the one end than the other end. That is, as illustrated in FIG. 7, preferably, the wiring member 110 is broken in a region P2 on one end side of the center M of the wiring member 110 among the region P2 and a region P1 on the other end side in the extending direction of the wiring 113. By breaking the wiring member 110 in the region P2 on the one end side in this manner, it is possible to reduce the wiring member 110 remaining on the relay substrate 210. In addition, in the present embodiment, the other end referred to here is an end portion provided with the drive-side coupling terminal group 142 and an end portion from or to which a signal input or output to or from one end is output or input. By cutting the end portion 145A of the wiring member 110 in this manner, the cut surface of the wiring member 110 that remains on the relay substrate 210 and the cut surface of the wiring member 110 that does not remain on the relay substrate 210 are as illustrated in FIG. 14. Further, the cut surface of the wiring 113 when viewed in a direction perpendicular to the extending direction is as illustrated in FIG. 11. That is, the wiring 113 is exposed on the cut surface. In addition, at least one wiring 113 forming the individual wiring group 125A is not exposed other than on the cut surface. In the present embodiment, all the wirings 113 forming the individual wiring group 125A are not exposed other than on the cut surface. That is, the wiring 113 exposed on the cut surface is different from the terminal group 140. That is, the conductive layer 115 is not provided at the wiring 113 exposed on the cut surface. Further, as illustrated in FIG. 11, on the cut surface, both sides of the wiring 113 are covered with the adhesive 116 in the X-axis direction which is a direction orthogonal to both the thickness direction of the wiring member 110 and the extending direction of the wiring 113. In addition, on the cut surface, both sides of the wiring 113 are also covered with an insulator in the thickness direction of the wiring member 110, and specifically, are covered with the base 112 and the cover 114. In FIG. 14, the terminal group 140A and the terminal group 222α are bonded to each other by the solder 150, but the present disclosure is not particularly limited thereto. The same applies when both are adhered by a conductive adhesive instead of the solder 150.

The head chip 2 and the relay substrate 210 may be made to be electrically separated from each other by breaking portions other than an adhesion portion or a bonding portion between the terminal group 140A and the terminal group 222α.

Figure 15:
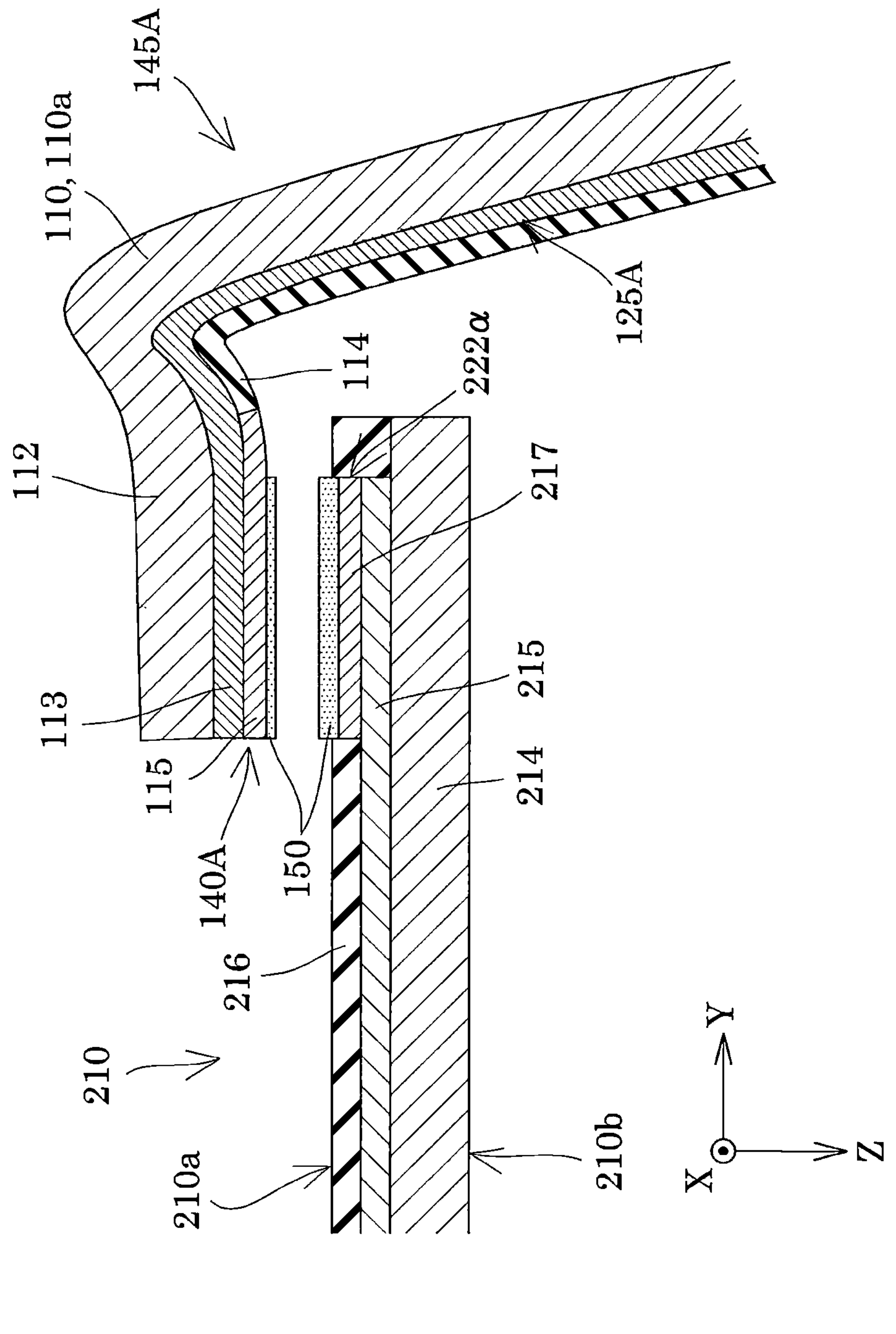
FIG. 15 is a view for describing the method of separating the head chip and the relay substrate.

As illustrated in FIG. 15, breaking of the adhesion portion or the bonding portion includes breaking of the solder 150 when the terminal group 140A and the terminal group 222α are bonded to each other by the solder 150. FIG. 15 illustrates so-called solder breaking when the solder 150 remains in both the terminal group 140A and the terminal group 222α. In FIG. 15, the terminal group 140A and the terminal group 222α are made to be bonded to each other by the solder 150, but the present disclosure is not particularly limited thereto. The same applies when both the terminal group 140A and the terminal group 222α are bonded to each other by a conductive adhesive instead of the solder 150. In this case, the breaking of the adhesion portion includes the breaking of the conductive adhesive, and so-called aggregation breaking.

Figure 16:
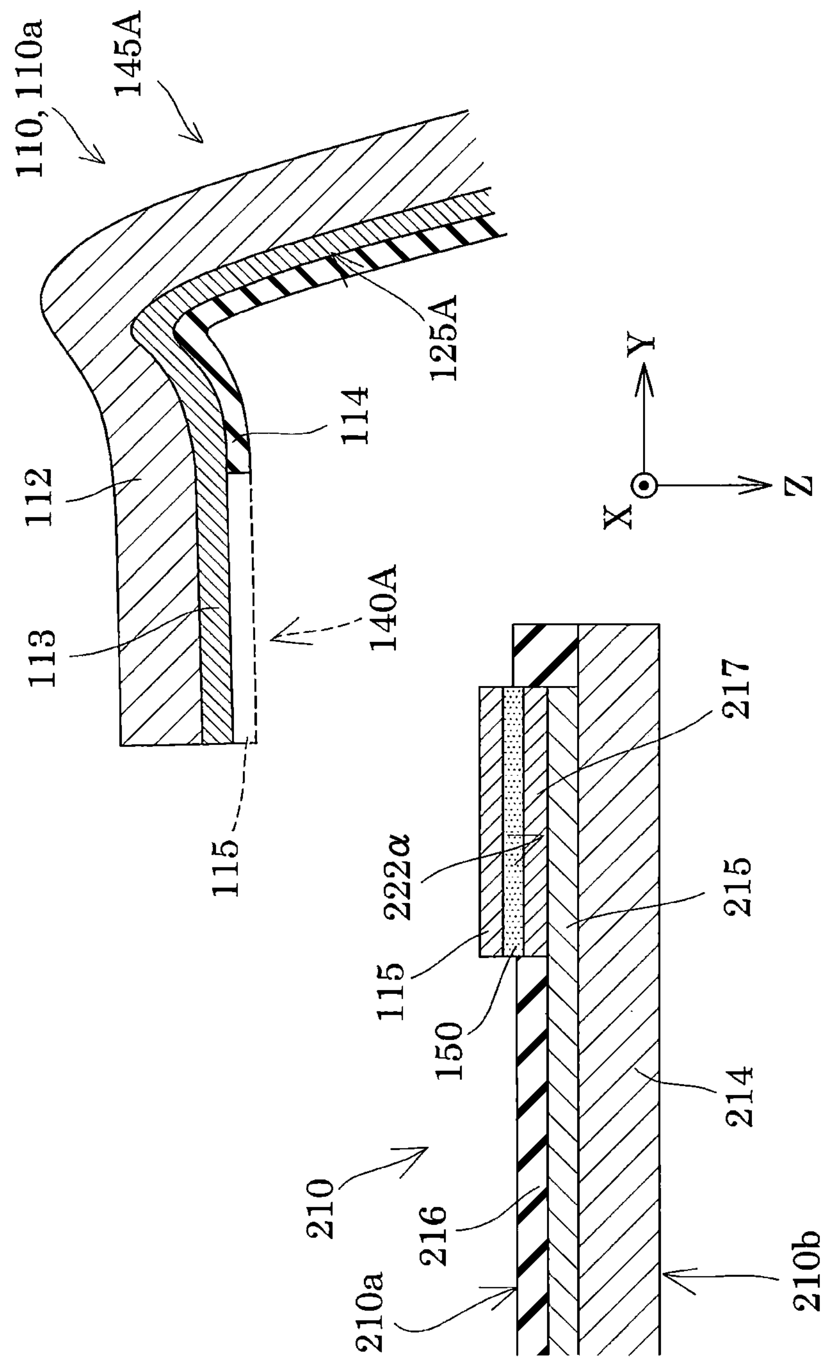
FIG. 16 is a view for describing the method of separating the head chip and the relay substrate.

In addition, as illustrated in FIG. 16, the breaking of the adhesion portion or the bonding portion includes peeling of the wiring 113 and the conductive layer 115 of the terminal group 140A of the wiring member 110. The conductive layer 115 peeled off from the wiring member 110 remains on the relay substrate 210. The same applies when the terminal group 140A and the terminal group 222α are adhered to the terminal group 140A and the terminal group 222α with a conductive adhesive instead of the solder 150. The breaking of the adhesion portion indicates that the wiring 113 of the terminal group 140A of the wiring member 110 and the conductive layer 115 are disposed in the same manner. Peeling includes so-called base material breaking.

Figure 17:
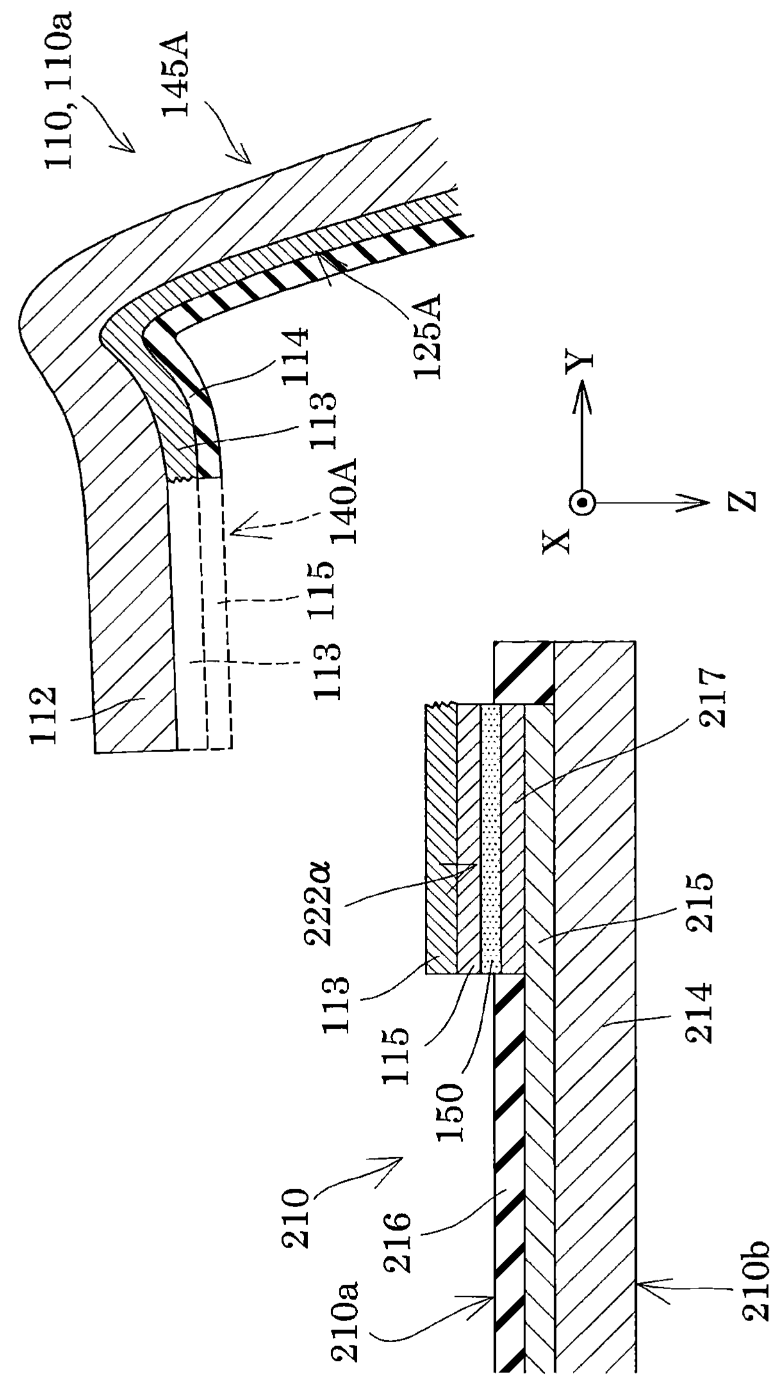
FIG. 17 is a view for describing the method of separating the head chip and the relay substrate.

In addition, as illustrated in FIG. 17, the breaking of the adhesion portion or the bonding portion includes peeling of the base 112 and the wiring 113 of the terminal group 140A of the wiring member 110, that is, so-called copper foil peeling. The wiring 113 and the conductive layer 115 peeled off from the wiring member 110 remain on the relay substrate 210. The same applies when the terminal group 140A and the terminal group 222α are adhered to each other with a conductive adhesive instead of the solder 150. The breaking of the adhesion portion includes peeling of the base 112 and the wiring 113 of the terminal group 140A of the wiring member 110, that is, so-called base material breaking.

Figure 18:
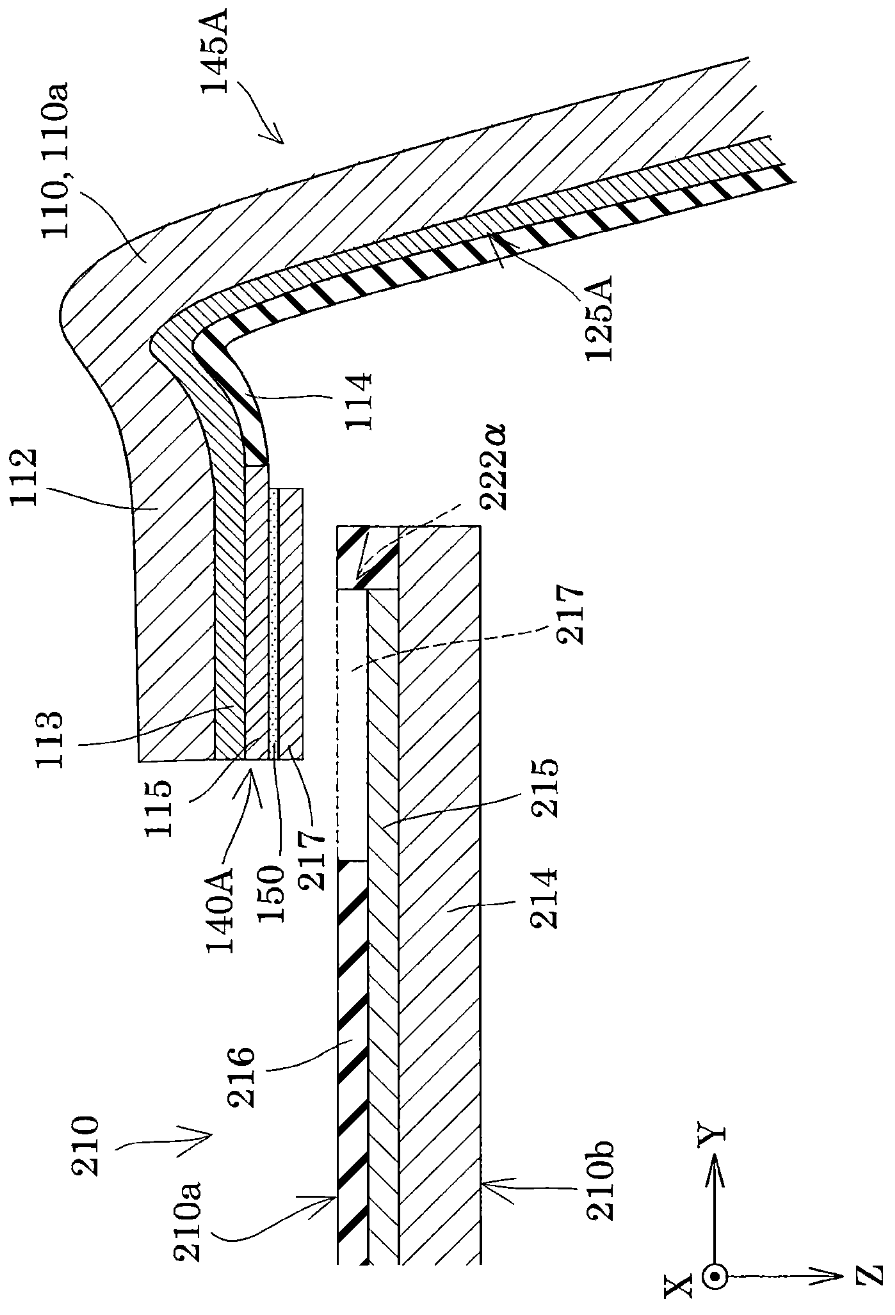
FIG. 18 is a view for describing the method of separating the head chip and the relay substrate.

Further, as illustrated in FIG. 18, the breaking of the adhesion portion or the bonding portion includes the peeling of the wiring 215 and the conductive layer 217 of the terminal group 222α of the relay substrate 210. The conductive layer 217 peeled off from the relay substrate 210 remains in the wiring member 110. The same applies when the terminal group 140A and the terminal group 222α are adhered to each other by a conductive adhesive instead of the solder 150. The breaking of the adhesion portion includes peeling of the wiring 215 and the conductive layer 217 of the terminal group 222α of the relay substrate 210, that is, so-called base material breaking.

Figure 19:
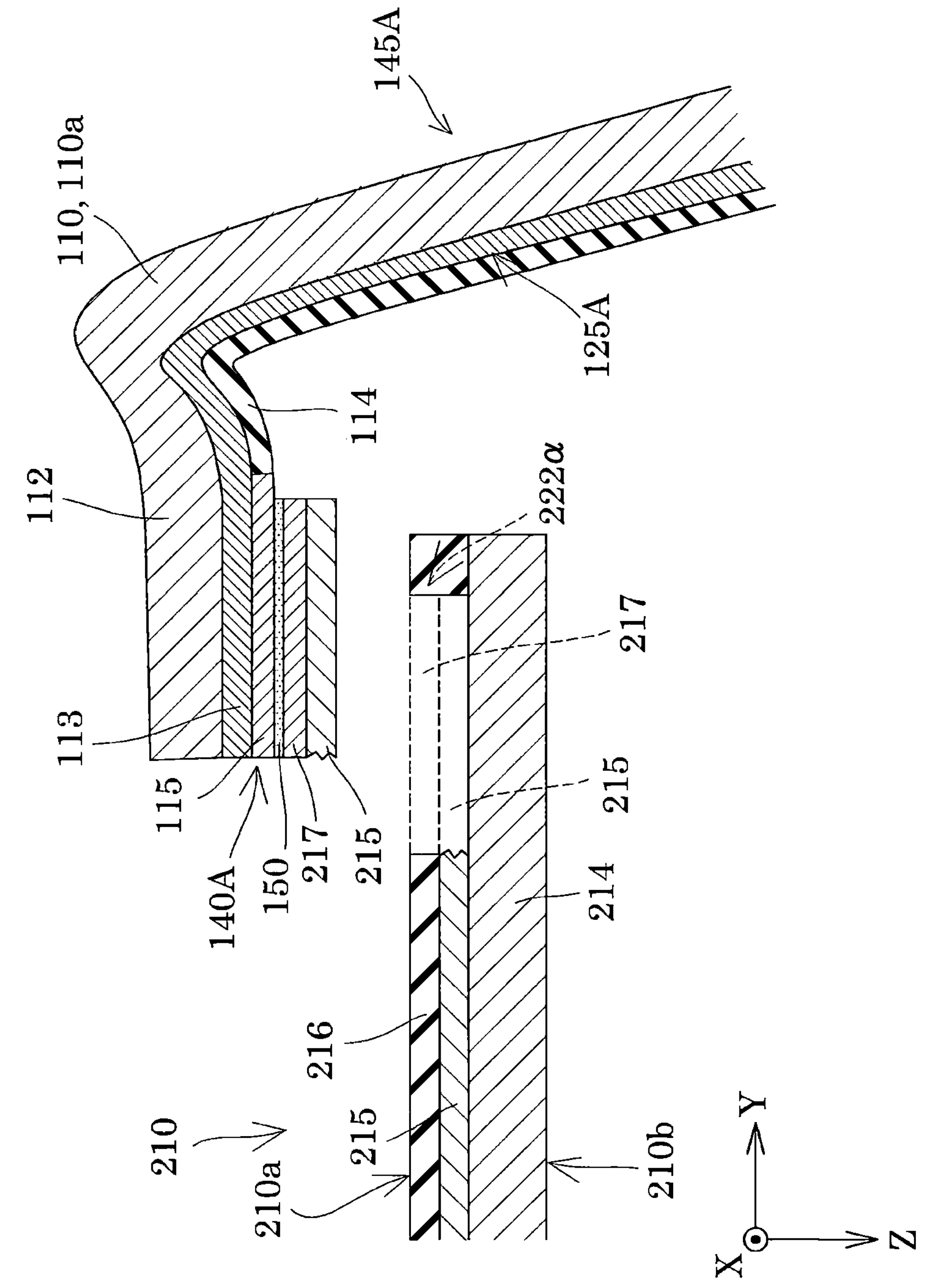
FIG. 19 is a view for describing the method of separating the head chip and the relay substrate.

In addition, as illustrated in FIG. 19, the breaking of the adhesion portion or the bonding portion includes peeling of the base material 214 and the wiring 215 of the terminal group 222α of the relay substrate 210, that is, so-called copper foil peeling. The wiring 215 and the conductive layer 217 peeled off from the relay substrate 210 remain on the wiring member 110. The same applies when the terminal group 140A and the terminal group 222α are adhered to each other by a conductive adhesive instead of the solder 150. The breaking of the adhesion portion includes peeling of the base material 214 and the wiring 215 of the terminal group 222α of the relay substrate 210, that is, so-called base material breaking.

As illustrated in FIGS. 15 to 19, when the adhesion or bonding portion between the terminal group 140A and the terminal group 222α is broken to electrically separate the head chip 2 and the relay substrate 210 from each other, it is preferable that the adhesion or bonding portion between the head chip 2 and the relay substrate 210 has adhesive strength or bonding strength smaller than adhesive strength or bonding strength of the adhesion or bonding portion between the wiring member 110 of the head chip 2 and another member adhered or bonded to the wiring member 110. That is, the strength of the adhesion or bonding portion between the terminal group 140A and the terminal group 222α is preferably smaller than the adhesive strength or bonding strength between the drive-side coupling terminal group 142, and the individual lead electrode 91 and the common lead electrode 92. As a result, when the wiring member 110 is peeled off from the relay substrate 210, it is possible to suppress the breaking of the adhesion or bonding portion between the wiring member 110, and the individual lead electrode 91 and the common lead electrode 92, and to easily separate the wiring member 110 and the relay substrate 210 from each other.

By any one of the above description, by electrically separating the head chip 2 and the relay substrate 210 from each other, it is possible to reuse the non-failed component of the liquid ejecting head 1 or to regenerate the liquid ejecting head 1.

In FIGS. 14 to 19 described above, the adhesion portion or the bonding portion between the terminal group 140A and the terminal group 222α has been described. The same applies to the adhesion portion or the bonding portion between the terminal group 140 different from the terminal group 140A and the terminal group 222 or the adhesion portion or the bonding portion between the terminal group 222 different from the terminal group 222α and the terminal group 140, for example, the adhesion portion or the bonding portion between the terminal group 140B and the terminal group 222β, or the adhesion portion or the bonding portion between the terminal group 140C and the terminal group 222γ.

When the head chip 2 and the relay substrate 210 in which the terminal group 140A and the terminal group 222α are adhered or bonded to each other are electrically separated from each other, and then the relay substrate 210 is reused, any of the terminal group 140A, the terminal group 140B, and the terminal group 140C of another head chip 2 may be adhered or bonded to any of the terminal group 222β and the terminal group 222γ of the relay substrate 210. Examples of the other head chip 2 include a new head chip 2 or a non-failed head chip 2 removed from another liquid ejecting head 1.

In addition, when the head chip 2 and the relay substrate 210 in which the terminal group 140A and the terminal group 222α are adhered or bonded to each other are electrically separated from each other, and then the separated head chip 2 is reused, the terminal group 140B or the terminal group 140C of the separated head chip 2 may be adhered or bonded to any of the terminal group 222α, the terminal group 222β, and the terminal group 222γ of another relay substrate 210. Examples of the other relay substrates 210 include a new relay substrate 210, a non-failed relay substrate 210 removed from another liquid ejecting head 1, and a non-failed relay substrate 210 provided in another liquid ejecting head 1 from which the failed head chip 2 has been removed.

As described above, by providing the plurality of terminal groups 140 for the head chip 2, it is possible to reuse the head chip 2 by electrically separating the head chip 2 and the relay substrate 210 from each other.

Further, by providing the plurality of terminal groups 222 for the relay substrate 210, it is possible to reuse the relay substrate 210 by electrically separating the head chip 2 and the relay substrate 210 from each other. Further, even when a failure occurs in a portion of the relay substrate 210 or the head chip 2, it is possible to easily perform so-called refurbished work of replacing only the failed component and regenerating the liquid ejecting head 1. That is, since the head chips 2A and 2B are compatible with each other, even when there is the head chip 2 in which one of the terminal group 140A and the terminal group 140B has been used and damaged, it is possible to reuse the other remaining head chip 2 including an unused terminal group 140, as the head chip 2A or the head chip 2B. Further, since the head chip 2A and the head chip 2B in the present embodiment are compatible with each other, it is not necessary to individually manufacture the head chip 2A and the head chip 2B and perform inventory management of the head chip 2A and the head chip 2B, and it is possible to reduce the cost required for manufacturing and performing inventory management.

In the present embodiment, the wiring member 110 is made to have three terminal groups 140, but the number of the terminal groups 140 is not particularly limited thereto. For example, the wiring member 110 may have one terminal group 140, or may have two or more terminal groups 140. When the head chip 2 has only one terminal group 140, if the relay substrate 210 has two or more terminal groups 222, it is possible to reuse the relay substrate 210 and couple the relay substrate 210 to another head chip 2 even when the head chip 2 has failed. When the number of the terminal groups 140 of the wiring member 110 is three or more, it is possible to reuse the head chip 2 two or more times. Similarly, the relay substrate 210 is made to have three terminal groups 222, but the number of the terminal groups 222 is not particularly limited thereto. For example, the relay substrate 210 may have only one terminal group 222, or may have two or more terminal groups 222. When the relay substrate 210 has only one terminal group 222, if the head chip 2 has two or more terminal groups 140, it is possible to remove the head chip 2 from the relay substrate 210 and reuse the head chip 2 even when the relay substrate 210 has failed. When the number of the terminal groups 222 of the relay substrate 210 is three or more, it is possible to reuse the relay substrate 210 two or more times. Further, the number of terminal groups 140 provided in the wiring member 110 may or may not be equal to the number of terminal groups 222 provided on the relay substrate 210.

In the present embodiment, the head chip 2A is an example of a "first head chip", and the wiring member 110A is an example of a "first wiring member". The terminal group 140A of the wiring member 110A is an example of a "first terminal group A", and the terminal group 140B of the wiring member 110A is an example of a "first terminal group B". The terminal group 222α to which the terminal group 140A of the wiring member 110A of the head chip 2A is adhered or bonded is an example of a "first terminal group α".

In the present embodiment, the end portion 145A is an example of a "first end portion" and the end portion 145B is an example of a "second end portion".

In the present embodiment, the individual wiring group 125A is an example of an "individual wiring group A", and the individual wiring group 125B is an example of an "individual wiring group B".

In the present embodiment, the terminal group 222β to which the wiring member 110A is not adhered or coupled is an example of a "first terminal group β".

In the present embodiment, the head chip 2B is an example of a "second head chip", and the wiring member 110B is an example of a "second wiring member". The terminal group 140A of the wiring member 110B is an example of a "second terminal group A", and the terminal group 140B of the wiring member 110B is an example of a "second terminal group B". The terminal group 222α to which the terminal group 140A of the wiring member 110B of the head chip 2B is adhered or bonded is an example of a "second terminal group α", and the terminal group 222β to which the wiring member 110B is not adhered or coupled is an example of a "second terminal group β".

The terminal group 140C of the wiring member 110A is an example of a "first terminal group C".

First Modification Example

Figure 20:
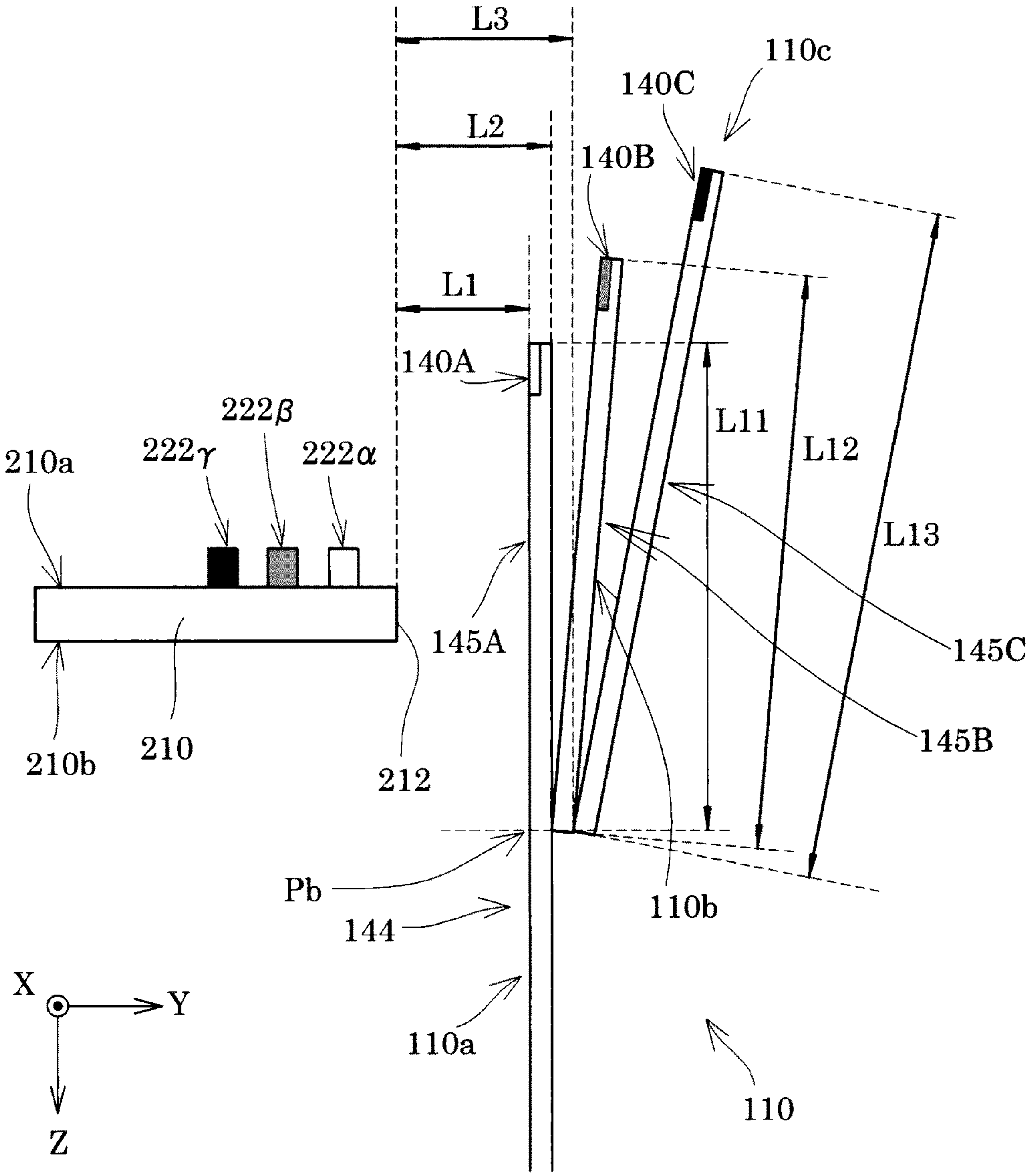
FIG. 20 is a schematic view of a wiring member and a relay substrate in a first modification example of the first embodiment.

FIG. 20 is a view schematically illustrating a wiring member 110 and a relay substrate 210 illustrating a first modification example of the first embodiment. The present modification example is different from the first embodiment in that a length L11 from the body portion 144 of the wiring member 110 to the terminal group 140A (in other words, length L11 of an end portion 145A), a length L12 from the body portion 144 to the terminal group 140B (in other words, length L12 of an end portion 145B), and a length L13 from the body portion 144 to the terminal group 140C (in other words, length L13 of an end portion 145C) are different from each other.

In the present modification example, when the head chip 2 and the relay substrate 210 are electrically coupled to each other, the terminal group 140A is electrically coupled to the terminal group 222α in a case where the terminal group 140A is used, the terminal group 140B is electrically coupled to the terminal group 222β in a case where the terminal group 140B is used, and the terminal group 140C is electrically coupled to the terminal group 222γ in a case where the terminal group 140C is used. Further, in the present modification example, as in the first embodiment, each terminal group 222 is configured by arranging the plurality of terminals 223 in the X-axis direction.

As illustrated in FIG. 20, a distance L1 between the end portion 145A and the terminal group 222α closest to the body portion 144 of the wiring member 110 among the terminal groups 222α, 222β, and 222γ, a distance L2 between the terminal group 222α and the end portion 145B, and a distance L3 between the terminal group 222α and the end portion 145C are shorter in this order. Thus, it is preferable that the length L11 of the end portion 145A of the wiring member 110, the length L12 of the end portion 145B, and the length L13 of the end portion 145C are shortened in this order. As described above, the lengths L11, L12, and L13 of the end portion 145A, the end portion 145B, and the end portion 145C are adjusted in accordance with each of the distances L1, L2, and L3 from each of the end portions 145A to 145C to the terminal group 222α closest to the body portion 144 of the wiring member 110, and, in this manner, it is possible to suppress excessively bending of the wiring member 110 when each of the terminal groups 140A, 140B, and 140C of the wiring member 110 is coupled to each of the terminal groups 222α, 222β, and 222γ of the relay substrate 210. Therefore, it is possible to suppress an occurrence of a situation in which an extra portion of the bent wiring member 110 is cushioned with other members, or in which positioning accuracy between each of the terminal groups 140A, 140B, and 140C of the wiring member 110 and each of the terminal groups 222α, 222β, and 222γ of the relay substrate 210 is decreased due to the bent stress, and thus coupling failure occurs. For example, when the distance L11 is equal to the distance L13, the end portion 145A is extra longer than a length required to couple the terminal group 140A to the terminal group 222α, and thus the wiring member 110 is excessively bent.

Second Modification Example

Figure 21:
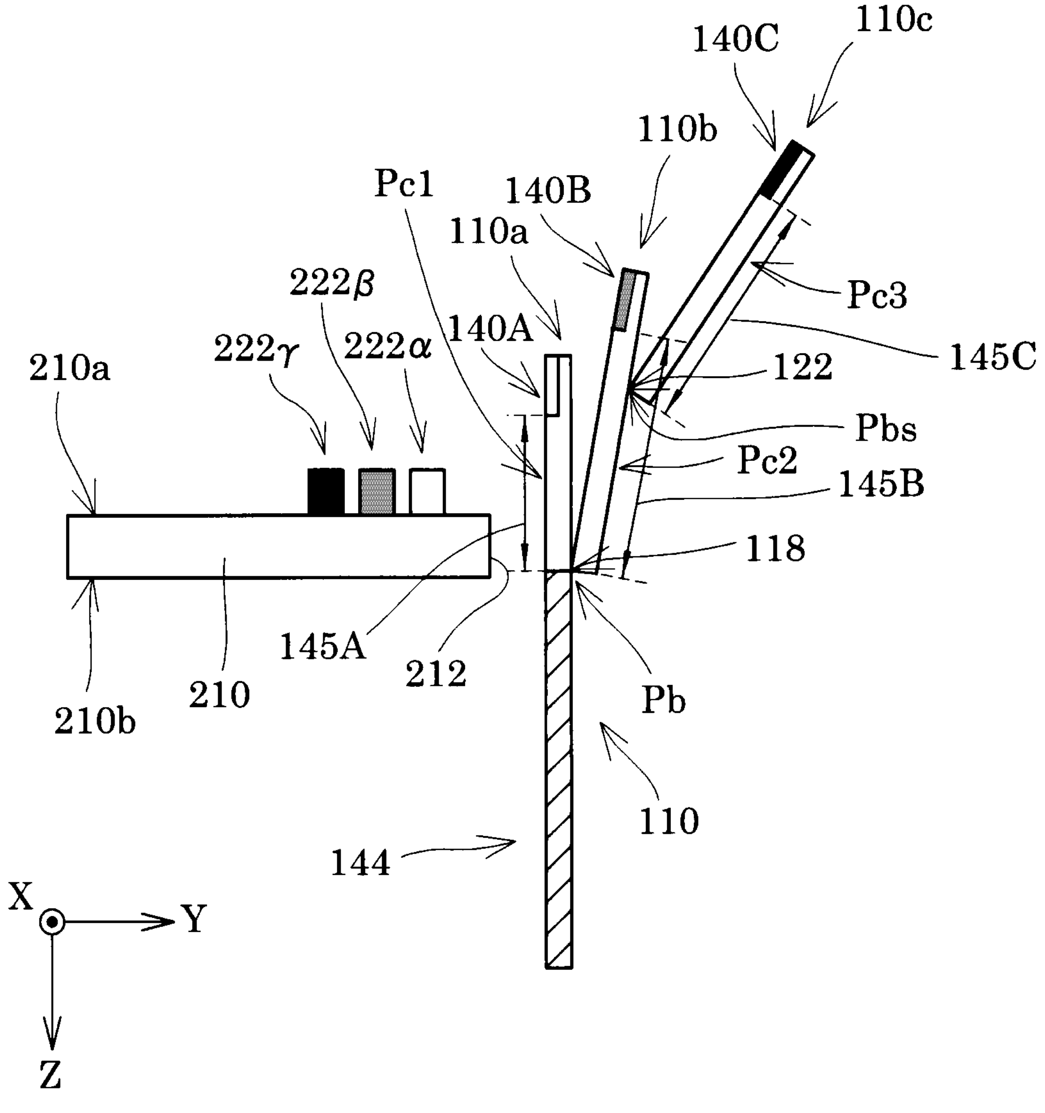
FIG. 21 is a schematic view of a wiring member and a relay substrate in a second modification example of the first embodiment.

FIG. 21 is a view schematically illustrating a wiring member 110 and a relay substrate 210 for describing a second modification example of the first embodiment. The present modification example is different from the first embodiment in that the wiring member 110 has a sub-branch position Pbs at a position different from the branch position Pb.

In the present modification example, the end portion 145A is a portion of the first flexible portion 110*a* to the terminal group 140A from the branch position Pb that is a coupling position between the first flexible portion 110*a* and the second flexible portion 110*b*. The end portion 145B is a portion of the second flexible portion 110*b* to the terminal group 140B from the branch position Pb that is a coupling position between the second flexible portion 110*b* and the third flexible portion 110*c*. Furthermore, the end portion 145C is a portion of the third flexible portion 110*c* from the sub-branch position Pbs to the terminal group 140C. That is, as illustrated in FIG. 21, the end portion 145B and the end portion 145C are branched at the sub-branch position Pbs that is a position different from the branch position Pb in the Z-axis direction.

The body portion 144 is a portion of the first flexible portion 110*a* from the branch position Pb to the drive-side coupling terminal group 142 (not illustrated). That is, each of the end portion 145B and the end portion 145C is branched from the body portion 144 at the branch position Pb via a portion of the second flexible portion 110*b* between the branch position Pb and the sub-branch position Pbs.

In the wiring member 110 having such a configuration, when the end portion 145A is cut in order to electrically separate the head chip 2 and the relay substrate 210 from each other, the end portion 145A is cut at a cutting position Pc1 between the terminal group 140A and the branch position Pb. In addition, when the second flexible portion 110*b* including the end portion 145B is cut, the second flexible portion 110*b* is cut at a cutting position Pc2 between the branch position Pb and the sub-branch position Pbs. When the third flexible portion 110*c* that is the end portion 145C is cut, the third flexible portion 110*c* is cut at a cutting position Pc3 between the sub-branch position Pbs and the terminal group 140C. When the terminal group 140C, the terminal group 140B, and the terminal group 140A are used in this order for performing electrical coupling to the relay substrate 210, the terminal group 140C is used and the third flexible portion 110*c* is cut at the cutting position Pc3. Then, the second flexible portion 110*b* is cut at the cutting position Pc2 in order to cut electrical coupling between the terminal group 140B and the relay substrate 210. In this case, after the cutting, there is no remaining portion of the third flexible portion 110*c* in the wiring member 110. Therefore, it is possible to suppress an occurrence of a situation in which the remaining portion of the third flexible portion 110*c* functions as an obstacle when the terminal group 140A and the relay substrate 210 are electrically coupled to each other.

The cutting position Pc1 is preferably set to a position closer to the branch position Pb than the terminal group 140A. As a result, it is possible to further shorten the remaining wiring portion when the first flexible portion 110*a* is cut at the cutting position Pc1. Similarly, the cutting position Pc2 is preferably set to a position closer to the branch position Pb than the sub-branch position Pbs, and the cutting position Pc3 is preferably set to a position closer to the sub-branch position Pbs than the terminal group 140C.

Third Modification Example

Figure 22:
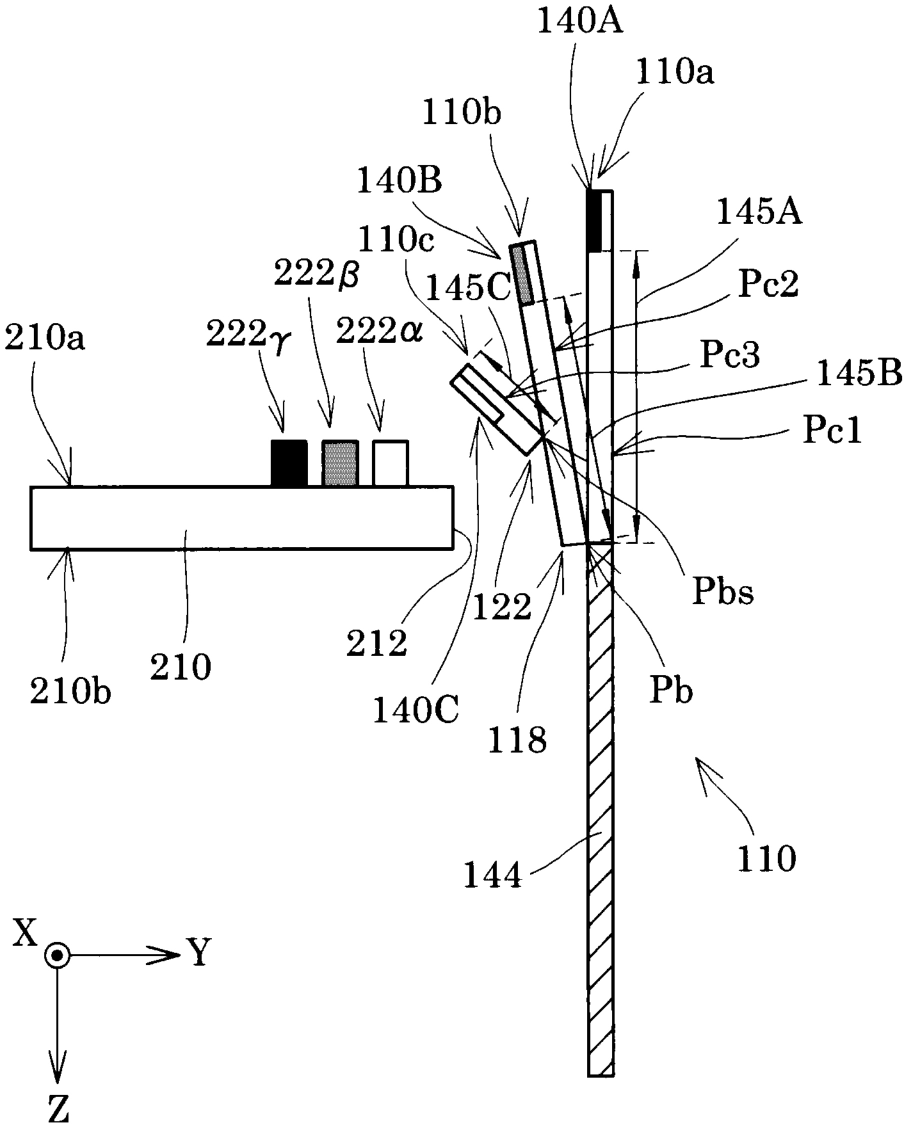
FIG. 22 is a schematic view of a wiring member and a relay substrate in a third modification example of the first embodiment.

FIG. 22 is a view schematically illustrating a wiring member 110 and a relay substrate 210 illustrating a third modification example of the first embodiment.

The present modification example is different from the second modification example of the first embodiment in that, as illustrated in FIG. 22, the first flexible portion 110*a*, the second flexible portion 110*b*, and the third flexible portion 110*c* are arranged in this order from the back to the front when viewed from the terminal group 222. In the present modification example, the definition of each of the end portions 145A to 145C of the wiring member 110, the body portion 144 of the wiring member 110, the branch position Pb, the sub-branch position Pbs, and the cutting positions Pc1 to Pc3 is similar to the definition in the second modification example of the first embodiment. Also in the present modification example, by disposing the cutting position Pc2 between the branch position Pb and the sub-branch position Pbs, it is possible to obtain the similar effect to that of the second modification example of the first embodiment.

Fourth Modification Example

Figure 23:
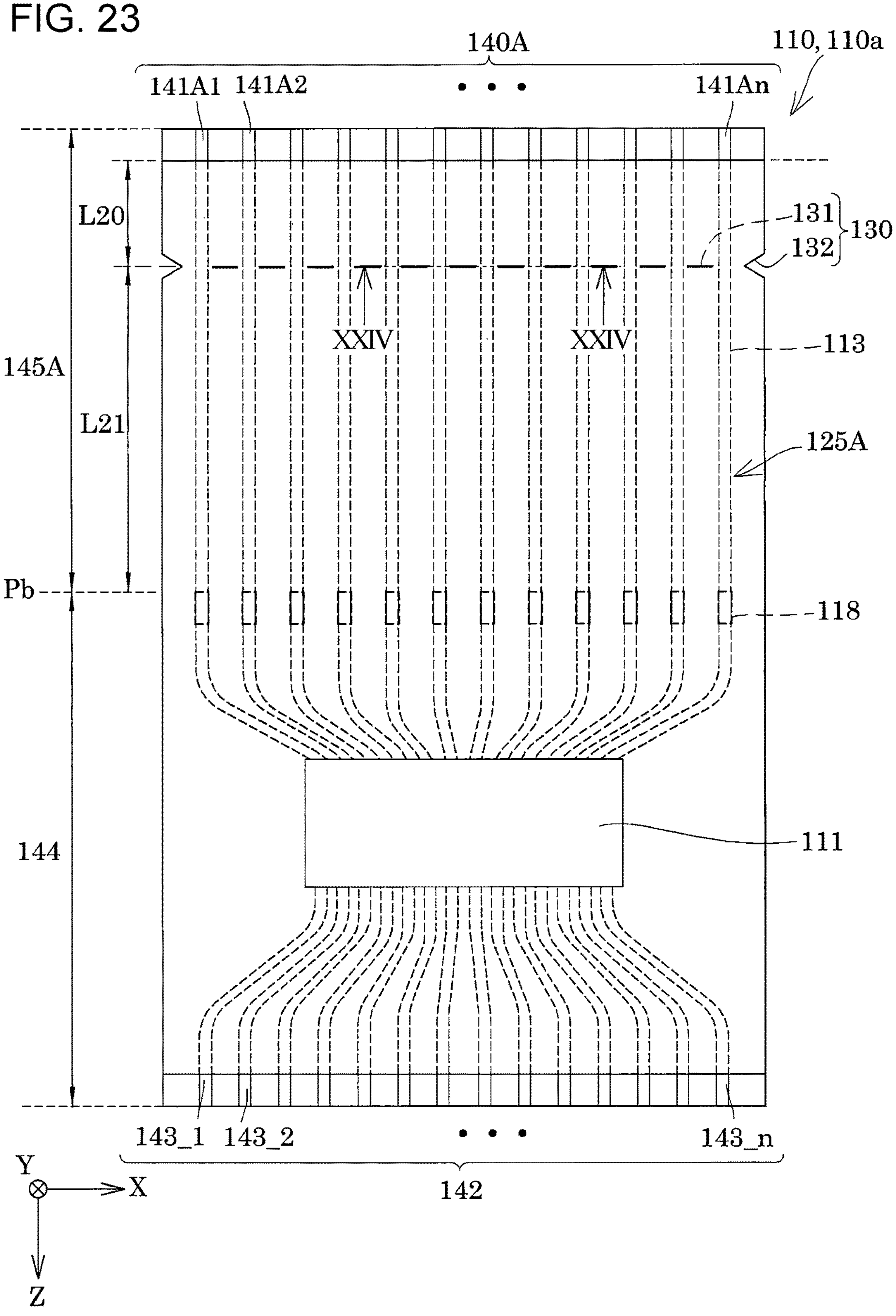
FIG. 23 is a plan view of a wiring member in a fourth modification example of the first embodiment.
Figure 24:
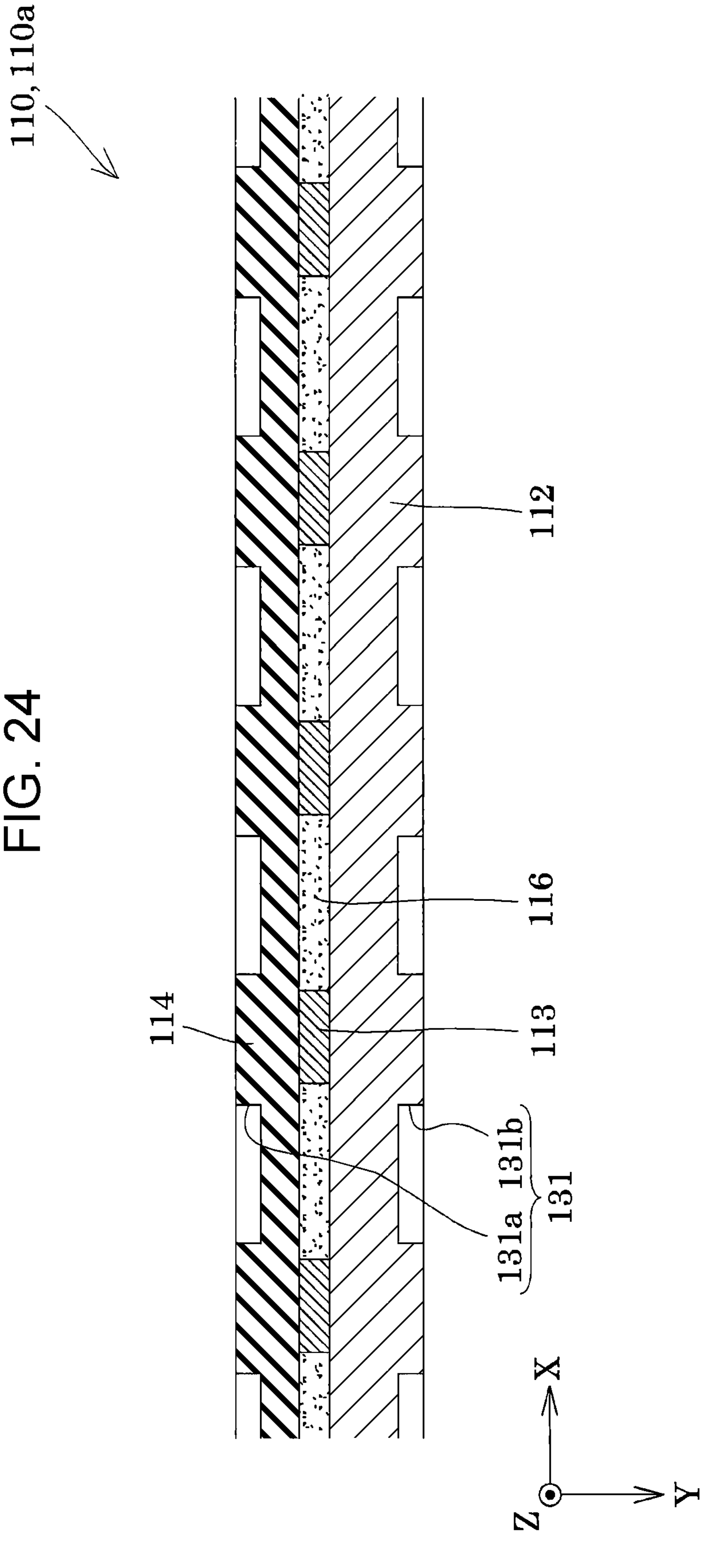
FIG. 24 is a cross-sectional view of the wiring member in the fourth modification example of the first embodiment.

FIG. 23 is a plan view of a wiring member 110 illustrating a fourth modification example of the first embodiment. FIG. 24 is a cross-sectional view taken along line XXIV-XXIV in FIG. 23.

As illustrated in FIGS. 23 and 24, a fragile portion 130 is provided at the end portion 145A of the wiring member 110, that is, between the first branch terminal group 118 and the terminal group 140A. The fragile portion 130 is a portion that is more fragile than other regions. The fragile portion 130 makes it easy to separate the wiring member 110 between the terminal group 140A and the body portion 144 so that it is easy to electrically separate the head chip 2 and the relay substrate 210 from each other.

In the present modification example, such a fragile portion 130 includes a so-called perforated line 131 and a notch 132. In the perforated line 131, a plurality of grooves are disposed on a straight line at predetermined intervals along the +X direction that is a direction in which the terminals 141A1 to 141An forming the terminal group 140A are arranged. The notch 132 is provided on both the side surfaces of the perforated line 131 in the +X direction and the −X direction. The fragile portion 130 may be provided with only one of the perforated line 131 and the notch 132. The notch 132 may be provided on only one of the side surfaces of the wiring member 110 in the +X direction and the −X direction.

In the present modification example, each of the grooves forming the perforated line 131 includes a first groove 131*a* and a second groove 131*b*. The first groove 131*a* is provided in the cover 114 and opens on the surface opposite to the base 112. The second groove 131*b* is provided in the base 112 and opens on the surface opposite to the cover 114. The first groove 131*a* is provided without penetrating the cover 114 in the thickness direction, and the second groove 131*b* is provided without penetrating the base 112 in the thickness direction. As a result, it is possible to suppress an occurrence of a situation in which the first groove 131*a* and the second groove 131*b* expose the wiring 113 to the outside, and to suppress the cutting of the wiring 113, an occurrence of a short circuit between the wirings 113, and the like. Either or both of the first groove 131*a* and the second groove 131*b* may be provided to penetrate the cover 114 and the base 112, respectively, in the thickness direction. In addition, the first groove 131*a* and the second groove 131*b* are provided at positions that do not overlap the wiring 113 in the thickness direction of the wiring member 110, and thus the first groove 131*a* and the second groove 131*b* may be provided so that the first groove 131*a* and the second groove 131*b* communicate with each other, that is, so that a groove including the first groove 131*a* and the second groove 131*b* penetrates the wiring member 110 in the thickness direction. In addition, only one of the first groove 131*a* and the second groove 131*b* may be provided as the groove forming the perforated line 131.

The notch 132 is provided in a region in which the wiring 113 is not provided, to penetrate the wiring member 110 in the thickness direction.

By providing such a fragile portion 130, it is possible to easily cut the wiring member 110 in a state where the terminal group 140A and the terminal group 222α of the relay substrate 210 are coupled to each other, and to electrically separate the head chip 2 and the relay substrate 210 from each other. In addition, by providing the fragile portion 130, it is possible to reduce the shift of the cutting position of the wiring member 110 and suppress the cutting of the wiring member 110 at an unexpected position.

As illustrated in FIG. 23, the fragile portion 130 is provided at a position closer to the terminal group 140A than the body portion 144 at the end portion 145A. Thus, it is possible to shorten the end portion 145A remaining on the relay substrate 210 after the end portion 145A is cut by the fragile portion 130. Therefore, when the relay substrate 210 is reused, and the relay substrate 210 is coupled to another head chip 2 by using the terminal group 222β or the terminal group 222γ, it is possible to suppress an occurrence of a situation in which the wiring member 110 remaining on the relay substrate 210 functions as an obstacle. Here, the phrase that the fragile portion 130 is closer to the terminal group 140A than the body portion 144 means that a distance L20 between the fragile portion 130 and the terminal group 140A in the extending direction of the wiring 113 is shorter than a distance between the fragile portion 130 and the body portion 144, that is, a distance L21 between the fragile portion 130 and the first branch terminal group 118.

The fragile portion 130 illustrated in FIG. 23 in the present modification example is an example of a "first fragile portion".

Figure 25:
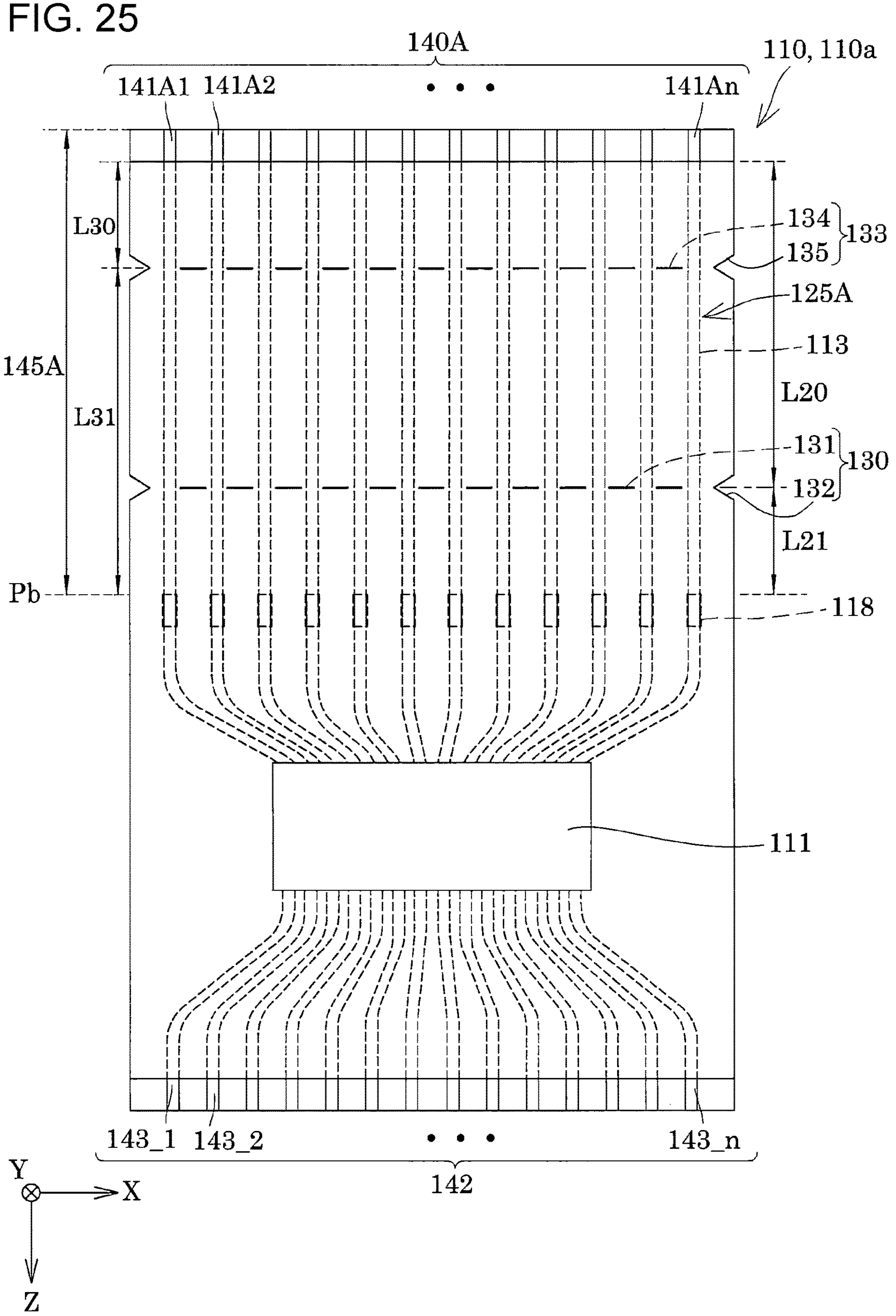
FIG. 25 is a plan view of a wiring member illustrating a modification example of the fourth modification example in the first embodiment.

As illustrated in FIG. 25, the fragile portion 130 may be provided at the end portion 145A at a position closer to the body portion 144 than the terminal group 140A. That is, the distance L20 may be longer than the distance L21. In this case, since the end portion 145A is cut at the fragile portion 130, and then the unnecessary end portion 145A remaining on the wiring member 110 can be shortened, it is possible to suppress an occurrence of a situation in which the remaining portion of the unused end portion 145A functions as an obstacle when the head chip 2 is reused.

As illustrated in FIG. 25, when the fragile portion 130 is provided at the end portion 145A at the position closer to the body portion 144 than the terminal group 140A, a fragile portion 133 may be further provided between the body portion 144 and the terminal group 140A, that is, between the first branch terminal group 118 and the terminal group 140A.

As illustrated in FIG. 25, the wiring member 110 includes the fragile portion 130 and the fragile portion 133 at the end portion 145A. That is, the fragile portion 130 and the fragile portion 133 are provided between the first branch terminal group 118 and the terminal group 140A.

The fragile portion 133 includes a perforated line 134 and a notch 135 which are the same as those of the fragile portion 130. The fragile portion 133 is disposed at a position close to the terminal group 140A, that is, a position closer to the terminal group 140A than the first branch terminal group 118. That is, in the extending direction of the wiring 113, a distance L30 between the fragile portion 133 and the terminal group 140A is shorter than a distance L31 between the fragile portion 133 and the first branch terminal group 118.

Since the end portion 145A has the fragile portion 130 and the fragile portion 133 as described above, it is possible to easily cut the end portion 145A at two locations of the fragile portion 130 and the fragile portion 133. Therefore, it is possible to shorten the end portion 145A remaining on the body portion 144 by cutting the end portion 145A at the fragile portion 130, and it is possible to shorten the end portion 145A remaining on the relay substrate 210 by cutting the end portion 145A at the fragile portion 133.

The fragile portion 130 illustrated in FIG. 25 in the present modification example is an example of the "first fragile portion", and the fragile portion 133 is an example of a "second fragile portion".

In FIG. 25, only the fragile portion 130 may be provided without providing the fragile portion 133.

In the present modification example, the perforated lines 131 and 134 and the notches 132 and 135 are provided as the fragile portion 130 and the fragile portion 133, but the present disclosure is not particularly limited thereto. For example, the thickness of the wiring member 110 may be partially reduced as the fragile portion 130 and the fragile portion 133. That is, the thickness may be reduced by providing continuous grooves in the X-axis direction in either or both of the base 112 and the cover 114.

In addition, the above-described fragile portion 130 is preferably provided at the end portion 145B and the end portion 145C, and, further preferably, the fragile portion 133 is provided at the end portion 145B and the end portion 145C in addition to the fragile portion 130.

Fifth Modification Example

In a fifth modification example of the first embodiment, the relay substrate 210 of a liquid ejecting head 1 may be configured by a flexible substrate such as an FFC or an FPC having flexibility instead of a rigid substrate. Such a relay substrate 210 includes a body portion having the connector 211, an end portion that is branched from the body portion and includes the terminal group 222α, an end portion that is branched from the body portion and includes the terminal group 222β, and an end portion that is branched from the body portion and includes the terminal group 222γ.

Since not only the wiring member 110 but also the relay substrate 210 has flexibility, when the electrical coupling between the terminal group 140 and the terminal group 222 is cut, it is possible to cut not only the end portion 145 of the wiring member 110 but also the end portion that is branched from the body portion of the relay substrate 210 and includes the terminal group 222.

Second Embodiment

Figure 26:
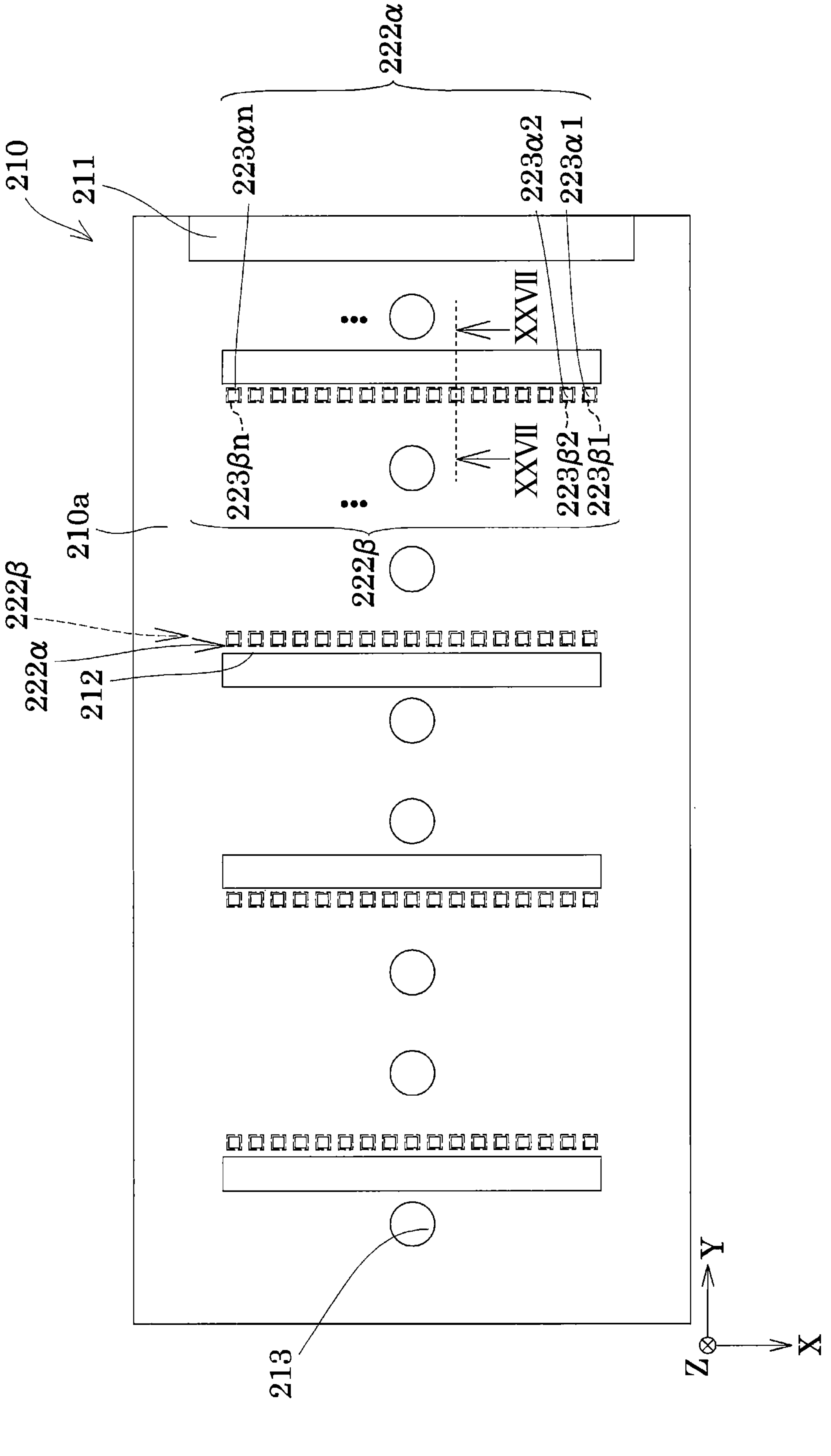
FIG. 26 is a plan view of a relay substrate according to a second embodiment.
Figure 27:
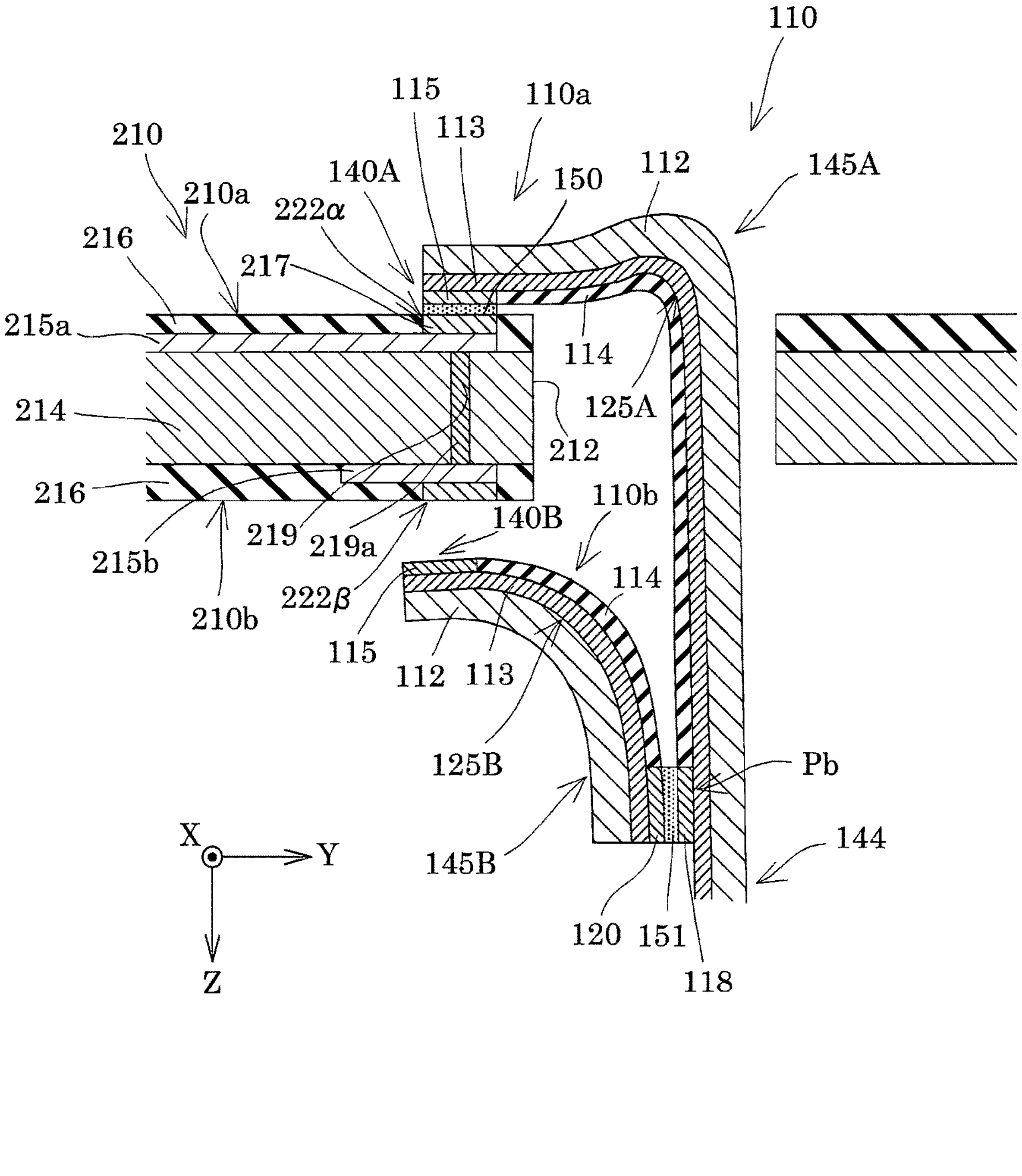
FIG. 27 is a schematic view of the relay substrate and a head chip according to the second embodiment.

FIG. 26 is a plan view of a relay substrate 210 of a liquid ejecting head 1 according to a second embodiment of the present disclosure when viewed in the +Z direction. FIG. 27 is a cross-sectional view of the relay substrate 210 and a wiring member 110 taken along line XXVII-XXVII in FIG. 26.

As illustrated in FIGS. 26 and 27, the relay substrate 210 includes a terminal group 222α provided on a first surface 210*a* facing the −Z direction and a terminal group 222β provided on a second surface 210*b* facing the +Z direction. A wiring 215*a* that is electrically coupled by being directly wired to a connector 211 (not illustrated) is provided on the surface of a base material 214 facing the −Z direction, and a wiring 215*b* is provided on the surface of the base material 214 facing the +Z direction.

The terminal group 222α is configured such that a plurality of terminals 223α are arranged in the +X direction. The terminal group 222β is configured such that a plurality of terminals 223β are arranged in the +X direction. The terminal group 222α and the terminal group 222β are compatible with each other.

The terminal group 222α and the terminal group 222β are disposed at positions overlapping each other when viewed in the Z-axis direction that is the thickness direction of the relay substrate 210. Here, the phrase that the terminal group 222α and the terminal group 222β are disposed at the positions overlapping each other when viewed in the Z-axis direction means that at least portions of a region in which the terminal group 222α is formed and a region in which the terminal group 222β is formed is disposed at an overlapping position when viewed in the Z-axis direction. It is preferable that the region in which the terminal group 222α is formed and the region in which the terminal group 222β is formed are disposed at positions at which the entire regions overlap each other when viewed in the Z-axis direction. As a result, it is possible to reduce the size of the relay substrate 210 by reducing a space for providing the terminal group 222α and the terminal group 222β on the relay substrate 210. It is preferable that the terminals 223 of the terminal 223α forming the terminal group 222α and the terminal 223β forming the terminal group 222β overlap each other when viewed in the Z-axis direction. Thus, it is possible to easily wire each of the terminals 223α1 to 223αn of the terminal group 222α to each of the terminals 223β1 to 223βn of the terminal group 222β via each of a plurality of through-holes 219 that penetrate the base material 214 in the Z-axis direction. That is, in the present embodiment, the terminal 223α of the terminal group 222α and the terminal 223β of the terminal group 222β are wired to each other via the through-hole 219. A coupling wiring 219*a* that couples the wiring 215*a* and the wiring 215*b* is provided inside the through-hole 219. One end of the coupling wiring 219*a* is wired to the terminal 223α, and the other end of the coupling wiring 219*a* is wired to the terminal 223β. As a result, the terminal 223α and the terminal 223β are wired to each other via the coupling wiring 219*a* in the through-hole 219. The wiring 215*b* is electrically coupled to the connector 211 via the wiring 215*a* and the coupling wiring 219*a*. That is, the wiring 215*b* does not need to be directly wired to the connector 211, and thus the wiring 215*b* can be shorter than the wiring 215*a*, and the wiring becomes easy.

In FIG. 27, each terminal 223α of the terminal group 222α, each terminal 223β of the terminal group 222β, and each through-hole 219 are disposed to overlap each other when viewed in the Z-axis direction, but the present disclosure is not limited thereto. That is, each through-hole 219 may be disposed not to overlap each of the terminals 223 forming the terminal group 222α and the terminal group 222β. In order to reuse the relay substrate 210, for example, when the electrical coupling between the terminal group 140A and the terminal group 222α is cut by breaking the adhesion portion or the bonding portion between the terminal group 140A and the terminal group 222α, a portion of the wiring 215*a* of the relay substrate 210 may be peeled off from the base material 214 as illustrated in FIG. 19 in the first embodiment. In this case, when each of the terminals 223 forming the terminal group 222α and the terminal group 222β overlaps each through-hole 219 when viewed in the Z-axis direction, the wiring 215*a* and the coupling wiring 219*a* may be disconnected by peeling off the coupling portion of the wiring 215*a* to the coupling wiring 219*a*. On the other hand, by disposing each through-hole 219 not to overlap each of the terminals 223 forming the terminal group 222α and the terminal group 222β, a portion of the wiring 215*a* coupled to the coupling wiring 219*a* and a portion of the wiring 215*b* coupled to the coupling wiring 219*a* are interposed and covered by a protective material 216. Thus, it is possible to suppress an occurrence of a situation in which the wiring 215*a* and the coupling wiring 219*a* are disconnected. Even when each through-hole 219 does not overlap each of the terminals 223 forming the terminal group 222α and the terminal group 222β, in order to shorten the wiring 215*b* provided at the base material 214, the coupling wiring 219*a* is preferably provided near the terminal group 222β.

The wiring member 110 includes a terminal group 140A and a terminal group 140B that are compatible with each other. In the present embodiment, the wiring member 110 includes a first flexible portion 110*a* and a second flexible portion 110*b*. The first flexible portion 110*a* includes a terminal group 140A and a first branch terminal group 118 on one surface. The second flexible portion 110*b* includes a terminal group 140B and a first coupling terminal group 120 on a surface facing the first flexible portion 110*a*. The first branch terminal group 118 and the first coupling terminal group 120 are wired to each other. In the present embodiment, the first branch terminal group 118 and the first coupling terminal group 120 are bonded to each other via a solder 151. Although not particularly illustrated, a drive-side coupling terminal group 142 is provided at one end portion of the first flexible portion 110*a*, and a drive signal selection circuit 111 is mounted on the wiring 113 between the first branch terminal group 218 and the drive-side coupling terminal group 142.

In the wiring member 110 in the present embodiment, a portion between the drive-side coupling terminal group 142 (not illustrated) of the first flexible portion 110*a* and the first branch terminal group 118 corresponds to a body portion 144, and the wiring 113 from the drive-side coupling terminal group 142 of the body portion 144 to the first branch terminal group 118 corresponds to a common wiring group 126. A portion of the first flexible portion 110*a* from the first branch terminal group 118 to the terminal group 140A corresponds to an end portion 145A, and a plurality of wirings 113 from the first branch terminal group 118 to the terminal group 140A correspond to an individual wiring group 125A.

The second flexible portion 110*b* corresponds to an end portion 145B, and the wiring 113 of the second flexible portion 110*b* corresponds to an individual wiring group 125B.

The end portion of the end portion 145A on the side where the terminal group 140A is provided is drawn out in the −Z direction from the first surface 210*a* of the relay substrate 210 via a wiring insertion hole 212, and the terminal group 140A and the terminal group 222α are adhered or bonded to each other on the first surface 210*a*.

When the terminal group 140A and the terminal group 222α are not adhered or bonded to each other, the terminal group 140B and the terminal group 222β are adhered or bonded to each other on the second surface 210*b*.

As illustrated in FIG. 27, the length from the body portion 144 to the terminal group 140A is different from the length from the body portion 144 to the terminal group 140B. In other words, the length of the end portion 145A is different from the length of the end portion 145B. The terminal group 222β is disposed closer than the terminal group 222α when viewed from a branch position Pb. Therefore, by making the length of the end portion 145B shorter than the length of the end portion 145A, the end portion 145B does not have to be wastefully made.

By providing the terminal group 222α on the first surface 210*a* and providing the terminal group 222β on the second surface 210*b* as described above, the terminal group 222α and the terminal group 222β that are disposed at the same positions and corresponds to the head chip 2 when viewed from the relay substrate 210 are disposed apart from each other. Thus, it is possible to easily perform work of electrically coupling or separating the terminal group 222α and the terminal group 140A and work of electrically coupling or separating the terminal group 222β and the terminal group 140B.

Further, by disposing the terminal group 222α and the terminal group 222β at overlapping positions when viewed in the Z-axis direction, it is possible to reduce the size of the relay substrate 210 by reducing a space for providing the terminal group 222α and the terminal group 222β on the relay substrate 210.

Further, by wiring the terminal group 222α and the terminal group 222β to each other via the through-hole 219, it is possible to easily handle the coupling wiring 219*a* for coupling the terminal group 222α and the terminal group 222β. Therefore, a space for handling the coupling wiring 219*a* with the first surface 210*a* and the second surface 210*b* is reduced, and thus it is possible to further reduce the size of the relay substrate 210.

In the present embodiment, the terminal group 140A is an example of a "first terminal group A", and the terminal group 140B is an example of a "first terminal group B". The terminal group 222α is an example of a "first terminal group α", and the terminal group 222β is an example of a "first terminal group β". Further, the end portion 145A is an example of a "first end portion", and the end portion 145B is an example of a "second end portion".

In the present embodiment, the wiring 215*b* is wired to the connector 211 via the coupling wiring 219*a* and the wiring 215*a*. For example, when the connector 211 is disposed on the second surface 210*b*, the wiring 215*a* may be wired to the connector 211 via the coupling wiring 219*a* and the wiring 215*b*.

Third Embodiment

Figure 28:
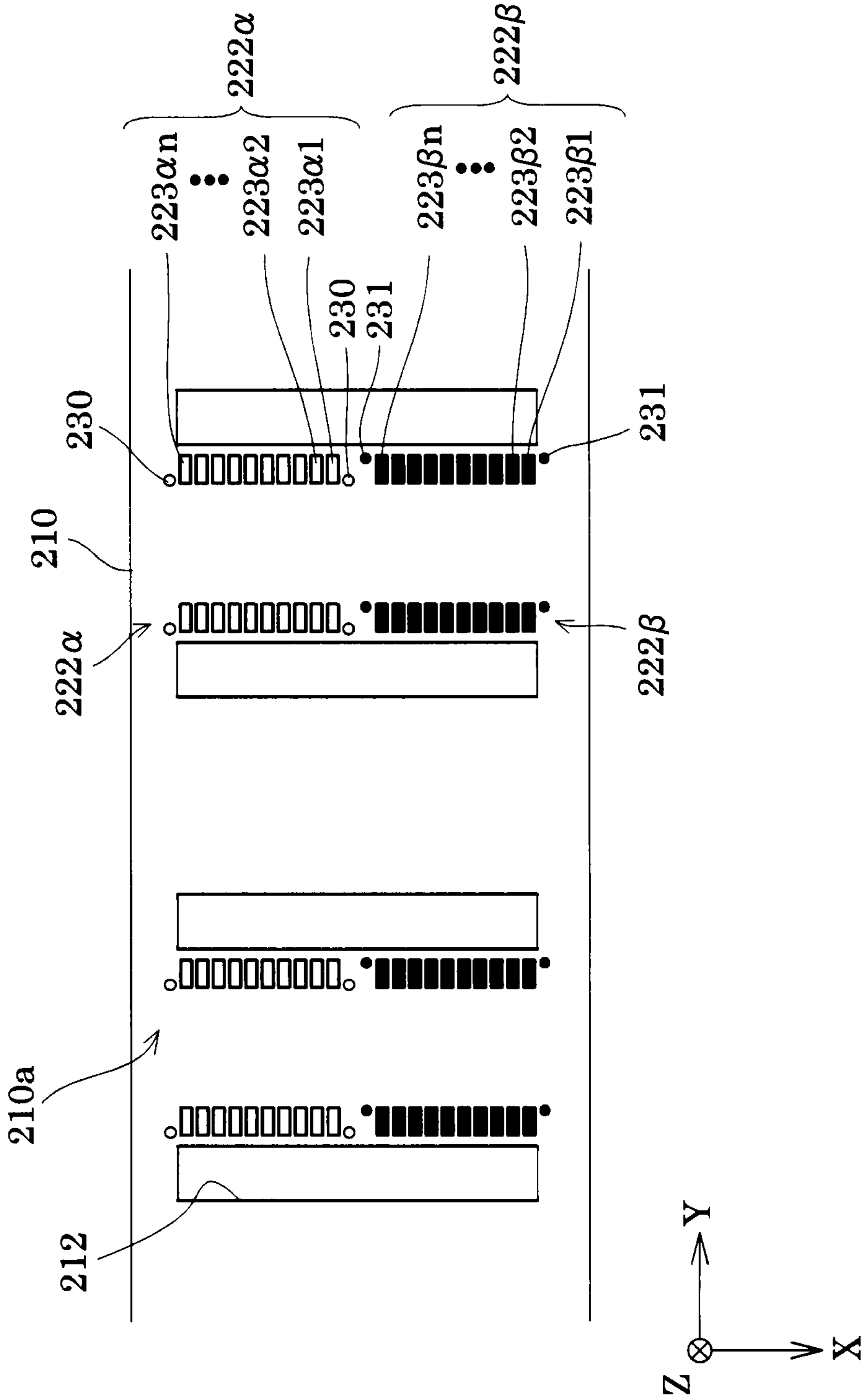
FIG. 28 is a plan view of a relay substrate according to a third embodiment.
Figure 29:
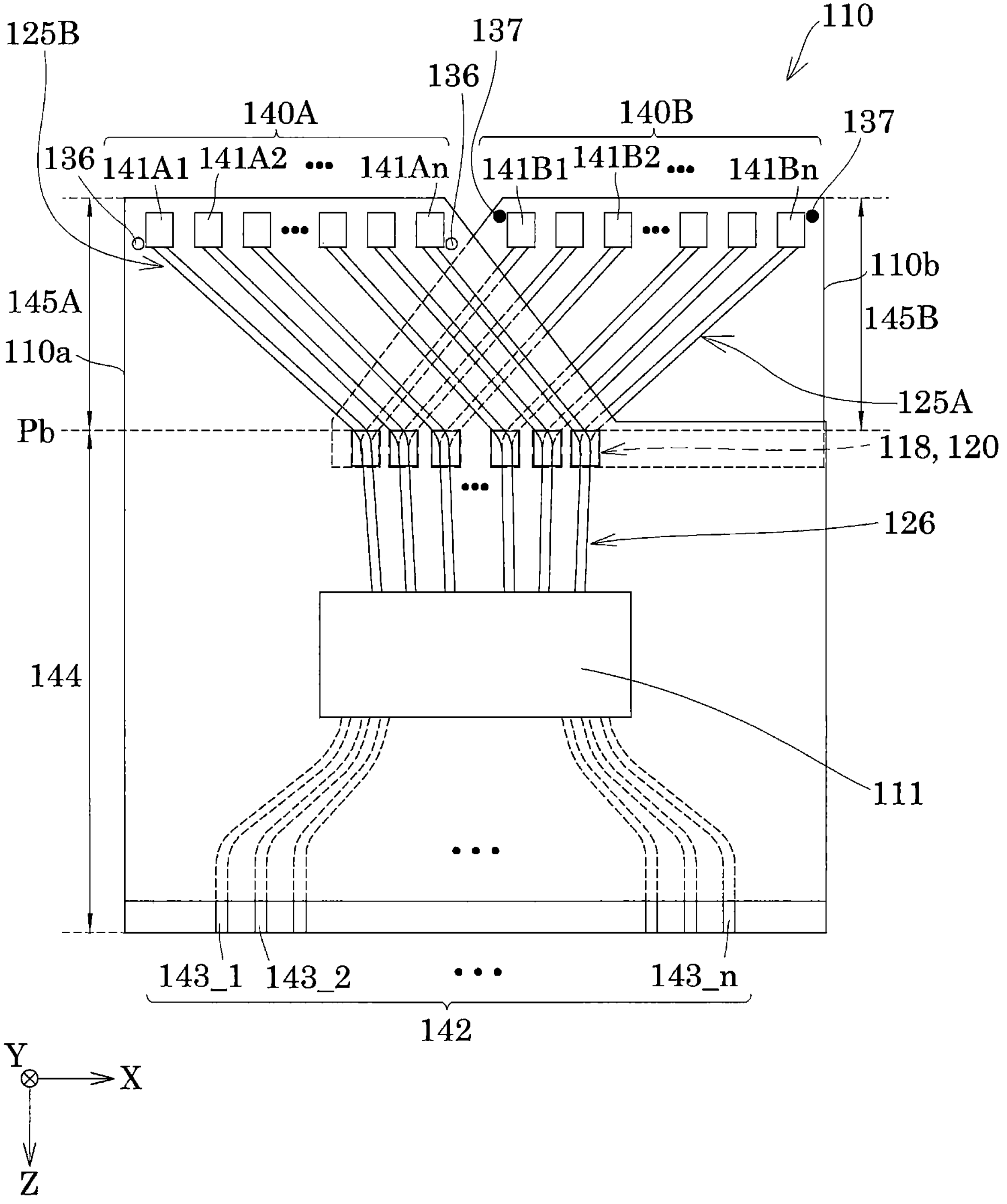
FIG. 29 is a plan view of a wiring member according to the third embodiment.

FIG. 28 is a plan view of a relay substrate 210 of the liquid ejecting head 1 according to a third embodiment of the present disclosure. FIG. 29 is a plan view of a wiring member 110. The same reference signs will be given to the same members as those in the above-described embodiment, and overlapping description thereof will be omitted.

As illustrated in FIG. 28, in the relay substrate 210, a terminal group 222α and a terminal group 222β are arranged in the X-axis direction on one side of a wiring insertion hole 212 in the Y-axis direction. The terminal group 222α and the terminal group 222β are compatible with each other.

The terminal group 222α is disposed such that a plurality of terminals 223α are arranged in the X-axis direction. A first mark 230 for positioning a terminal group 140A of a wiring member 110 with respect to the terminal group 222α is provided on each of both sides of the terminal group 222α in the X-axis direction. As illustrated in FIG. 29, the wiring member 110 is provided with a second mark 136 corresponding to the first mark 230. The terminal group 140A and the terminal group 222α are positioned by positioning the wiring member 110 such that the second mark 136 overlaps the first mark 230 of the relay substrate 210.

A plurality of terminals 223β are arranged in the X-axis direction in the terminal group 222β. A third mark 231 for positioning a terminal group 140B of the wiring member 110 with respect to the terminal group 222β is provided on each of both sides of the terminal group 222β in the X-axis direction. As illustrated in FIG. 29, the wiring member 110 is provided with a fourth mark 137 corresponding to the third mark 231. The terminal group 140B and the terminal group 222β are positioned by positioning the wiring member 110 such that the fourth mark 137 overlaps the third mark 231 of the relay substrate 210.

As illustrated in FIG. 29, the wiring member 110 includes the terminal group 140A and the terminal group 140B. Each of the terminal group 140A and the terminal group 140B is configured by arranging a plurality of terminals 141 in the X-axis direction. The terminal group 140A and the terminal group 140B are arranged in the X-axis direction. The terminal group 140A and the terminal group 140B are compatible with each other. In the present embodiment, the wiring member 110 includes a first flexible portion 110*a* and a second flexible portion 110*b*, and a first branch terminal group 118 of the first flexible portion 110*a* is wired to a first coupling terminal group 120 of the second flexible portion 110*b*. As illustrated in FIG. 29, the second flexible portion 110*b* is disposed on the surface of the first flexible portion 110*a* in the −Z direction.

In the wiring member 110 in the present embodiment, a portion between a drive-side coupling terminal group 142 of the first flexible portion 110*a* and a first branch terminal group 118 corresponds to a body portion 144, and the wiring 113 from the drive-side coupling terminal group 142 of the body portion 144 to the first branch terminal group 118 corresponds to a common wiring group 126. A portion of the first flexible portion 110*a* from the first branch terminal group 118 to the terminal group 140A corresponds to an end portion 145A, and a plurality of wirings 113 from the first branch terminal group 118 to the terminal group 140A correspond to an individual wiring group 125A. The second flexible portion 110*b* corresponds to an end portion 145B, and the wiring 113 of the second flexible portion 110*b* corresponds to an individual wiring group 125B.

Even in such a configuration, as in the first embodiment described above, by providing the plurality of terminal groups 140 in the head chip 2, it is possible to reuse the head chip 2 by electrically separating the head chip 2 and the relay substrate 210 from each other.

Further, by providing the plurality of terminal groups 222 for the relay substrate 210, it is possible to reuse the relay substrate 210 by electrically separating the head chip 2 and the relay substrate 210 from each other. Further, even when a failure occurs in a portion of the relay substrate 210 or the head chip 2, it is possible to easily perform so-called refurbished work of replacing only the failed component and regenerating the liquid ejecting head 1.

By arranging terminal group 222α and the terminal group 222β in the X-axis direction on the same first surface 210*a* of the relay substrate 210, the terminal group 222α and the terminal group 222β that are disposed at the same positions and corresponds to the head chip 2 when viewed from the relay substrate 210 are disposed apart from each other. Thus, it is possible to easily perform work of electrically coupling or separating the terminal group 222α and the terminal group 140A and work of electrically coupling or separating the terminal group 222β and the terminal group 140B.

In the present embodiment, the terminal group 140A is an example of a "first terminal group A", and the terminal group 140B is an example of a "first terminal group B". The terminal group 222α is an example of a "first terminal group α", and the terminal group 222β is an example of a "first terminal group β". The X-axis direction is an example of a "first direction".

First Modification Example

Figure 30:
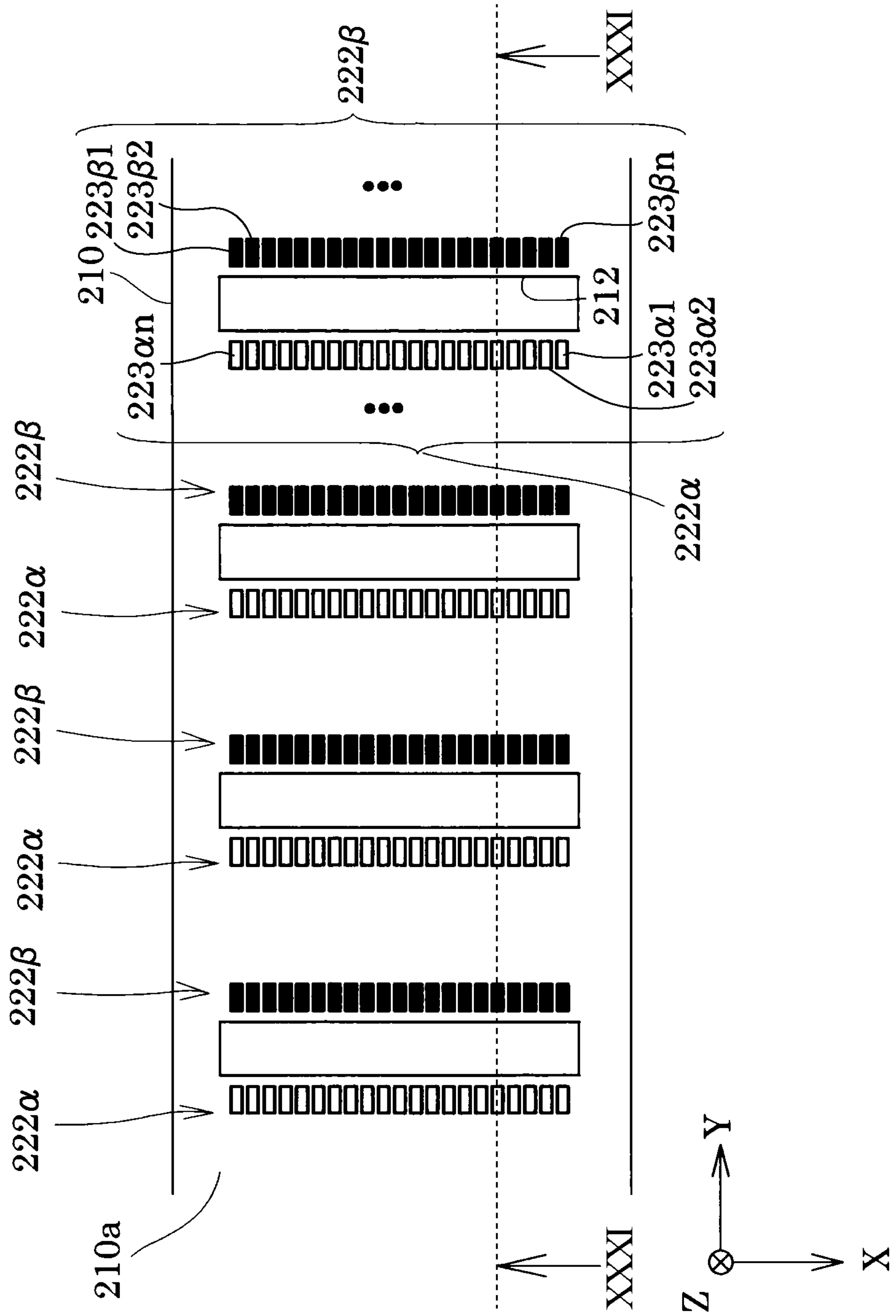
FIG. 30 is a plan view of a relay substrate in a first modification example of the third embodiment.
Figure 31:
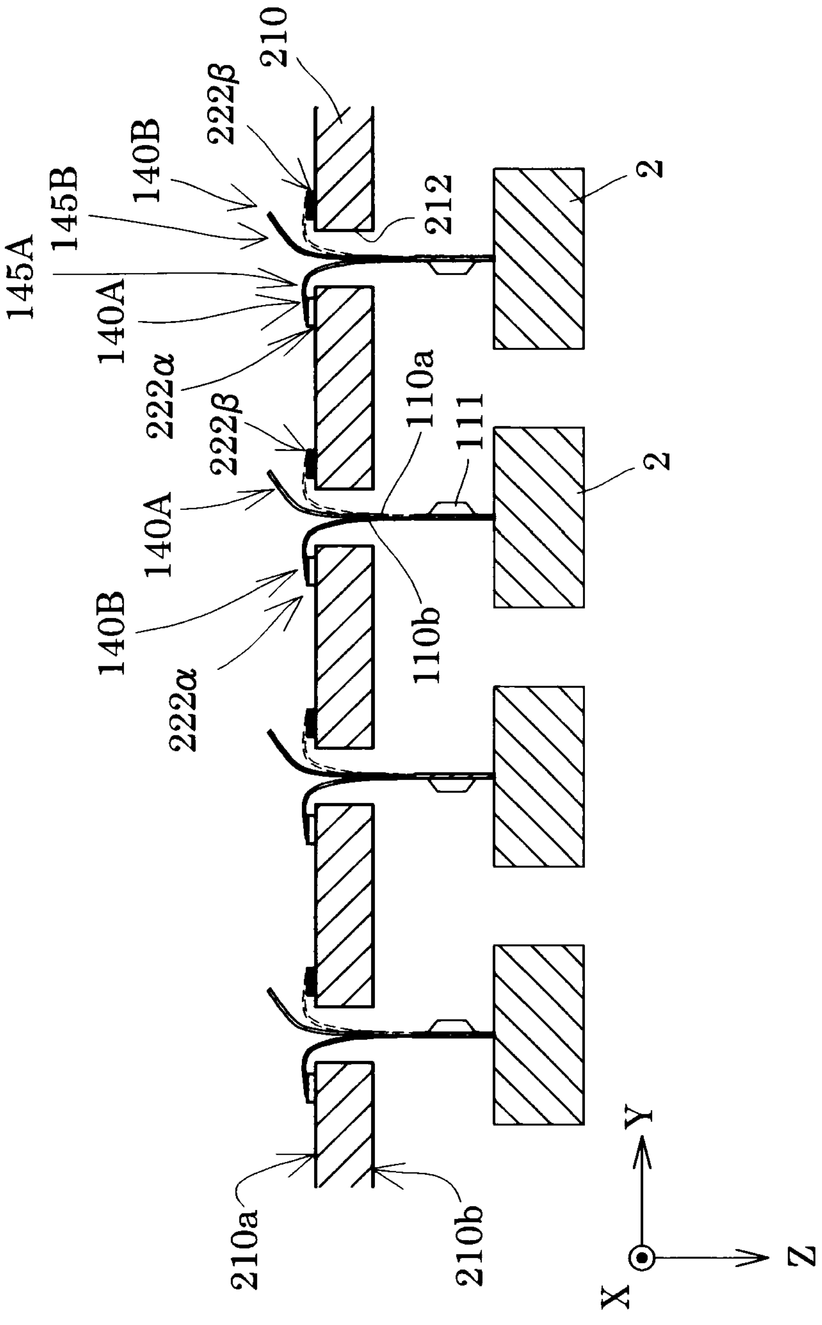
FIG. 31 is a cross-sectional view of the relay substrate and a head chip in the first modification example of the third embodiment.

FIG. 30 is a plan view of a relay substrate 210 illustrating a first modification example of the liquid ejecting head 1 in the third embodiment. FIG. 31 is a cross-sectional view of the main portion of the relay substrate 210 and a head chip 2 taken along line XXXI-XXXI in FIG. 30.

As illustrated in FIGS. 30 and 31, a terminal group 222α in which a plurality of terminals 223α are arranged side by side in the X-axis direction is provided in the −Y direction of the wiring insertion hole 212 of the relay substrate 210, and a terminal group 222β in which a plurality of terminals 223β are arranged side by side in the X-axis direction is provided in the +Y direction of the wiring insertion hole 212. That is, the terminal group 222α and the terminal group 222β are disposed on the first surface 210*a* of the relay substrate to interpose the wiring insertion hole 212 in the Y-axis direction. With such an arrangement, the terminal group 222α and the terminal group 222β that are disposed at the same positions and corresponds to the head chip 2 when viewed from the relay substrate 210 are disposed apart from each other. Thus, it is possible to easily perform work of electrically coupling or separating the terminal group 222α from the terminal group 140A or the terminal group 140B and work of electrically coupling or separating the terminal group 222β from the terminal group 140A or the terminal group 140B.

In the head chip 2 disposed at the end in the +Y direction in FIG. 31, the terminals 141A1, 141A2, . . . , and 141An are arranged in this order in the −X direction, and the terminals 141B1, 141B2, . . . , and 141Bn are arranged in this order in the +X direction. On the other hand, in the head chip 2 disposed second from the end in the +Y direction in FIG. 31, the terminals 141A1, 141A2, . . . , and 141An are arranged in this order in the +X direction, and the terminals 141B1, 141B2, . . . , and 141Bn are arranged in this order in the −X direction. That is, the head chip 2 disposed at the end in the +Y direction and the head chip 2 disposed second from the end in the +Y direction are disposed to be inverted by 180 degrees when viewed in the Z-axis direction. In the head chip 2 disposed second from the end in the +Y direction, the terminal group 140A is wired to the terminal group 222β of the relay substrate 210.

In order to distinguish the n pieces of terminals 141A included in the terminal group 140A, the terminal 141A arranged at the m-th position when the terminal 141A1 is set as the first terminal may be described as a terminal 141Am. The variable m is an integer satisfying 1 or more and n or less. It is assumed that the terminal 141Bm, the terminal 223αm, and the terminal 223βm are defined similarly to the terminal 141Am. The terminal 141Am and the terminal 141Bm are wired to the same wiring 113 of the common wiring group 126. The terminal 223αm and the terminal 223βm are wired to the same wiring 215 among the plurality of wirings 215 provided in the relay substrate 210. Therefore, when the terminal group 140A is electrically coupled to the terminal group 222α or the terminal group 222β, the terminal 141Am is electrically coupled to the terminal 223αm or the terminal 223βm. When the terminal group 140B is electrically coupled to the terminal group 222α or the terminal group 222β, the terminal 141Bm is electrically coupled to the terminal 223αm or the terminal 223βm.

The terminal group 222α and the terminal group 222β are disposed to be substantially point-symmetrical with the wiring insertion hole 212 of the relay substrate 210 interposed therebetween. The phrase that the terminal group 222α and the terminal group 222β are disposed to be substantially point-symmetrical to each other means that the terminals 223α1 to 223αn forming the terminal group 222α and the terminals 223β1 to 223βn forming the terminal group 222β are disposed such that the arrangement of the terminals 223α1 to 223αn and the arrangement of the terminals 223β1 to 223βn are point-symmetrical to each other. In the present embodiment, the terminals 223α1 to 223αn of the terminal group 222α are arranged in the −X direction, and the terminals 223β1 to 223βn of the terminal group 222β are arranged in the +X direction. By disposing the terminal group 222α and the terminal group 222β to be point-symmetrical to each other as described above, even when the head chip 2 is rotated by 180 degrees along the XY plane defined by the X-axis and the Y-axis, it is possible to electrically couple the terminal 141Am to the terminal 223αm or the terminal 223βm, and to electrically couple the terminal 141Bm to the terminal 223αm or the terminal 223βm. As a result, it is possible to couple the terminal groups 140A and 140B of the wiring member 110 to the terminal groups 222α and 222β of the relay substrate 210.

In the present modification example, when the head chip 2 disposed at the end in the +Y direction illustrated in FIG. 31 is referred to as a "first head chip", and the wiring member 110 of the head chip 2 disposed at the end in the +Y direction is set as a "first wiring member", the wiring insertion hole 212 disposed at the end in the +Y direction is an example of an "opening through which the first wiring member is inserted", the X-axis direction is an example of a "first direction", and the Y-axis direction is an example of a "second direction".

Further, the terminal group 222α and the terminal group 222β may not be disposed to be substantially point-symmetrical with the wiring insertion hole 212 of the relay substrate 210 interposed therebetween, and a direction in which the terminals 223α1 to 223αn of the terminal group 222α are arranged may be the same as a direction in which the terminals 223β1 to 223βn of the terminal group 222β are arranged. The same applies to a direction in which the terminals 141A forming the terminal group 140A are arranged and a direction in which the terminals 141B forming the terminal group 140B are arranged.

In the first modification example of the third embodiment, the terminal group 222α and the terminal group 222β are disposed on the same surface of the relay substrate 210 to interpose the wiring insertion hole 212 in the Y-axis direction orthogonal to the X-axis direction in which the plurality of terminals 141 are arranged. The present disclosure is not limited thereto. For example, the terminal group 222α and the terminal group 222β may be disposed on the same surface of the relay substrate 210 to interpose the wiring insertion hole 212 in a direction intersecting both the Y-axis direction and the X-axis direction in which the plurality of terminals 141 are arranged. Further, the terminal group 222α and the terminal group 222β are disposed on the first surface 210*a* of the relay substrate 210, but may be disposed on the second surface 210*b*.

Second Modification Example

Figure 32:
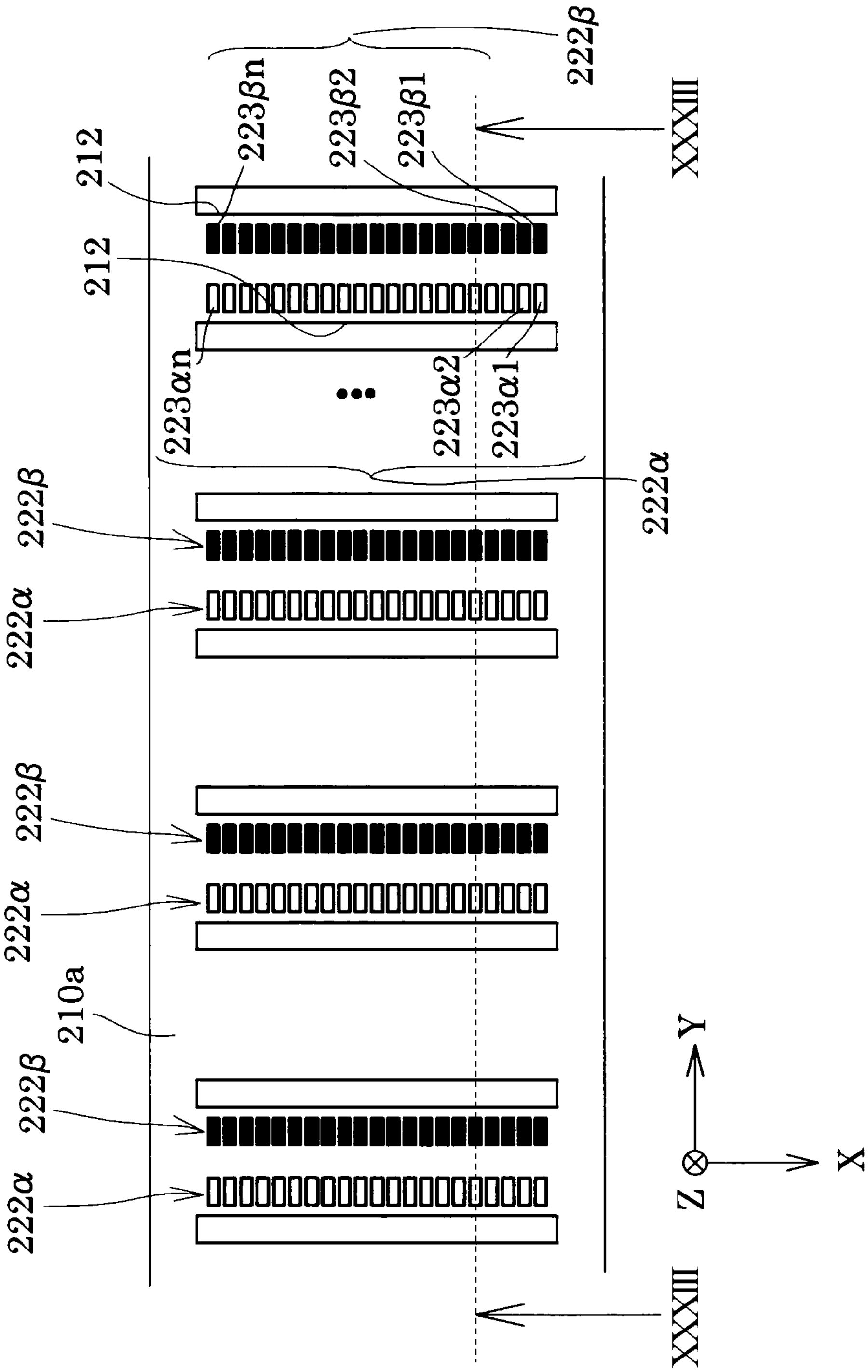
FIG. 32 is a plan view of a relay substrate in a second modification example of the third embodiment.
Figure 33:
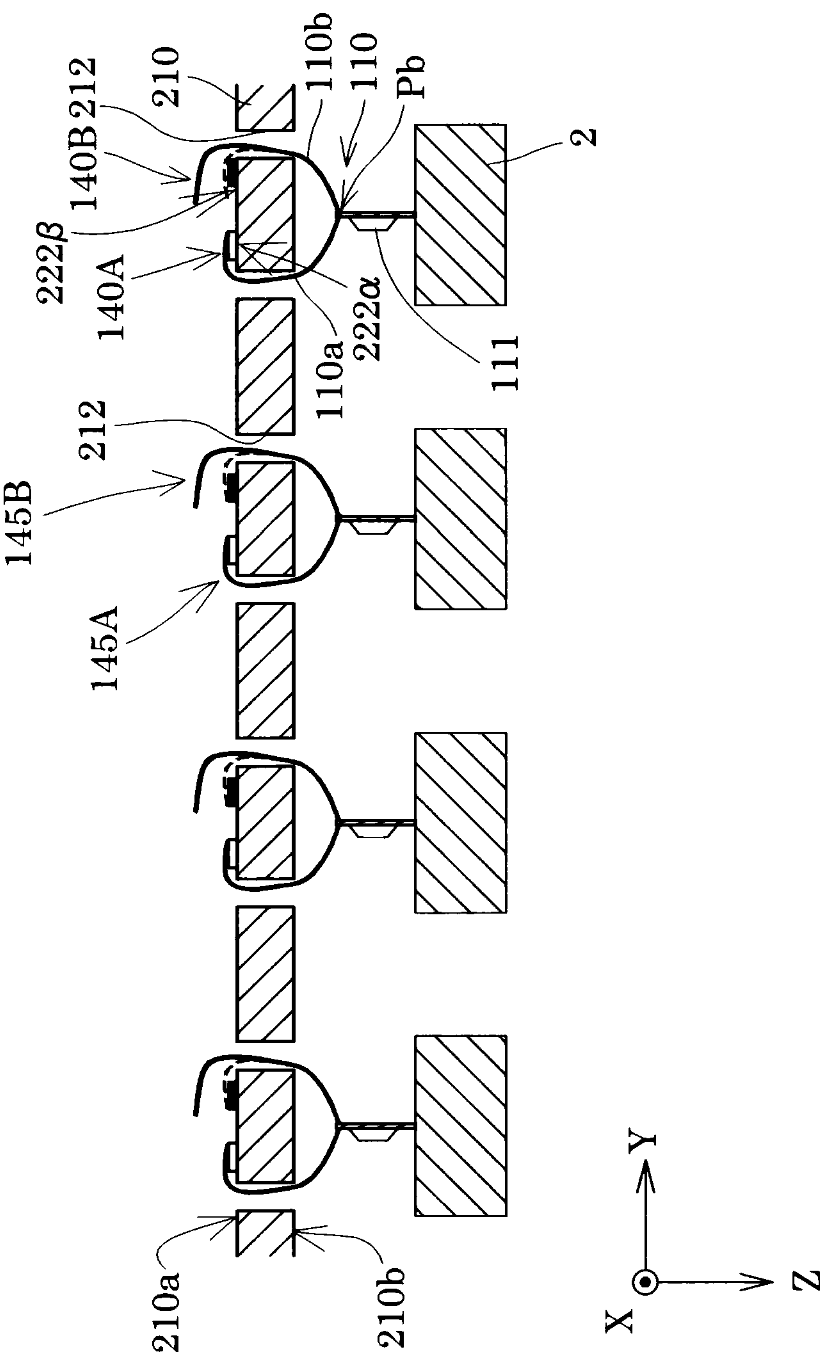
FIG. 33 is a cross-sectional view of the relay substrate and a head chip in the second modification example of the third embodiment.

FIG. 32 is a plan view of a relay substrate 210 illustrating a second modification example of the liquid ejecting head 1 in the third embodiment. FIG. 33 is a cross-sectional view of the main portion of the relay substrate 210 and a head chip 2 taken along line XXXIII-XXXIII in FIG. 32.

A terminal group 140A and a terminal group 140B that are compatible with each other are disposed on surfaces of the wiring member 110 facing each other. That is, the wiring member 110 includes an end portion 145A and an end portion 145B. The terminal group 140A is provided on the surface of the end portion 145A facing the end portion 145B, and the terminal group 140B is provided on the surface of the end portion 145B facing the end portion 145A.

As illustrated in FIGS. 32 and 33, the terminal group 222α and the terminal group 222β that are compatible with each other are arranged side by side in the Y-axis direction on the first surface 210*a* of the relay substrate 210. A plurality of terminals 223α of the terminal group 222α are arranged in the X-axis direction. A plurality of terminals 223β of the terminal group 222β are arranged in the X-axis direction. In addition, the relay substrate 210 is provided with two wiring insertion holes 212 at positions interposing the terminal group 222α and the terminal group 222β in the Y-axis direction. The wiring insertion hole 212 is provided to penetrate the relay substrate 210 from the first surface 210*a* to the second surface 210*b*. In other words, the terminal group 222α and the terminal group 222β that can be electrically coupled to the head chips 2 disposed at the same position when viewed from the relay substrate 210 are disposed between the two wiring insertion holes 212 in the Y-axis direction. The end portion 145A is inserted into the wiring insertion hole 212 located in the −Y direction with respect to the terminal groups 222α and 222β, and thus the terminal group 140A and the terminal group 222α are adhered or bonded to each other. Further, the end portion 145B is inserted into the wiring insertion hole 212 located in the +Y direction with respect to the terminal groups 222α and 222β, and thus the terminal group 140B and the terminal group 222β are adhered or bonded to each other. With such an arrangement, it is possible to separately provide the wiring insertion hole 212 through which the end portion 145A is inserted and the wiring insertion hole 212 through which the end portion 145B is inserted. Therefore, it is possible to easily perform the work of electrically coupling or separating the terminal group 222α and the terminal group 140A and the work of electrically coupling or separating the terminal group 222β and the terminal group 140B.

In the present modification example, the X-axis direction is an example of the "first direction", and the Y-axis direction is an example of the "second direction". One of the two wiring insertion holes 212 interposing the terminal group 222α and the terminal group 222β that are compatible with each other in the Y-axis direction corresponds to a "first opening", and the other corresponds to a "second opening".

The wiring insertion hole 212 disposed at the end in the +Y direction among the plurality of wiring insertion holes 212 may be a notch that opens in the +Y direction when viewed in the Z-axis direction. Similarly, the wiring insertion hole 212 disposed at the end in the −Y direction among the plurality of wiring insertion holes 212 may be a notch that opens in the −Y direction when viewed in the Z-axis direction.

Such a notch is an example of the "first opening" or the "second opening".

In the second modification example of the third embodiment, the terminal group 222α and the terminal group 222β are arranged between the two wiring insertion holes 212 in the Y-axis direction orthogonal to the X-axis direction in which the plurality of terminals 141 are arranged, on the same surface of the relay substrate 210. The present disclosure is not limited thereto. For example, the terminal group 222α and the terminal group 222β may be arranged between the two wiring insertion holes 212 on the same surface of the relay substrate 210 in a direction intersecting both the Y-axis direction and the X-axis direction in which the plurality of terminals 141 are arranged. Further, the terminal group 222α and the terminal group 222β are disposed on the first surface 210*a* of the relay substrate 210, but may be disposed on the second surface 210*b*.

Fourth Embodiment

Figure 34:
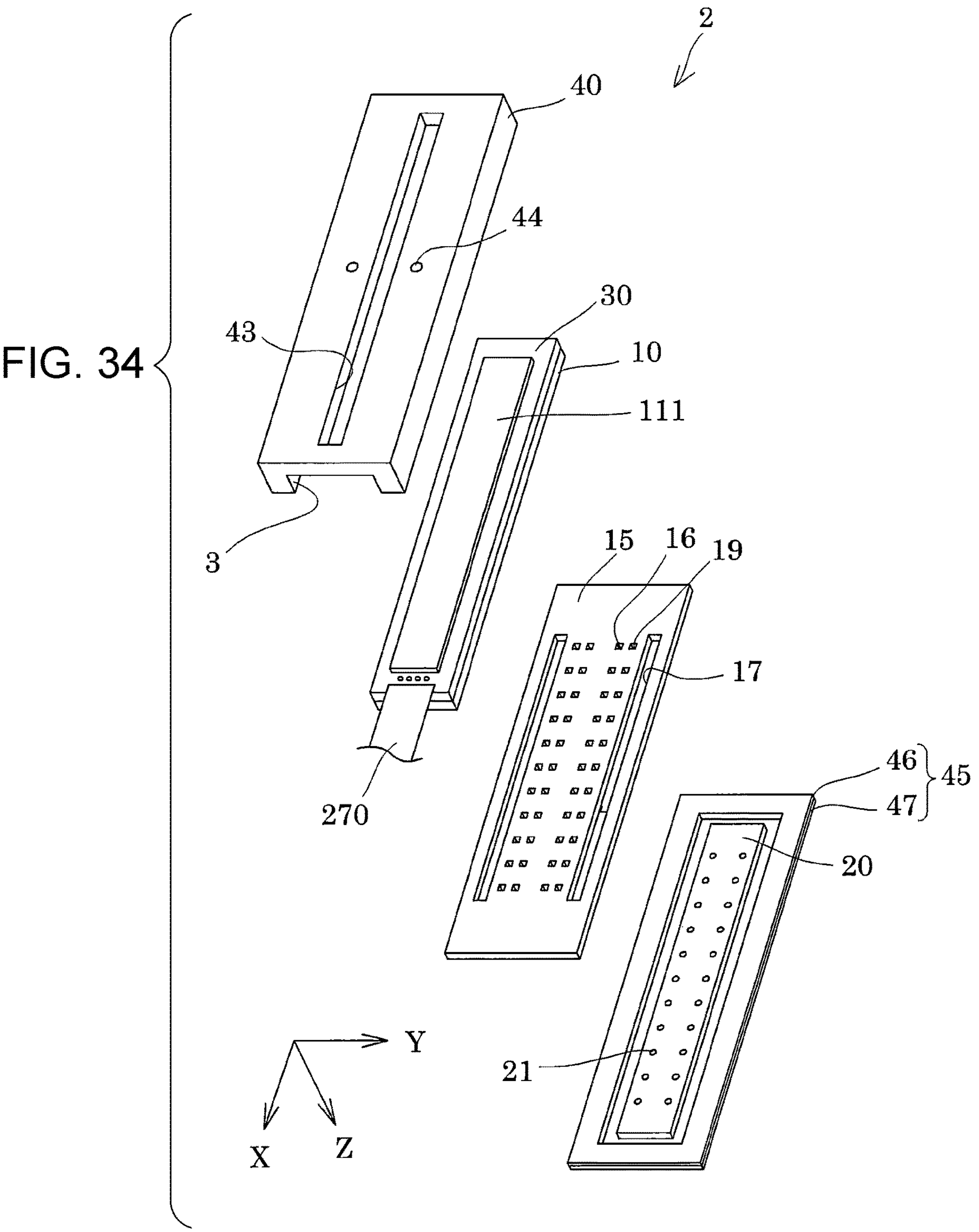
FIG. 34 is an exploded perspective view of a head chip according to a fourth embodiment.
Figure 35:
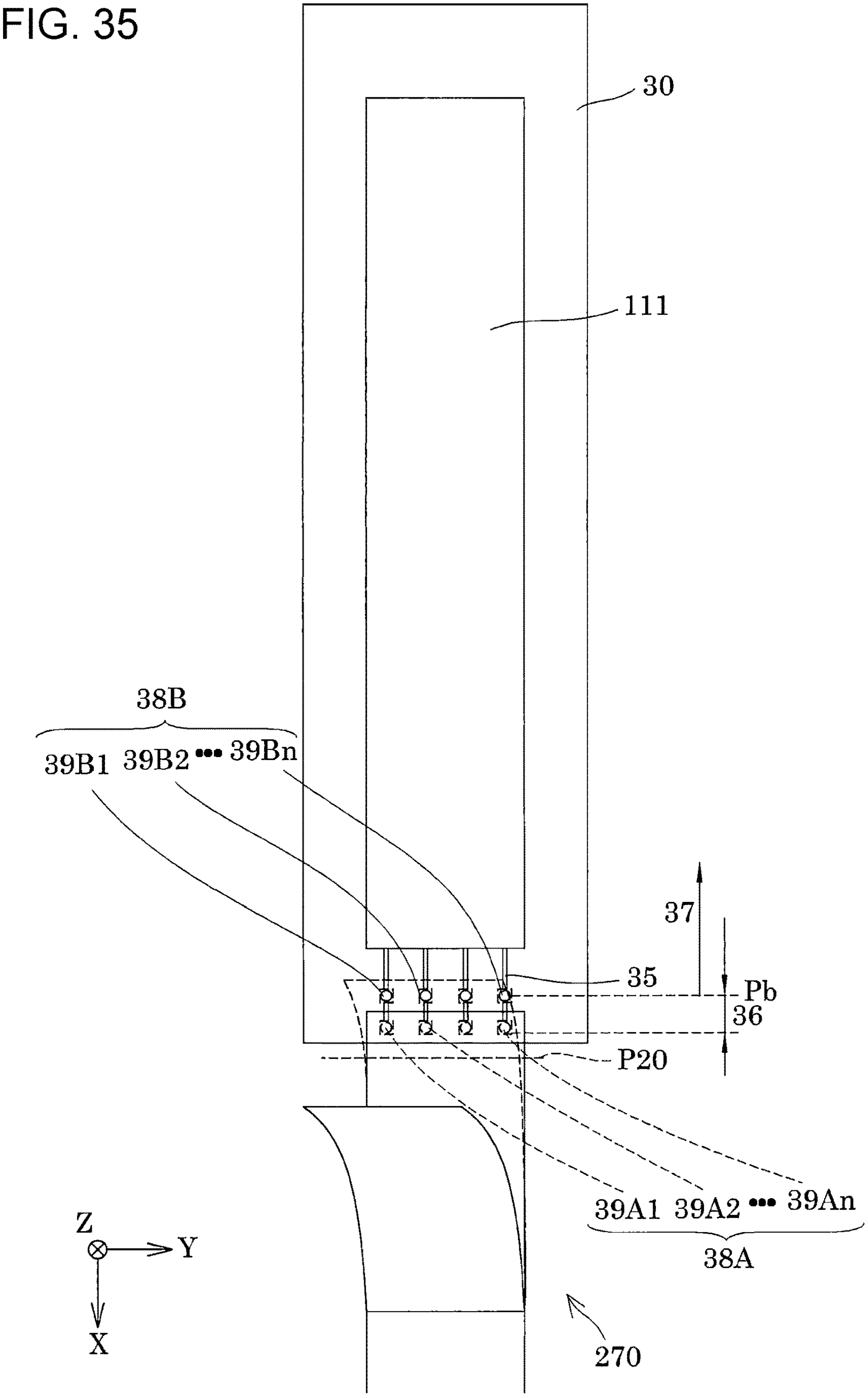
FIG. 35 is a plan view of a protective substrate and a wiring member according to the fourth embodiment.
Figure 36:
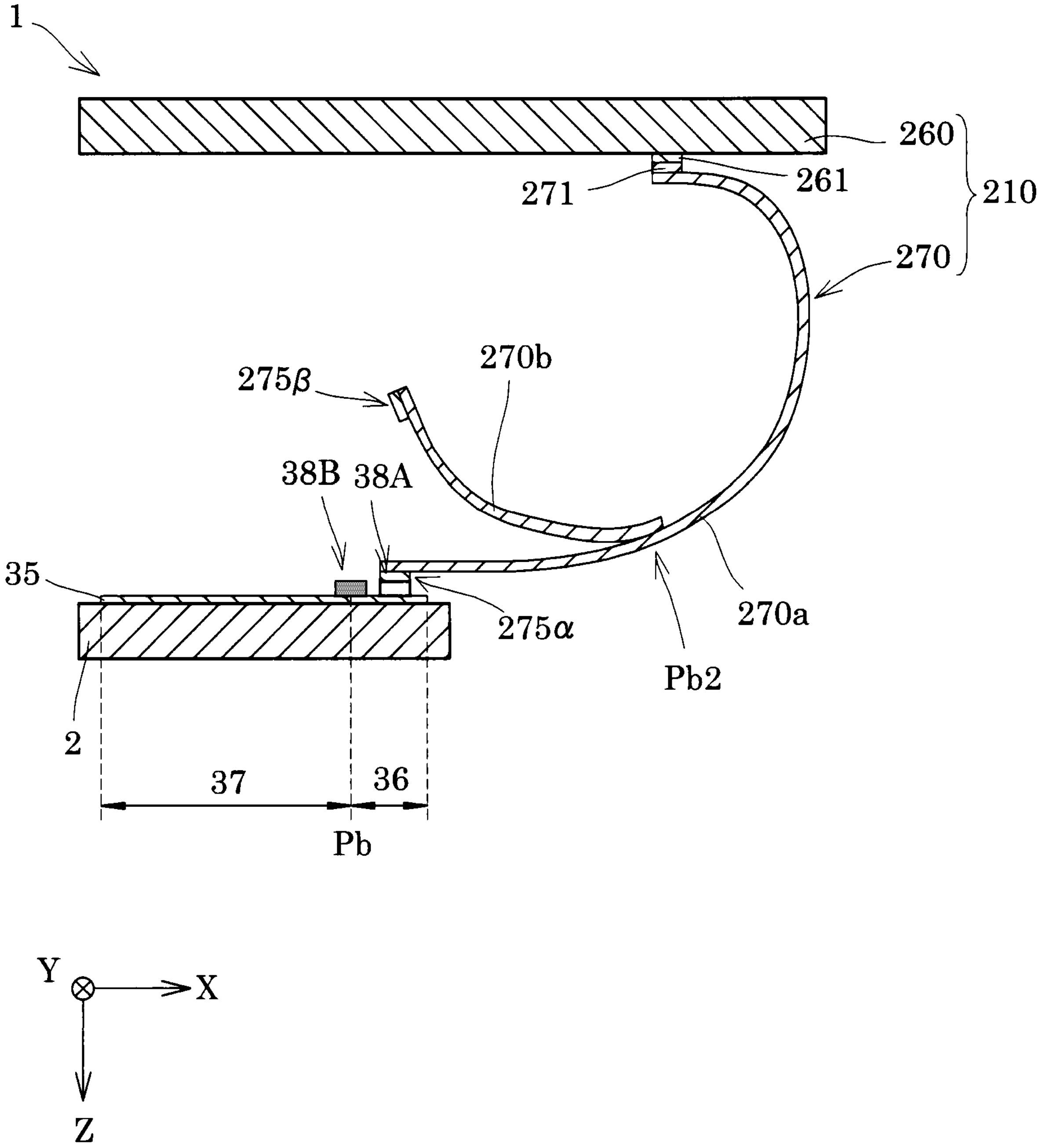
FIG. 36 is a schematic view of a relay substrate and the head chip according to the fourth embodiment.

FIG. 34 is an exploded perspective view of a head chip 2 of a liquid ejecting head 1 according to a fourth embodiment of the present disclosure. FIG. 35 is a plan view of a protective substrate 30 and a second substrate 270. FIG. 36 is a view schematically illustrating a relay substrate 210 and the head chip 2. The same reference signs will be given to the same members as those in the above-described embodiment, and overlapping description thereof will be omitted.

As illustrated in FIGS. 34 to 36, a drive signal selection circuit 111 is mounted on the surface of the protective substrate 30 facing the −Z direction in the head chip 2 of the liquid ejecting head 1. The drive signal selection circuit 111 may be provided on the second substrate 270 to be described later. The present embodiment is different from the first embodiment in that the protective substrate 30 is a substrate including an electrical element such as a wiring. Although not particularly illustrated, the drive signal selection circuit 111 and a piezoelectric actuator 300 are wired by wire bonding, a wiring provided on the surface of the protective substrate 30, or the like.

A plurality of wirings 35, and a terminal group 38A and a terminal group 38B wired by the wirings 35 are provided on the surface of such a protective substrate 30 facing the −Z direction. The terminal group 38A includes a plurality of terminals 39A1 to 39An arranged side by side in the Y-axis direction. The terminal group 38B includes a plurality of terminals 39B1 to 39Bn arranged side by side in the Y-axis direction. The terminal group 38A and the terminal group 38B are arranged in the −X direction in this order. Further, the terminal group 38A and the terminal group 38B are compatible with each other. When the terminal groups 38A and 38B are not distinguished from each other, the terminal groups 38A and 38B are referred to as a terminal group 38. The plurality of wirings 35 include a common wiring group 37 wired in common to the terminal group 38A and the terminal group 38B, and an individual wiring group 36 wired to the terminal group 38A by being branched from the common wiring group 37 at a branch position Pb. The common wiring group 37 is a portion to the terminal group 38B from a portion coupled to the piezoelectric actuator 300 (not illustrated). The individual wiring group 36 is a portion from the terminal group 38B to the terminal group 38A.

A relay substrate insertion hole 3 through which the relay substrate 210 adhered or bonded to the terminal group 38 is inserted is provided on the side surface of the head chip 2.

As illustrated in FIG. 36, the relay substrate 210 includes a first substrate 260 and the second substrate 270. The first substrate 260 is formed of a hard rigid substrate. The second substrate 270 is a flexible substrate such as an FFC and an FPC. One end of the second substrate 270 is wired to a relay terminal group 261 of the first substrate 260. The second substrate 270 includes a terminal group 275α and a terminal group 275β. When the terminal groups 275α and 275β are not distinguished from each other, the terminal groups 275α and 275β are referred to as a terminal group 275. The second substrate 270 includes a first flexible portion 270*a* and a second flexible portion 270*b*, similarly to the wiring member 110 in the first embodiment.

The first flexible portion 270*a* is provided with a wiring group configured by a plurality of wirings (not illustrated). A terminal group at one end of the wiring group serves as a third coupling terminal group 271 wired to the relay terminal group 261 of the first substrate 260. In addition, the other end of the wiring group of the first flexible portion 270*a* on an opposite side of the third coupling terminal group 271 serves as a terminal group 275α. The second flexible portion 270*b* is provided with a wiring group configured by a plurality of wirings (not illustrated), and one end of the wiring group is wired to the wiring group of the first flexible portion 270*a*. The other end of the wiring group of the second flexible portion 270*b* serves as a terminal group 275β. The second flexible portion 170*b* is branched from the first flexible portion 270*a* at a branch position Pb2. The terminal group 275α and the terminal group 275β are compatible with each other.

The terminal group 38A of the head chip 2 is adhered or bonded to the terminal group 275α of the relay substrate 210. The terminal group 38B of the head chip 2 is not adhered or bonded to the relay substrate 210.

Figure 37:
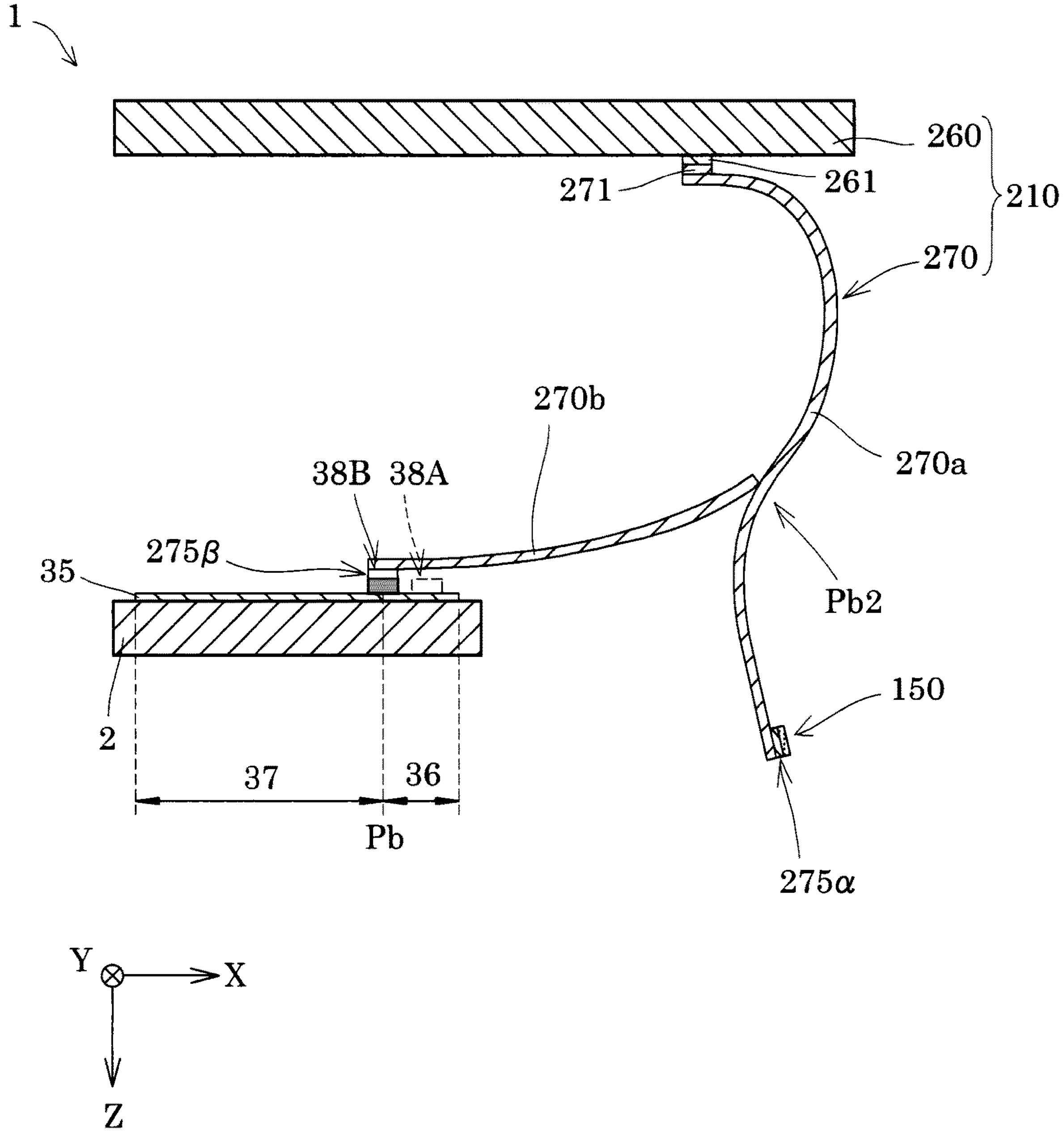
FIG. 37 is an enlarged view of a main portion of the relay substrate and the head chip according to the fourth embodiment.

In such a liquid ejecting head 1, in order to electrically separate the head chip 2 and the relay substrate 210 from each other, the adhesion portion or the bonding portion between the terminal group 38A and the terminal group 275α is broken in the similar manner to FIGS. 15 to 19 in the first embodiment described above. The broken adhesion portion or bonding portion corresponds to a "damaged portion". FIG. 37 schematically illustrates a relay substrate 210 and a head chip 2 of the liquid ejecting head 1 newly manufactured by reusing the above head chip 2 in a manner that the terminal group 38B of the head chip 2 is electrically coupled to the terminal group 275β of another relay substrate 210. The other relay substrate 210 illustrated in FIG. 37 is used in another liquid ejecting head 1. It is assumed that, in order to cut the electrical coupling to the head chip 2 of the other liquid ejecting head 1, the adhesion portion or the bonding portion of the terminal group 275α to the head chip 2 is broken. The other relay substrate 210 may be a new product.

As illustrated in FIG. 37, the protective substrate 30 includes the terminal group 38B electrically coupled to the relay substrate 210 and the common wiring group 37 electrically coupled to the relay substrate 210 by being electrically coupled to the terminal group 38B. That is, the head chip 2 includes the individual wiring group 36 that is branched and wired from the common wiring group 37 at the branch position Pb, but is not electrically coupled to the relay substrate 210, and the "damaged portion" provided at the end portion of the individual wiring group 36 on an opposite side of the branch position Pb.

When the adhesion portion and the bonding portion between the terminal group 38A and the terminal group 275α are broken as in FIG. 18 or FIG. 19, the "damaged portion" is the wiring 35 of the individual wiring group 36 exposed from the surface of the protective substrate 30 facing the −Z direction, similarly to FIG. 18 or 19. In the present embodiment, the common wiring group 37 and the individual wiring group 36 are provided on one surface of the protective substrate 30, but the present embodiment is not particularly limited thereto. The common wiring group 37 and the terminal group 38B, and the individual wiring group 36 and the terminal group 38A may be provided on the different surfaces. That is, the common wiring group 37 and the terminal group 38B may be provided on the surface of the protective substrate 30 facing the −Z direction, and the individual wiring group 36 and the terminal group 38A may be provided on the opposite side of the protective substrate 30, that is, on the surface facing the +Z direction. In this case, the "damaged portion" is the individual wiring group 36 exposed from the surface opposite to the surface of the protective substrate 30 facing the −Z direction.

Although not illustrated, when the adhesion portion and the bonding portion between the terminal group 38A and the terminal group 275α are broken as in FIG. 15, the "damaged portion" includes a solder or a conductive adhesive attached to the terminal group 38A that is the end portion of the individual wiring group 36 provided at the protective substrate 30, as in FIG. 15.

In addition, although not illustrated, when the adhesion portion and the bonding portion between the terminal group 38A and the terminal group 275α are broken as in FIG. 16, the "damaged portion" includes a solder or a conductive adhesive attached to the terminal group 38A that is the end portion of the individual wiring group 36 provided at the protective substrate 30, and the terminal group 275α divided from the relay substrate 210, as in FIG. 16. When the adhesion portion and the bonding portion between the terminal group 38A and the terminal group 275α are broken as in FIG. 17, the "damaged portion" further includes a portion of the wiring of the second substrate 270 coupled to the terminal group 275α, that is, the metal foil.

Figure 38:
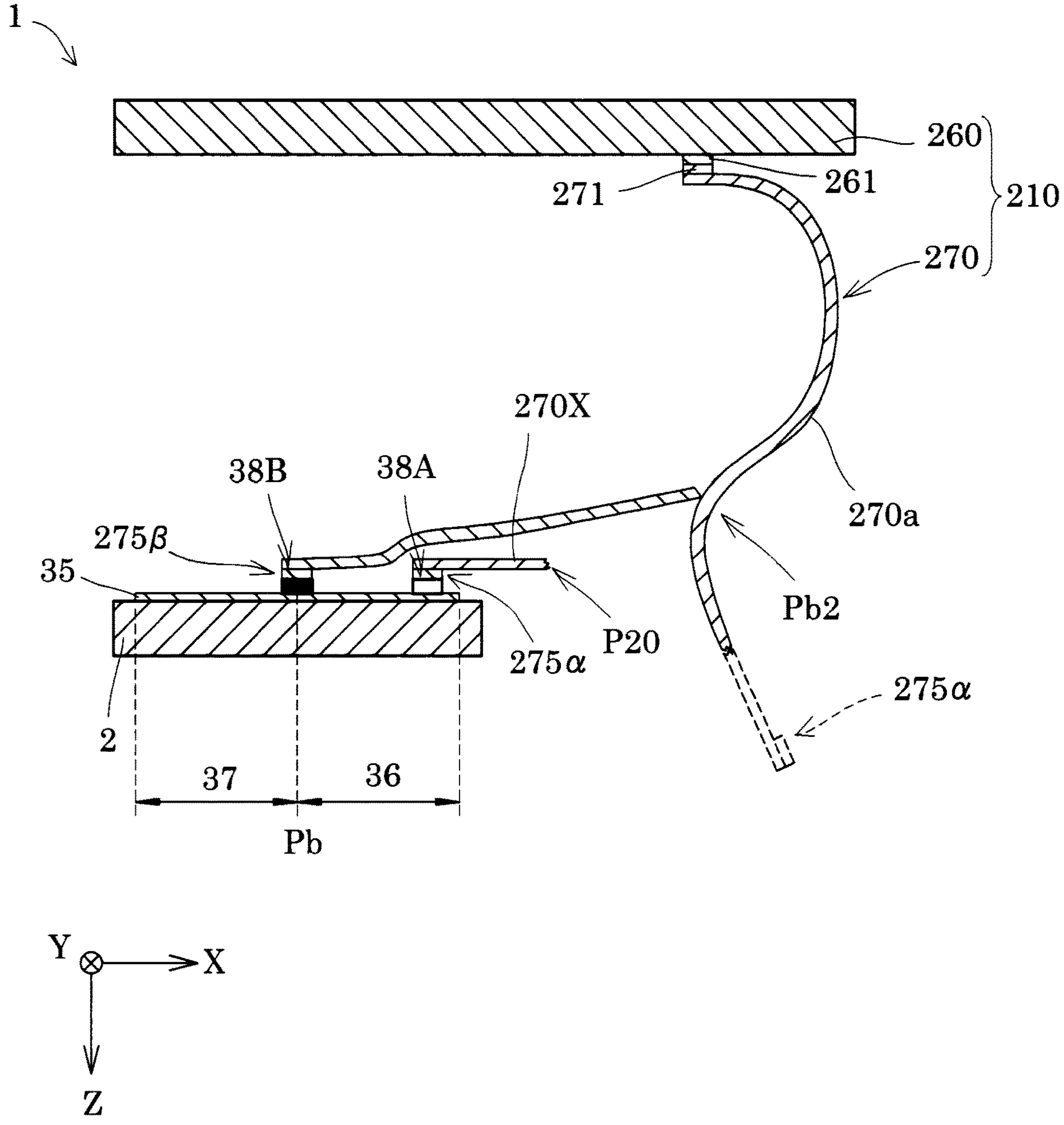
FIG. 38 is an enlarged view of the main portion of the relay substrate and the head chip according to the fourth embodiment.

In order to electrically separate the head chip 2 and the relay substrate 210 from each other, portions other than the adhesion portion or the bonding portion between the terminal group 38A and the terminal group 275α may be broken, that is, in the similar manner to in FIG. 14 in the first embodiment, the second substrate 270 may be cut at a cutting position P20 (see FIG. 35). FIG. 38 schematically illustrates a relay substrate 210 and a head chip 2 of the liquid ejecting head 1 newly manufactured by reusing the above head chip 2 in a manner that the terminal group 38B of the head chip 2 is electrically coupled to the terminal group 275β of another relay substrate 210. The other relay substrate 210 illustrated in FIG. 38 is used in another liquid ejecting head 1. It is assumed that, in order to cut the electrical coupling to the head chip 2 of the other liquid ejecting head 1, the portions other than the adhesion portion or the bonding portion of the terminal group 275α to the head chip 2 are broken. The other relay substrate 210 may be a new product.

For example, when the second substrate 270 is cut at the cutting position P20, the second substrate 270 cut off at the cutting position P20 is in a state of being adhered or bonded to the protective substrate 30. The second substrate 270 cut off at the cutting position P20 is referred to as a second substrate 270X. As illustrated in FIG. 38, the protective substrate 30 includes the terminal group 38B electrically coupled to the relay substrate 210, the common wiring group 37 electrically coupled to the relay substrate 210 by being electrically coupled to the terminal group 38B, the individual wiring group 36 that is branched and wired from the common wiring group 37 at the branch position Pb, but is not electrically coupled to the relay substrate 210, and the terminal group 38A provided at the end portion of the individual wiring group 36 on an opposite side of the branch position Pb. The head chip 2 includes the second substrate 270X adhered or bonded to the terminal group 38A. The second substrate 270X includes a "damaged portion" at the end portion opposite to the terminal group 275α adhered or bonded to the terminal group 38A.

The "damaged portion" is a cut surface obtained by cutting the second substrate 270X in the thickness direction of the second substrate 270X, and is a cut surface on which a wiring group (not illustrated) provided on the second substrate 270X is exposed. That is, the head chip 2 includes the individual wiring group 36 and the wiring group of the second substrate 270X wired to the individual wiring group 36, which are branched and wired from the common wiring group 37 at the branch position Pb, but are not electrically coupled to the relay substrate 210.

Further, as illustrated in FIGS. 37 and 38, the relay substrate 210 includes the second substrate 270 that is a flexible wiring member that electrically couples the head chip 2 and the relay substrate 210. The second substrate 270 includes a wiring group of the first flexible portion 270*a* from the third coupling terminal group 271 to a branch position Pb2 and a wiring group (not illustrated) of the second flexible portion 270*b*, as a wiring group (referred to as a coupling wiring group below) (not illustrated) that electrically couples the head chip 2 and the relay substrate 210. In addition, the second substrate 270 includes a wiring group (referred to as a non-coupling wiring group below) that is branched and wired from the coupling wiring group, but is not electrically coupled to the coupling wiring group that electrically couples the head chip 2 and the relay substrate 210. The non-coupling wiring group is a wiring group from the branch position Pb2 of the first flexible portion 270*a* to a "damaged portion" provided at the end portion opposite to the branch position Pb2.

As illustrated in FIG. 37, when the adhesion portion and the bonding portion between the terminal group 38A of another head chip 2 and the terminal group 275α of another relay substrate 210 are broken as in FIG. 15, the "damaged portion" includes a solder 150 or a conductive adhesive attached to the non-coupling wiring group, as in FIG. 15.

Further, although not illustrated, when the adhesion portion and the bonding portion between the terminal group 38A and the terminal group 275α are broken as in FIG. 19, the "damaged portion" further includes the metal foil attached to the solder 150 or the conductive adhesive, as in FIG. 19. The adhesion portion and the bonding portion between the terminal group 38A and the terminal group 275α may be broken as in FIGS. 16 to 18.

As illustrated in FIG. 38, when portions other than the adhesion portion and the bonding portion between the terminal group 38A of another head chip 2 and the terminal group 275α of another relay substrate 210 are broken as in FIG. 14, for example, when the second substrate 270 is cut at the cutting position P20, as in FIG. 14, the "damaged portion" is a cut surface obtained by cutting the second substrate 270 in the thickness direction of the second substrate 270, and is a cut surface on which a plurality of wirings forming the non-coupling wiring group are exposed.

Even in such a configuration, as in the embodiments described above, by providing the plurality of terminal groups 38 in the head chip 2, it is possible to reuse the head chip 2 by electrically separating the head chip 2 and the relay substrate 210 from each other.

Further, by providing the plurality of terminal groups 275 for the relay substrate 210, it is possible to reuse the relay substrate 210 by electrically separating the head chip 2 and the relay substrate 210 from each other. Further, even when a failure occurs in a portion of the relay substrate 210 or the head chip 2, it is possible to easily perform so-called refurbished work of replacing only the failed component and regenerating the liquid ejecting head 1.

In the present embodiment, a configuration in which the plurality of terminal groups 38 are provided on the protective substrate 30 of the head chip 2 has been described, but the present disclosure is not particularly limited thereto. A configuration in which the head chip 2 includes the wiring member 110 having flexibility may be made as in the first embodiment. That is, the terminal group 140 of the wiring member 110 of the head chip 2 and the terminal group 275 of the second substrate 270 having flexibility may be adhered or bonded to each other.

In the present embodiment, the number of terminal groups 38 that are compatible with each other is two, and may be three or more. Similarly, in the present embodiment, the number of terminal groups 275 that are compatible with each other is two, and may be three or more.

In the present embodiment, the configuration of including only one individual wiring group 36 electrically coupled to the terminal group 38A is made, but the head chip 2 may be configured to include the individual wiring group 36 for each terminal group 38. That is, the head chip 2 may include the common wiring group 37 wired in common to the terminal group 38A and the terminal group 38B, the individual wiring group 36 that is branched from the branch position Pb disposed at one end of the common wiring group 37, and is electrically coupled to the terminal group 38A, and the individual wiring group 36 that is branched from the branch position Pb and is electrically coupled to the terminal group 38B.

First Modification Example

Figure 39:
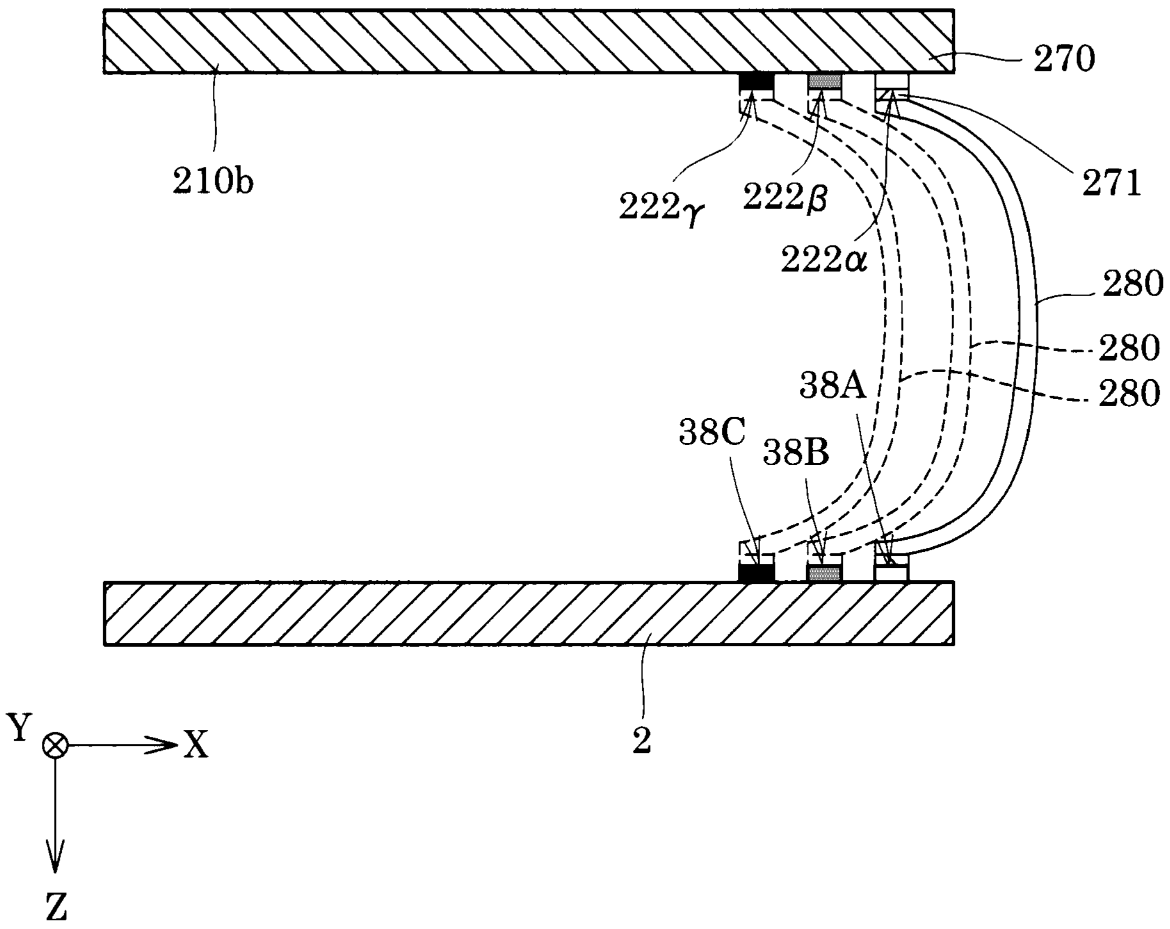
FIG. 39 is a schematic view of a relay substrate and a head chip in a first modification example of the fourth embodiment.

FIG. 39 is a view schematically illustrating a relay substrate 210 and a head chip 2 illustrating a first modification example of the liquid ejecting head 1 according to the fourth embodiment.

As illustrated in FIG. 39, the relay substrate 210 includes the same terminal groups 222α, 222β, and 222γ as those in the first embodiment described above, on the second surface 210*b*. The terminal groups 222α, 222β, and 222γ are compatible with each other. The head chip 2 further includes the terminal groups 38A, 38B, and 38C, as in the fourth embodiment described above. The terminal groups 38A, 38B, and 38C are compatible with each other. The terminal group 38A and the terminal group 222α are electrically coupled by a wiring member 280. Further, the terminal group 38B and the terminal group 38C are not adhered or coupled to the relay substrate 210.

The wiring member 280 is a flexible substrate such as an FFC, an FPC, and a COF.

In such a liquid ejecting head 1, in order to electrically separate the head chip 2 and the relay substrate 210 from each other, as in FIGS. 15 to 19 in the first embodiment described above, the adhesion portion or the bonding portion between the terminal group 38A and the wiring member 280 is broken, or the adhesion portion or the bonding portion between the terminal group 222α and the wiring member 280 is broken.

In addition, in order to electrically separate the head chip 2 and the relay substrate 210 from each other, the wiring member 280 may be cut. As the cutting position of the wiring member 280 at this time, two locations of a position closer to the terminal group 222α than the center of the wiring member 280 in the extending direction and a position closer to the terminal group 38A than the center of the wiring member 280 in the extending direction are set. Thus, it is possible to reduce the wiring member 280 remaining on each of the relay substrate 210 and the head chip 2.

In addition, another wiring member 280 is used in order to electrically couple the terminal group 38B to the terminal group 222β. Similarly, another wiring member 280 is used to electrically couple the terminal group 38C to the terminal group 222γ. That is, the flexible wiring member 280 is provided for each terminal group 38.

Even with such a configuration, it is possible to exhibit the similar effect to that in the fourth embodiment described above.

Fifth Embodiment

Figure 40:
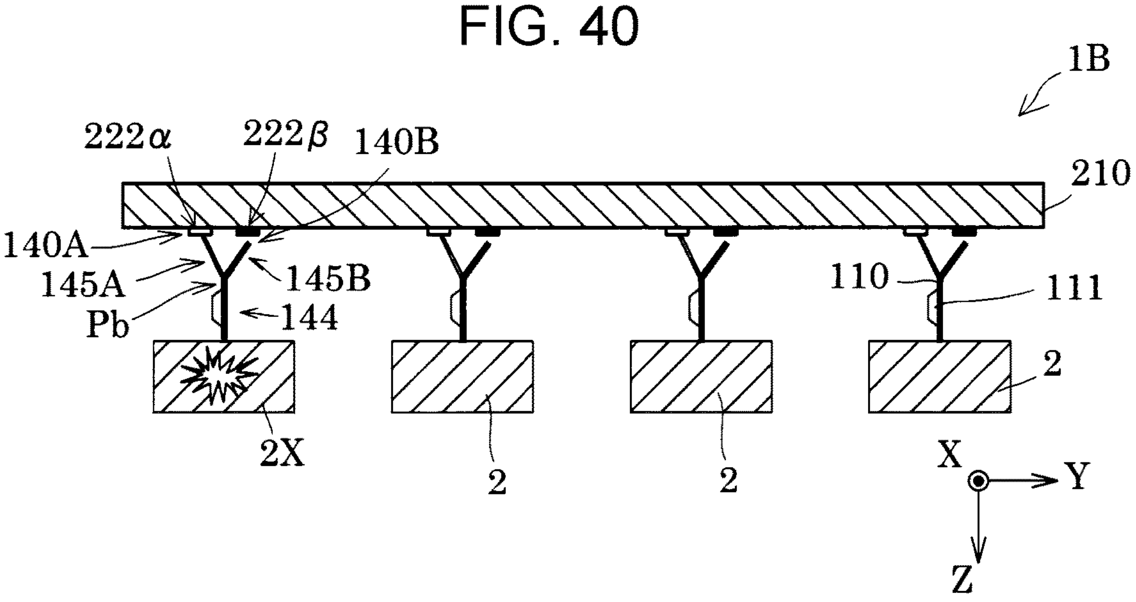
FIG. 40 is a schematic view of a manufacturing method of a liquid ejecting head according to a fifth embodiment.
Figure 41:
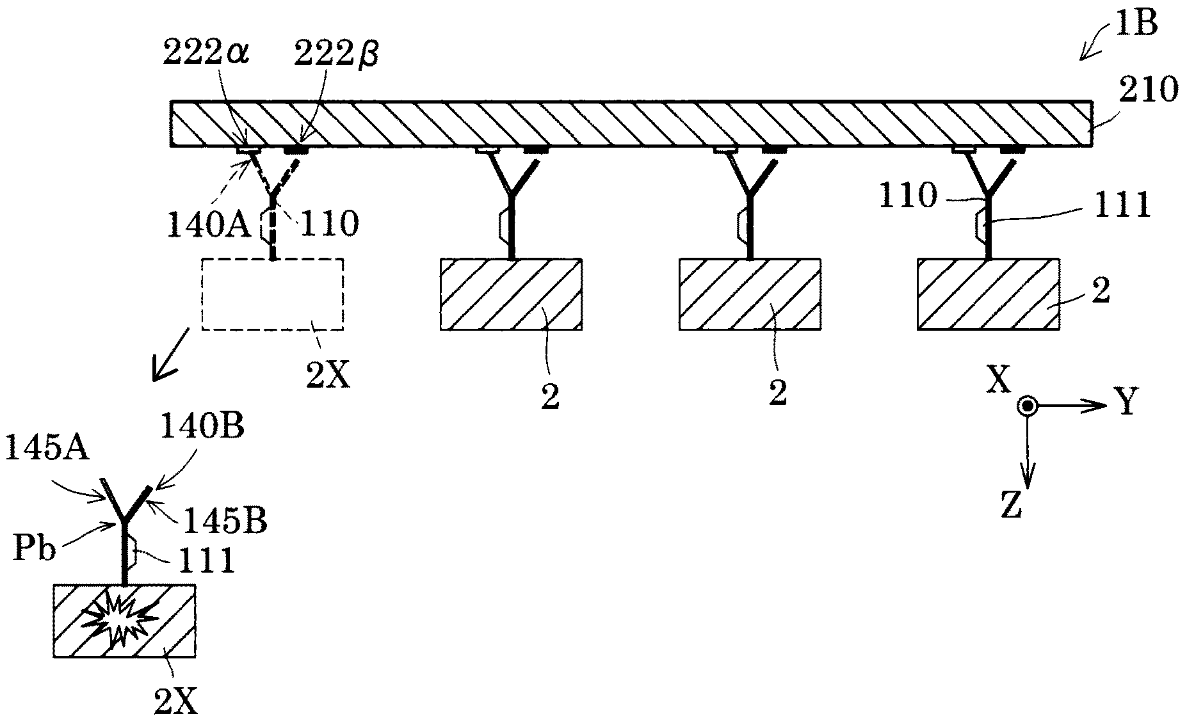
FIG. 41 is a schematic view of the manufacturing method of the liquid ejecting head according to the fifth embodiment.
Figure 42:
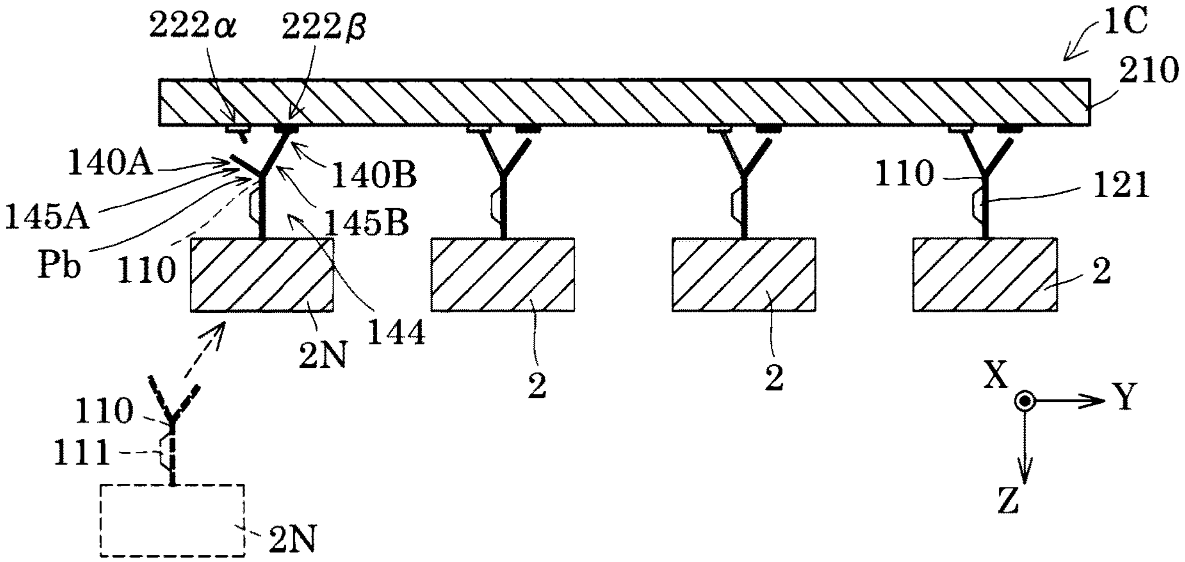
FIG. 42 is a schematic view of the manufacturing method of the liquid ejecting head according to the fifth embodiment.

FIGS. 40 to 42 are views schematically illustrating a manufacturing method of a liquid ejecting head 1C according to a fifth embodiment. The same reference signs will be given to the same members as those in the above-described embodiment, and overlapping description thereof will be omitted. Further, in the present embodiment, a configuration in which a terminal group 222α and a terminal group 222β are provided on a second surface 210*b* of a relay substrate 210 will be described, but the present disclosure is not particularly limited thereto.

In the present embodiment, a liquid ejecting head 1 including a head chip 2 and the relay substrate 210 having the terminal group 222α and the terminal group 222β that are electrical coupling terminals to the head chip 2 is regenerated. In the present embodiment, the liquid ejecting head 1 before regeneration, in other words, the failed liquid ejecting head 1 is referred to as a liquid ejecting head 1B, and the liquid ejecting head 1 after the regeneration is referred to as the liquid ejecting head 1C. Further, in the present embodiment, the failed head chip 2 provided in the liquid ejecting head 1B is referred to as a head chip 2X, and a head chip 2 compatible with the head chip 2X is referred to as a head chip 2N.

As illustrated in FIG. 40, the head chip 2X includes a flexible wiring member 110 adhered or bonded to the terminal group 222α. The wiring member 110 includes a body portion 144, an end portion 145A that includes a terminal group 140A and is branched from the body portion 144 at a branch position Pb, and an end portion 145B that includes a terminal group 140B compatible with the terminal group 140A and is branched from the body portion 144 at a branch position Pb.

As illustrated in FIG. 40, when a failure has occurred in the head chip 2X of the liquid ejecting head 1B, a replacing step of replacing the head chip 2X with a head chip 2N compatible with the head chip 2X is performed.

In the replacing step, a first step of electrically separating the terminal group 222α from the head chip 2X and a second step of electrically coupling the terminal group 222β and the head chip 2N are performed.

The first step is performed by cutting the wiring member 110 of the head chip 2X as illustrated in FIG. 41. That is, by breaking portions of the wiring member 110 other than the adhesion portion or bonding portion to the terminal group 222α, the terminal group 222α is electrically separated from the head chip 2X.

As in the first embodiment described above, the wiring member 110 is cut by cutting the end portion 145A when the wiring member 110 has the end portion 145A provided with the terminal group 140A and the end portion 145B provided with the terminal group 140B. That is, the end portion 145A is broken between the terminal group 140A and the branch position Pb. In addition, preferably, the wiring member 110 has one end adhered to the terminal group 222α and the other end on an opposite side of the one end, and the wiring member 110 is cut at a position closer to the one end than the other end, that is, in the region P2 illustrated in FIG. 7. The one end corresponds to the terminal group 140A, and the other end corresponds to a drive-side coupling terminal group 142 (not illustrated in FIGS. 40 and 41). As a result, it is possible to shorten the end portion 145A remaining on the relay substrate 210 after the cutting. Further, preferably, the wiring member 110 is cut near the terminal group 140A. That is, the end portion 145A is broken closer to the terminal group 140A than the branch position Pb. Thus, it is possible to shorten the wiring member 110 remaining on the relay substrate 210 and to suppress an occurrence of a situation in which the wiring member 110 of the head chip 2X remaining on the relay substrate 210 functions as an obstacle when the second step is performed.

The first step is not limited to cutting the wiring member 110, and may be performed by breaking the adhesion portion or the bonding portion between the terminal group 140A and the terminal group 222α as illustrated in FIGS. 15 to 19 in the first embodiment described above. By breaking the portion other than the adhesion portion and bonding portion to the terminal group 222α in this manner, it is possible to reduce the residual material of the wiring member 110 on the relay substrate 210, and to easily couple the head chip 2N to the relay substrate 210 in the second step.

As illustrated in FIG. 42, the second step is performed by adhering or bonding the terminal group 140B of the head chip 2N that does not fail and is not used, that is, a new head chip 2N to the terminal group 222β of the relay substrate 210. Since the head chip 2N is a new product, the head chip 2N has an unused terminal group 140A. Therefore, the second step may be performed by adhering or bonding the terminal group 140A of the head chip 2N to the terminal group 222β of the relay substrate 210.

It is possible to manufacture the liquid ejecting head 1C by performing the replacing step including the first step and the second step in this manner to regenerate the failed liquid ejecting head 1B.

Although the manufacturing method of the liquid ejecting head 1 according to the first embodiment described above has been described, the manufacturing method in the present embodiment can also be applied to other embodiments.

First Modification Example

Figure 43:
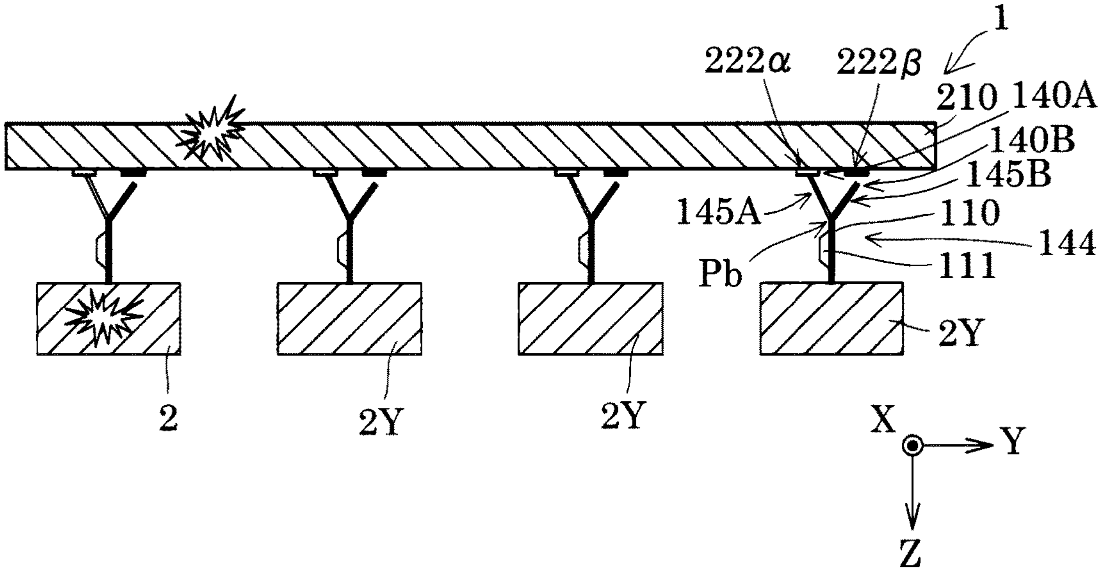
FIG. 43 is a schematic view for describing a manufacturing method in a first modification example of the fifth embodiment.
Figure 44:
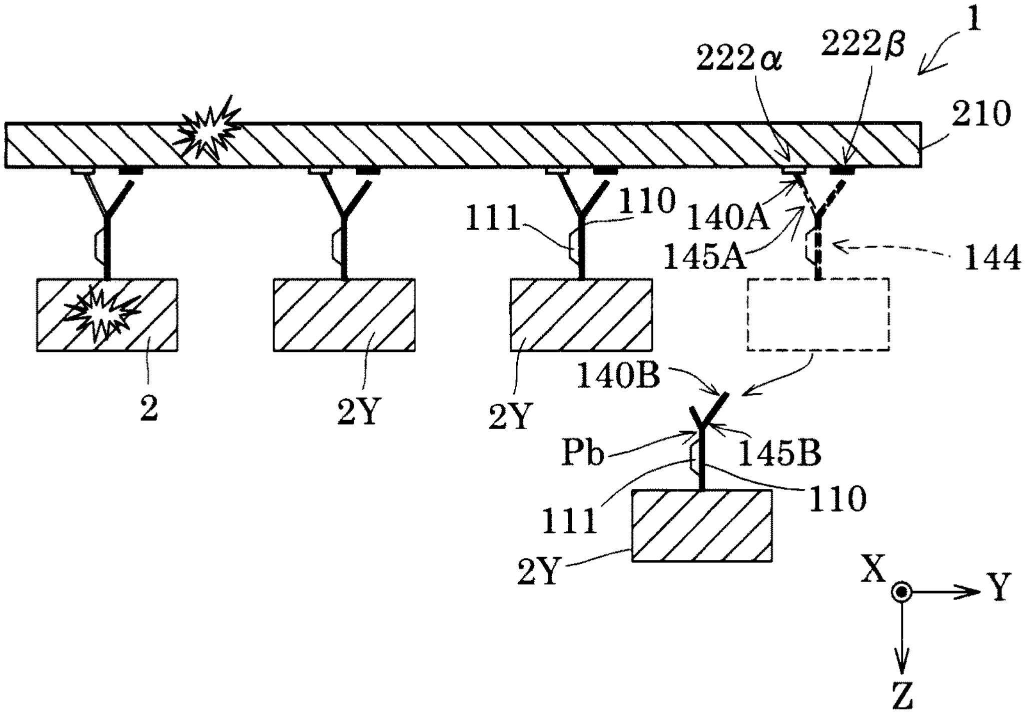
FIG. 44 is a schematic view for describing the manufacturing method in the first modification example of the fifth embodiment.
Figure 45:
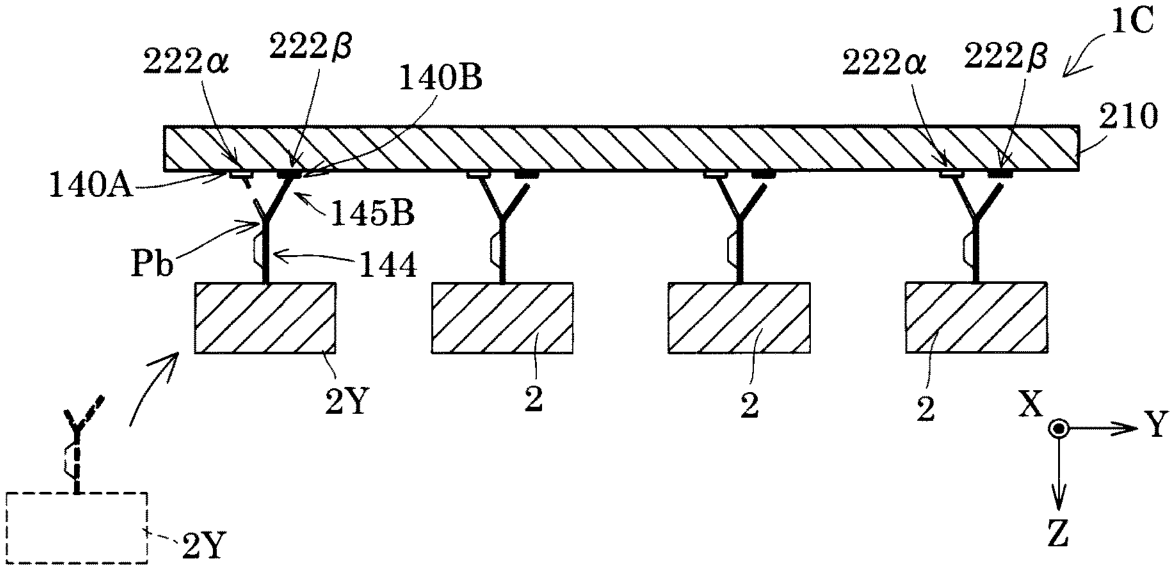
FIG. 45 is a schematic view for describing the manufacturing method in the first modification example of the fifth embodiment.

FIGS. 43 to 45 are views schematically illustrating a first modification example of the manufacturing method of the liquid ejecting head 1C in the fifth embodiment. A manufacturing method in the present modification example is different from the manufacturing method in the fifth embodiment in that a new head chip 2N is used in the second step in the manufacturing method in the fifth embodiment, but the used head chip 2Y is used in the second step in the manufacturing method in the present modification example. The first step in the present modification example is the same as the first step in the fifth embodiment. Therefore, the present modification example will be described on the assumption that the liquid ejecting head 1C before the used head chip 2Y is electrically coupled in FIG. 45 is the liquid ejecting head 1B after the head chip 2X is electrically separated in FIG. 41.

In another liquid ejecting head 1, the terminal group 140A of the head chip 2 is electrically coupled to the terminal group 222α of the relay substrate 210. When the relay substrate 210 and a portion of the head chips 2 have failed in the other liquid ejecting head 1 as illustrated in FIG. 43, the non-failed head chip 2Y and the relay substrate 210 of the other liquid ejecting head 1 are electrically separated from each other, as illustrated in FIG. 44. The head chip 2Y and the relay substrate 210 are electrically separated from each other by cutting the end portion 145A of the wiring member 110. Since the head chip 2Y cut off in this manner has the terminal group 140B, the head chip 2Y can be adhered or bonded to another relay substrate 210.

That is, as illustrated in FIG. 45, the liquid ejecting head 1C is manufactured by adhering or bonding the non-failed head chip 2Y separated from the other liquid ejecting head 1 to the relay substrate 210. That is, the liquid ejecting head 1C may be manufactured by regenerating the liquid ejecting head 1B using the new head chip 2N as in the fifth embodiment described above, and the liquid ejecting head 1C may be manufactured by regenerating the liquid ejecting head 1B using the used head chip 2Y as in the present modification example.

The liquid ejecting head 1C illustrated in FIG. 45, which is regenerated in this manner includes the head chip 2Y having the flexible wiring member 110 and the relay substrate 210. The wiring member 110 includes the common wiring group 126 and the individual wiring group 125B that electrically couple the head chip 2Y and the relay substrate 210 to each other, and the individual wiring group 125A that is branched and wired from the common wiring group 126 and the individual wiring group 125B at the branch position Pb, but is not electrically coupled to the common wiring group 126 and the individual wiring group 125B. That is, the individual wiring group 125A refers to a wiring group wired to the common wiring group 126 and the individual wiring group 125B.

The "damaged portion" is provided at the end portion of the individual wiring group 125A on an opposite side of the branch position Pb. As illustrated in FIG. 14, the "damaged portion" is a cut surface obtained by cutting the wiring member 110 in the thickness direction, and a cut surface in which the plurality of wirings 113 of the individual wiring group 125A is exposed. The cut surface is, for example, similar to the surface illustrated in FIG. 11. When the "damaged portion" is a cut surface, at least one wiring 113 is not exposed from portions other than the cut surface. That is, the wiring 113 exposed on the cut surface is different from the terminal group 140. That is, in the case of the wiring member 110 in the first embodiment described above, the conductive layer 115 is not provided on the wiring 113 exposed on the cut surface. Further, the "damaged portion" is an end portion of the wiring member 110, which does not reach the terminal group 222 of the relay substrate 210. Further, as illustrated in FIG. 11, on the cut surface, both sides of the wiring 113 in the thickness direction are covered with the adhesive 116.

In FIG. 44, when the non-failed head chip 2Y and the relay substrate 210 of another liquid ejecting head 1 are electrically separated, the head chip 2Y and the relay substrate 210 may be electrically separated from each other by breaking the adhesion portion or bonding portion to the terminal group 222α of the wiring member 110. In this case, as illustrated in FIGS. 15, 18, and 19, the "damaged portion" may include the solder 150. The "damaged portion" may include a conductive adhesive instead of the solder 150. Further, as illustrated in FIG. 19, the "damaged portion" may include a metal foil attached to the solder 150 or the conductive adhesive. That is, the "damaged portion" may include a metal foil that forms the wiring 113 and is attached to the solder 150 or a conductive adhesive, for example, a copper foil, a gold foil, a silver foil, a tin foil, or the like. Regarding the determination as to whether the metal attached to the "damaged portion" is attached to the wiring 113 that is a metal foil or the plated conductive layer 115, for example, since the plating is generally thinner than the metal foil, from the thickness, whether or not the wiring 113 that is the metal foil is attached to the "damaged portion" or the conductive layer 115 formed by plating is attached to the "damaged portion" can be determined. When the ratio of copper per unit area of the wiring member 110 is larger than the ratio of gold, it can be determined that the copper is a metal foil and the gold is plated.

Figure 46:
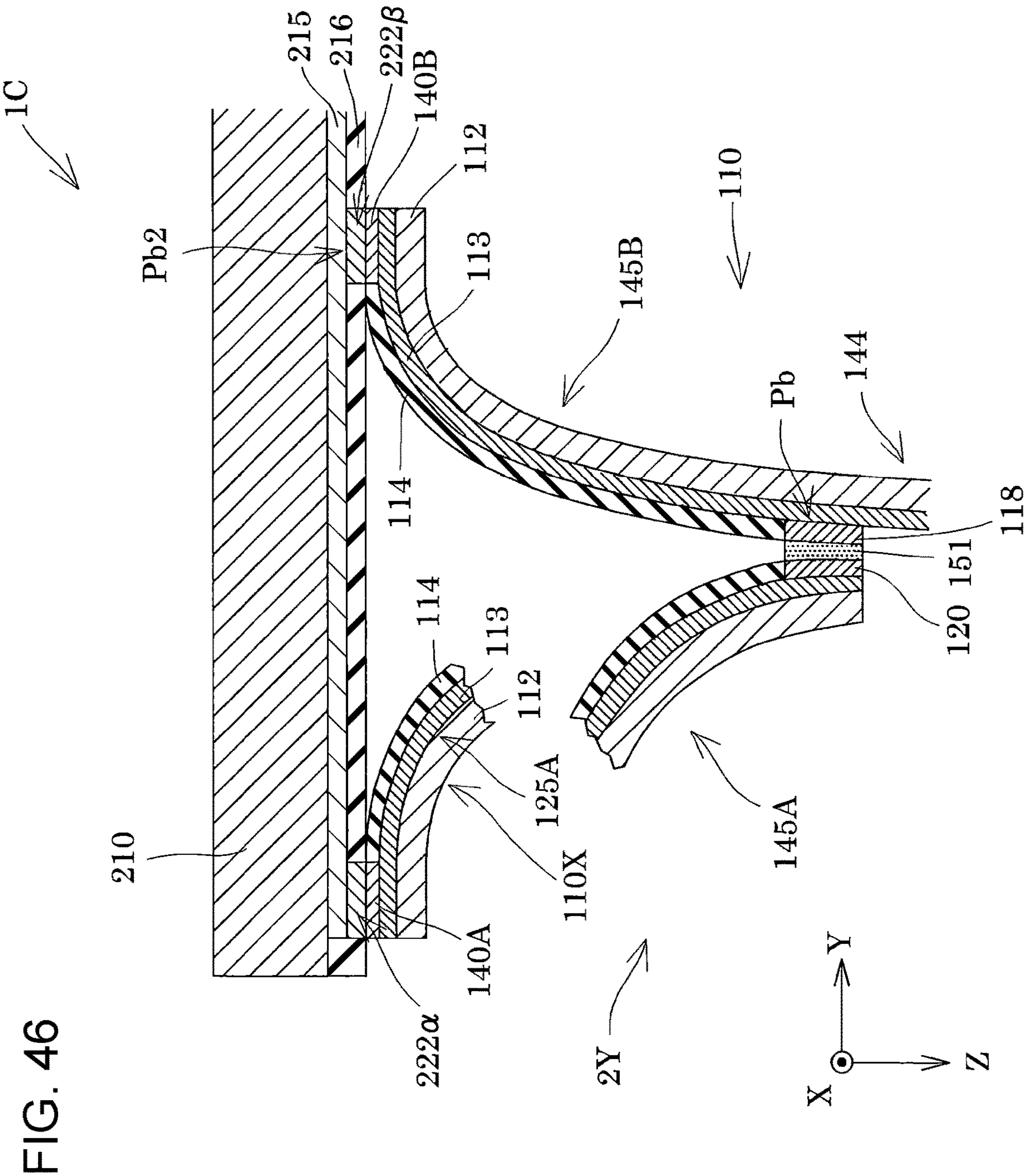
FIG. 46 is an enlarged cross-sectional view of a main portion of the liquid ejecting head in the first modification example of the fifth embodiment.

As illustrated in FIG. 46, the liquid ejecting head 1C illustrated in FIG. 45, which is regenerated in this manner, includes the head chip 2Y, the terminal group 222β that is electrically coupled to the head chip 2Y, and the relay substrate 210 including the wiring 215 that is a coupling wiring group electrically coupled to the head chip 2Y by being electrically coupled to the terminal group 222β. FIG. 46 is an enlarged view of the vicinity of a coupling portion between the head chip 2Y and the relay substrate 210 in FIG. 45. As illustrated in FIG. 46, the relay substrate 210 includes the wiring 215 being a non-coupling wiring group that is branched and wired from the coupling wiring group at the branch position Pb2 disposed on the relay substrate 210, but is not electrically coupled to the head chip 2Y. The non-coupling wiring group is a portion between the terminal group 222β and the terminal group 222α of the wiring 215 illustrated in FIG. 46. Further, the coupling wiring group is a portion to the connector 211 (not illustrated) from the terminal group 222β of the wiring 215 illustrated in FIG. 46. The branch position Pb2 is a position where the wiring 215 is wired to the terminal group 140B. In such a configuration, as illustrated in FIGS. 15 to 19, the "damaged portion" is provided at the end portion of the non-coupling wiring group on an opposite side of the branch position Pb2 in a manner that the adhesion or bonding portion between the terminal group 140A and the terminal group 222α is broken, or the portions of the wiring member 110 other than the adhesion or bonding portion between the terminal group 140A and the terminal group 222α are broken.

When the head chip 2Y and the relay substrate 210 are electrically separated by cutting the wiring member 110, as illustrated in FIG. 46, the cut wiring member 110 is adhered or bonded to the relay substrate 210 of the regenerated liquid ejecting head 1C. The wiring member 110 remaining on the relay substrate 210 is referred to as a wiring member 110X below. Therefore, the non-coupling wiring group includes the wiring 215 of the relay substrate 210 and the wiring 113 of the wiring member 110X remaining on the relay substrate 210. The terminal group 222α is provided in the middle of the non-coupling wiring group. The liquid ejecting head 1C includes the flexible wiring member 110X that is adhered or bonded to the terminal group 222α and includes the individual wiring group 125A. The "damaged portion" is a cut surface that cuts the wiring member 110X in the thickness direction, and is a cut surface in which the individual wiring group 125A is exposed.

As illustrated in FIGS. 18 to 19, when the adhesion portion or the bonding portion between the terminal group 140A and the terminal group 222α is broken, the "damaged portion" is the wiring 215 being the non-coupling wiring group that is exposed from one surface of the relay substrate 210 (the surface facing the −Z direction in FIGS. 18 and 19, but the surface facing the +Z direction in the present embodiment), as in FIGS. 18 and 19. In the present embodiment, the coupling wiring group and the non-coupling wiring group are provided on one surface of the relay substrate 210, but the present disclosure is not particularly limited thereto. As in the second embodiment, the terminal group 222α and the terminal group 222β may be provided on different surfaces of the relay substrate 210. That is, the terminal group 222α and the non-coupling wiring group may be provided on the surface of the relay substrate 210 facing the −Z direction, and the terminal group 222β and the coupling wiring group may be provided on the surface of the relay substrate 210 facing the +Z direction. In this case, the "damaged portion" serves as the wiring 215 being the non-coupling wiring group that is exposed from the surface of the relay substrate 210 opposite to the surface on which the terminal group 222β is provided.

Further, as illustrated in FIGS. 15 to 17, when the adhesion portion or the bonding portion between the terminal group 140A and the terminal group 222α is broken, the "damaged portion" may include the solder 150 or the conductive adhesive attached to the wiring 215 that is the non-coupling wiring group, as in FIGS. 15 to 17.

Although the manufacturing method of the liquid ejecting head 1 according to the first embodiment described above has been described, the manufacturing method in the present embodiment can also be applied to other embodiments.

Second Modification Example

In a second modification example of the fifth embodiment, the manufacturing method in the first modification example of the fifth embodiment may be applied to the liquid ejecting head 1 in the fourth embodiment. That is, in the present modification example, the liquid ejecting head 1B in the first modification example corresponds to the liquid ejecting head 1 in FIG. 36, and the liquid ejecting head 1C in the first modification example corresponds to the liquid ejecting head 1 in FIG. 37 or FIG. 38. The used head chip 2Y in the first modification example corresponds to the head chip 2 in FIG. 37 or FIG. 38, and the failed head chip 2X in the first modification example corresponds to the head chip 2 in FIG. 36.

In the present modification example, there is provided a manufacturing method of the liquid ejecting head 1 in FIG. 37 or 38 by regenerating the liquid ejecting head 1 in FIG. 36 that includes the head chip 2 having the terminal group 38A and the terminal group 38B that are compatible with each other, and the relay substrate 210 having the terminal group 275α and the terminal group 275β that are electrical coupling terminals to the head chip 2. The manufacturing method in the present modification example includes a replacing step of replacing the head chip 2 in FIG. 36 with the head chip 2 in FIG. 37 or FIG. 38, which is compatible with the head chip 2 in FIG. 36. That is, the head chip 2 in FIG. 36 is the failed head chip 2, and the head chip 2 in FIG. 37 or FIG. 38 is the used head chip 2 that has been used in another liquid ejecting head 1 and does not fail. The relay substrate 210 in FIG. 36 and the relay substrate 210 in FIG. 37 or FIG. 38 are the same relay substrate 210. In FIG. 36, the terminal group 38A of the head chip 2 and the terminal group 275α of the relay substrate 210 are electrically coupled to each other. Therefore, the replacing step includes a first step of electrically separating the terminal group 275α from the terminal group 38A of the failed head chip 2 in the liquid ejecting head 1 in FIG. 36, and a second step of electrically coupling the terminal group 275β that is compatible with the terminal group 275α in FIG. 37 or FIG. 38 to the used head chip 2. As a result, it is possible to obtain the similar effect to that in the first modification example.

The relay substrate 210 in the present modification example includes the flexible second substrate 270 including the terminal group 275α and the terminal group 275β.

In the first step for manufacturing the liquid ejecting head 1 in FIG. 37, the adhesion portion or the bonding portion between the terminal group 275α and the terminal group 38A is broken in the similar manner to in the first modification example.

On the other hand, in the first step for manufacturing the liquid ejecting head 1 in FIG. 38, the portions other than the adhesion portion or the bonding portion between the terminal group 275α and the terminal group 38A are broken in the similar manner to in the first modification example. Specifically, the second substrate 270 includes a body portion that is a portion from the third coupling terminal group 271 of the first flexible portion 270*a* to the branch position Pb2, a first end portion that includes the terminal group 275α and is branched from the body portion at the branch position Pb2, and a second end portion that includes the terminal group 275β compatible with the terminal group 275α and is branched from the body portion at the branch position Pb2. In the first step, the first end portion is broken, that is, cut between the terminal group 275α and the branch position Pb2. The first end portion is a portion from the branch position Pb2 of the first flexible portion 270*a* to the terminal group 275α, and is a portion from the branch position Pb2 of the second flexible portion 270*b* to the terminal group 275β.

Sixth Embodiment

Figure 47:
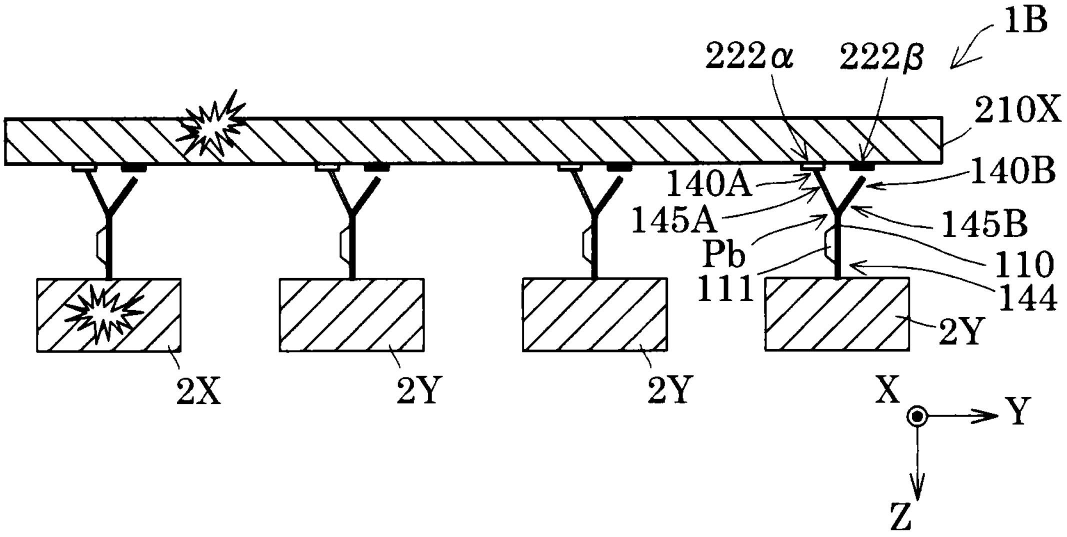
FIG. 47 is a schematic view for describing a manufacturing method of a liquid ejecting head according to a sixth embodiment.
Figure 48:
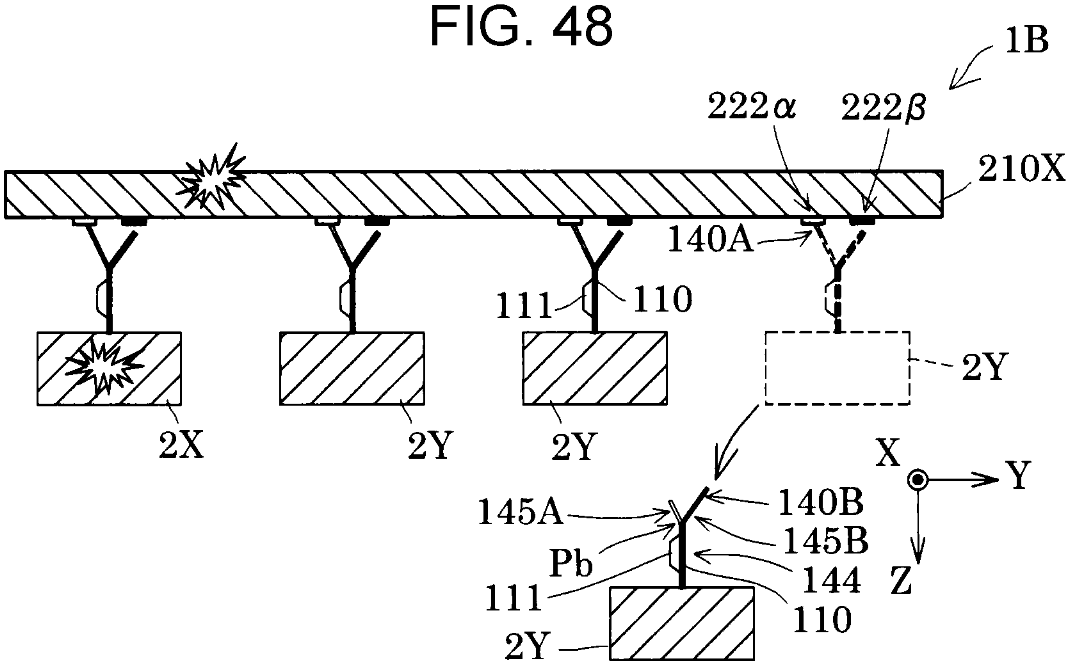
FIG. 48 is a schematic view for describing the manufacturing method of the liquid ejecting head according to the sixth embodiment.
Figure 49:
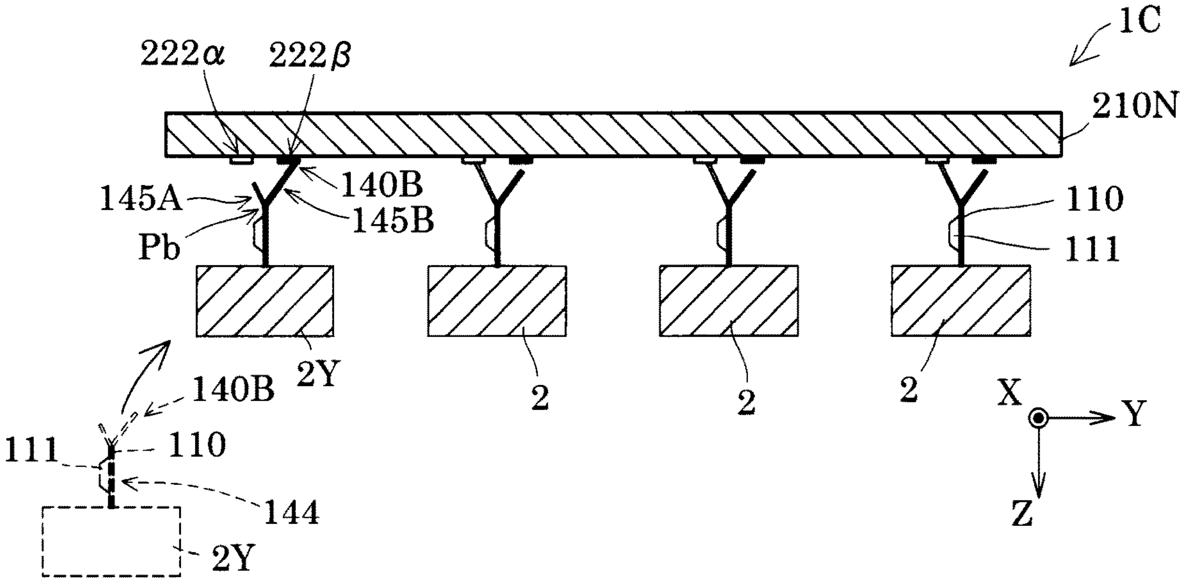
FIG. 49 is a schematic view for describing the manufacturing method of the liquid ejecting head according to the sixth embodiment.

FIGS. 47 to 49 are views schematically illustrating a manufacturing method of a liquid ejecting head 1C according to a sixth embodiment of the present disclosure. The same reference signs will be given to the same members as those in the above-described embodiment, and overlapping description thereof will be omitted. Further, in the present embodiment, a configuration in which a terminal group 222α and a terminal group 222β are provided on a second surface 210*b* of a relay substrate 210 will be described, but the present disclosure is not particularly limited thereto.

In the present embodiment, the failed liquid ejecting head 1 including a component to be reused is referred to as a liquid ejecting head 1B, and a liquid ejecting head 1 manufactured by reusing a portion of the liquid ejecting head 1B is referred to as a liquid ejecting head 1C. In addition, in the present embodiment, regarding a relay substrate 210, the failed relay substrate 210 is referred to as a relay substrate 210X, and a new relay substrate 210 compatible with the relay substrate 210X is referred to as a relay substrate 210N. Further, in the present embodiment, the failed head chip 2 provided in the liquid ejecting head 1B is referred to as a head chip 2X, and a non-failed head chip 2 provided in the liquid ejecting head 1B is referred to as a head chip 2Y.

As illustrated in FIGS. 47 to 49, in the present embodiment, the liquid ejecting head 1C is manufactured by reusing a portion of the liquid ejecting head 1B including the relay substrate 210X and the head chip 2 having a terminal group 140A and a terminal group 140B that are electrical coupling terminals to the relay substrate 210X.

A step of reusing the non-failed head chip 2Y of the liquid ejecting head 1B for the liquid ejecting head 1C is performed.

This step includes a first step of electrically separating the relay substrate 210X from the non-failed head chip 2Y in the liquid ejecting head 1B having the failed head chip 2X and the failed relay substrate 210X, and a second step of electrically coupling the non-failed head chip 2Y separated in the first step to the relay substrate 210N of the liquid ejecting head 1C.

As illustrated in FIG. 47, the terminal group 140A of the head chip 2Y is electrically coupled to a terminal group 222α of the relay substrate 210X. Therefore, in the first step, as illustrated in FIG. 48, the relay substrate 210X of the liquid ejecting head 1B and the non-failed head chip 2Y are electrically separated from each other. As in the fifth embodiment described above, the first step may be performed by breaking the adhesion portion or the bonding portion between the terminal group 140A of the head chip 2Y and the terminal group 222α of the relay substrate 210X, or may be performed by breaking portions other than the adhesion portion or the bonding portion between the terminal group 140A of the head chip 2Y and the terminal group 222α of the relay substrate 210X, that is, by cutting the wiring member 110. In the present embodiment, the head chip 2Y and the relay substrate 210X are electrically separated from each other by cutting the wiring member 110.

In the second step, as illustrated in FIG. 49, the liquid ejecting head 1C is manufactured by adhering or bonding the head chip 2Y separated from the liquid ejecting head 1B to the relay substrate 210N. In the second step, the terminal group 140B of the head chip 2Y is adhered or bonded to the terminal group 222β of the relay substrate 210N. Since the relay substrate 210N is a new product, in the second step, the terminal group 140B of the head chip 2Y may be adhered or bonded to the unused terminal group 222α of the relay substrate 210N. Further, the relay substrate 210N may be electrically coupled to a new head chip 2 as the head chip 2 other than the head chip 2Y removed from the liquid ejecting head 1B.

It is possible to manufacture the liquid ejecting head 1C by performing the step including the first step and the second step in this manner to reuse the head chip 2Y of the failed liquid ejecting head 1B.

In the present embodiment, the liquid ejecting head 1C illustrated in FIG. 49 can also be referred to as the liquid ejecting head 1 having the "damaged portion" described in the first modification example of the fifth embodiment described above.

Although the manufacturing method of the liquid ejecting head 1 according to the first embodiment described above has been described, the manufacturing method in the present embodiment can also be applied to other embodiments.

Seventh Embodiment

Figure 50:
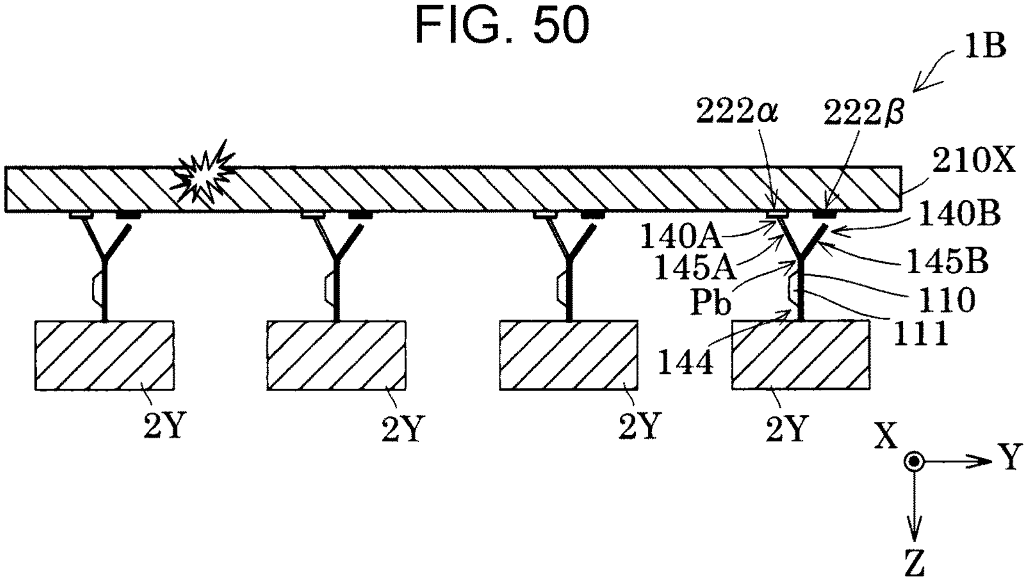
FIG. 50 is a schematic view for describing a manufacturing method of a liquid ejecting head according to a seventh embodiment.
Figure 51:
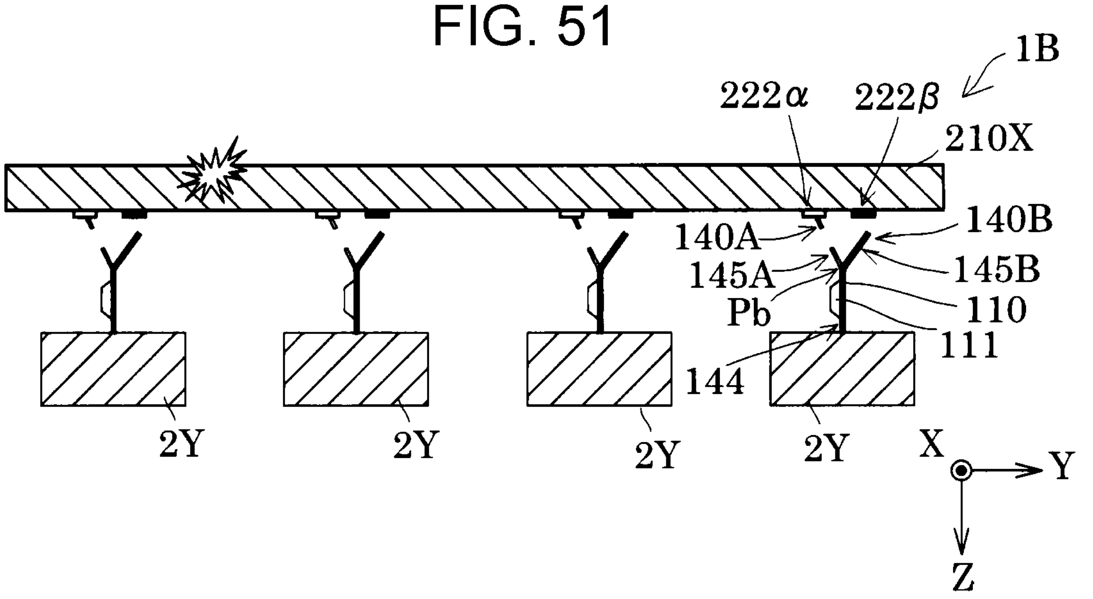
FIG. 51 is a schematic view for describing the manufacturing method of the liquid ejecting head according to the seventh embodiment.
Figure 52:
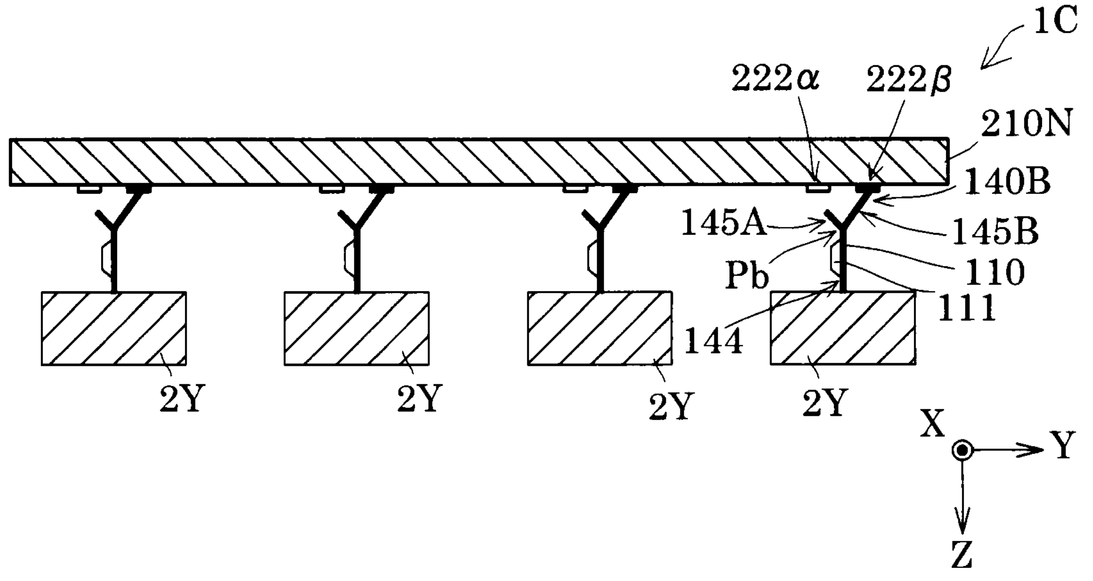
FIG. 52 is a schematic view for describing the manufacturing method of the liquid ejecting head according to the seventh embodiment.

FIGS. 50 to 52 are views schematically illustrating a manufacturing method of a liquid ejecting head 1C according to a seventh embodiment of the present disclosure. The same reference signs will be given to the same members as those in the above-described embodiment, and overlapping description thereof will be omitted. Further, in the present embodiment, a configuration in which a terminal group 222α and a terminal group 222β are provided on a second surface 210*b* of a relay substrate 210 will be described, but the present disclosure is not particularly limited thereto.

In the present embodiment, a liquid ejecting head 1 including a relay substrate 210 and a head chip 2 having a terminal group 140A and a terminal group 140B that are electrical coupling terminals to the relay substrate 210 is regenerated. In the present embodiment, the liquid ejecting head 1 before regeneration, in other words, the failed liquid ejecting head 1 is referred to as a liquid ejecting head 1B, and the liquid ejecting head 1 after the regeneration is referred to as the liquid ejecting head 1C. In addition, in the present embodiment, the failed relay substrate 210 provided in the liquid ejecting head 1B is referred to as a relay substrate 210X, and the relay substrate 210 compatible with the relay substrate 210X is referred to as a relay substrate 210N. Further, in the present embodiment, the non-failed head chip 2 of the liquid ejecting head 1B is referred to as a head chip 2Y.

As illustrated in FIGS. 50 to 52, in the present embodiment, the liquid ejecting head 1C is manufactured by regenerating the liquid ejecting head 1B including the relay substrate 210X and the head chip 2Y having a terminal group 140A and a terminal group 140B that are electrical coupling terminals to the relay substrate 210X.

As illustrated in FIG. 50, the head chip 2Y includes a flexible wiring member 110 adhered or bonded to the terminal group 222α. The wiring member 110 includes a body portion 144, an end portion 145A that includes a terminal group 140A and is branched from the body portion 144 at a branch position Pb, and an end portion 145B that includes a terminal group 140B compatible with the terminal group 140A and is branched from the body portion 144 at a branch position Pb.

As illustrated in FIG. 50, when the failure has occurred in the relay substrate 210X of the liquid ejecting head 1B, a replacing step of replacing the relay substrate 210X with a relay substrate 210N compatible with the relay substrate 210X is performed.

The replacing step includes a first step of electrically separating the terminal group 140A of the non-failed head chip 2Y from the failed relay substrate 210X in the liquid ejecting head 1B and a second step of adhering or bonding the terminal group 140B of the head chip 2Y separated in the first step to the relay substrate 210N.

In the first step, as illustrated in FIG. 51, the failed relay substrate 210X of the liquid ejecting head 1B and the non-failed head chip 2Y are electrically separated from each other. As in the fifth embodiment described above, the first step may be performed by breaking the adhesion portion or the bonding portion between the relay substrate 210X and the terminal group 140A, or may be performed by breaking portions other than the adhesion portion or the bonding portion between the relay substrate 210X and the terminal group 140A, that, is by cutting the wiring member 110. In the present embodiment, the head chip 2Y and the relay substrate 210X are electrically separated from each other by cutting the wiring member 110.

In the second step, as illustrated in FIG. 52, the liquid ejecting head 1C is manufactured by adhering or bonding the head chip 2Y separated from the liquid ejecting head 1B to the new relay substrate 210N. In the second step, the terminal group 140B of the head chip 2Y is adhered or bonded to the terminal group 222β of the relay substrate 210N. Since the relay substrate 210N is a new product, the unused terminal group 222α of the relay substrate 210N may be adhered or bonded to the terminal group 140B of the head chip 2Y.

It is possible to manufacture the liquid ejecting head 1C by performing the replacing step including the first step and the second step in this manner to regenerate the failed liquid ejecting head 1B.

In the present embodiment, the liquid ejecting head 1C illustrated in FIG. 52 can also be referred to as the liquid ejecting head 1 having the "damaged portion" described in the first modification example of the fifth embodiment described above.

Although the manufacturing method of the liquid ejecting head 1 according to the first embodiment described above has been described, the manufacturing method in the present embodiment can also be applied to other embodiments.

First Modification Example

Figure 53:
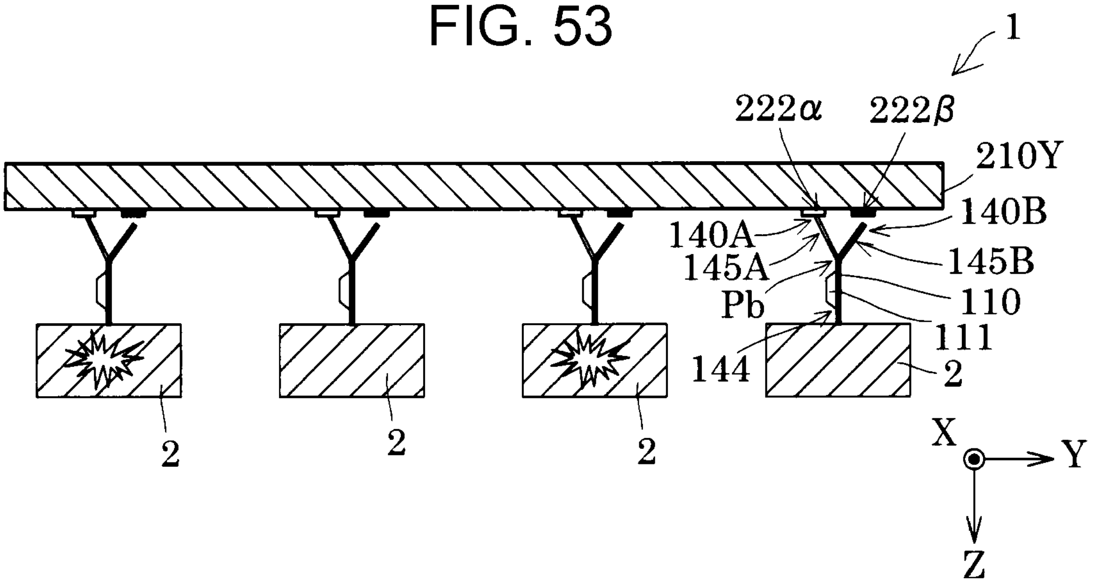
FIG. 53 is a schematic view for describing a manufacturing method in a first modification example of the seventh embodiment.
Figure 54:
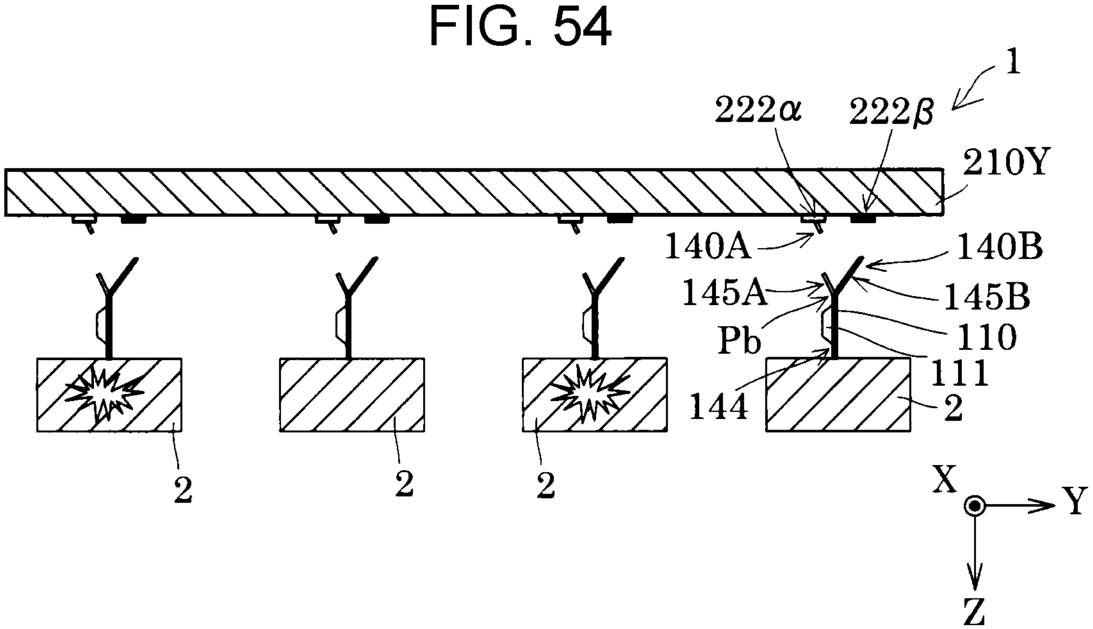
FIG. 54 is a schematic view for describing the manufacturing method in the first modification example of the seventh embodiment.
Figure 55:
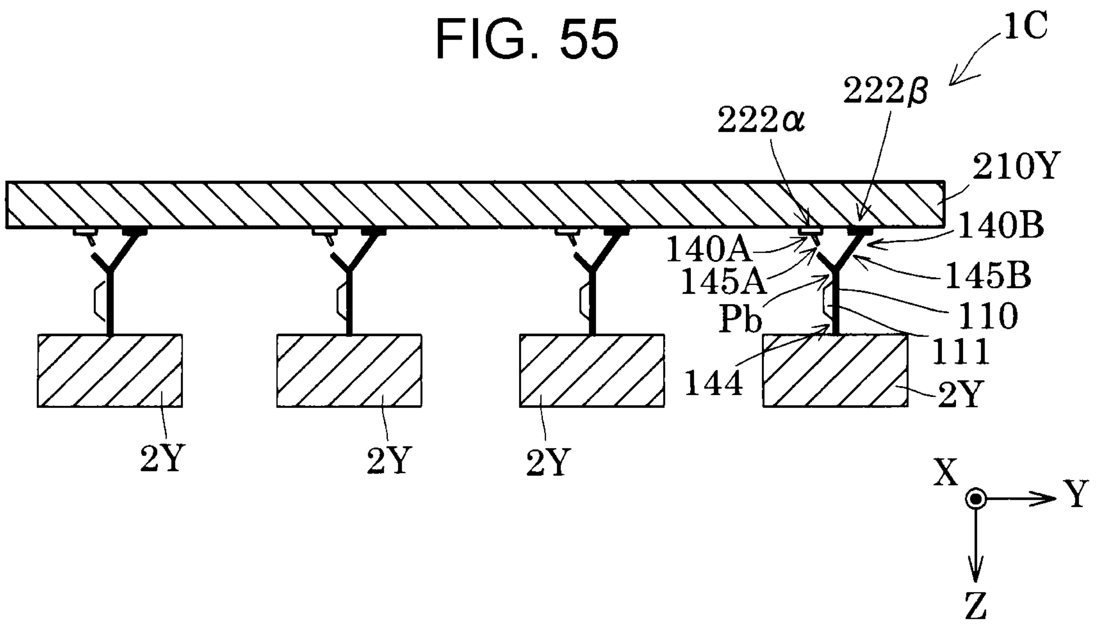
FIG. 55 is a schematic view for describing the manufacturing method in the first modification example of the seventh embodiment.

FIGS. 53 to 55 are views schematically illustrating a first modification example of the manufacturing method of the liquid ejecting head 1 in the seventh embodiment. A manufacturing method in the present modification example is different from the manufacturing method in the seventh embodiment in that a new relay substrate 210N is used in the second step in the manufacturing method in the seventh embodiment, but the used relay substrate 210Y is used in the second step in the manufacturing method in the present modification example. The first step is the same as the first step in the seventh embodiment. Therefore, the present modification example will be described on the assumption that the liquid ejecting head 1C before the used relay substrate 210Y is electrically coupled in FIG. 55 is the liquid ejecting head 1B after the relay substrate 210X is electrically separated in FIG. 51.

In another liquid ejecting head 1, the terminal group 140A of the head chip 2 is electrically coupled to the terminal group 222α of the relay substrate 210Y. When a portion of the head chips 2 has failed in the other liquid ejecting head 1 as illustrated in FIG. 53, the non-failed relay substrate 210Y and the head chip 2 of the other liquid ejecting head 1 are electrically separated from each other, as illustrated in FIG. 54. The electrical coupling between the relay substrate 210Y and the head chip 2 is cut off by cutting the end portion 145A of the wiring member 110. Since the relay substrate 210Y cut off in this manner has the terminal group 222β, the non-failed head chip 2Y can be adhered or bonded. The electrical coupling between the relay substrate 210Y and the head chip 2 may be cut off by breaking the adhesion portion or the bonding portion between the terminal group 140A and the terminal group 222α.

As illustrated in FIG. 55, the liquid ejecting head 1C is manufactured by adhering or bonding the non-failed relay substrate 210Y separated from another liquid ejecting head 1 to the non-failed head chip 2Y separated from the liquid ejecting head 1B in the seventh embodiment described above. That is, the liquid ejecting head 1C may be manufactured by regenerating the liquid ejecting head 1B using the new relay substrate 210N as in the seventh embodiment described above, and the liquid ejecting head 1C may be manufactured by regenerating the liquid ejecting head 1B using the used relay substrate 210Y as in the first modification example.

In the first modification example, the liquid ejecting head 1C illustrated in FIG. 55 can also be referred to as the liquid ejecting head 1 having the "damaged portion" described in the first modification example of the fifth embodiment described above.

Although the manufacturing method of the liquid ejecting head 1 according to the first embodiment described above has been described, the manufacturing method in the present embodiment can also be applied to other embodiments.

Eighth Embodiment

Figure 56:
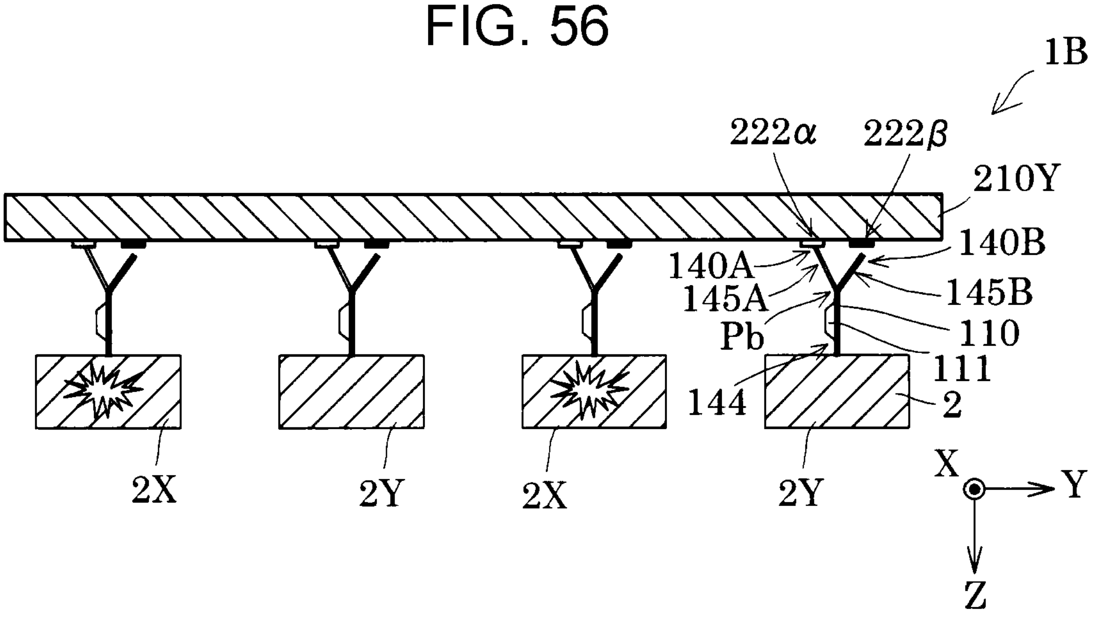
FIG. 56 is a schematic view for describing a manufacturing method of a liquid ejecting head according to an eighth embodiment.
Figure 57:
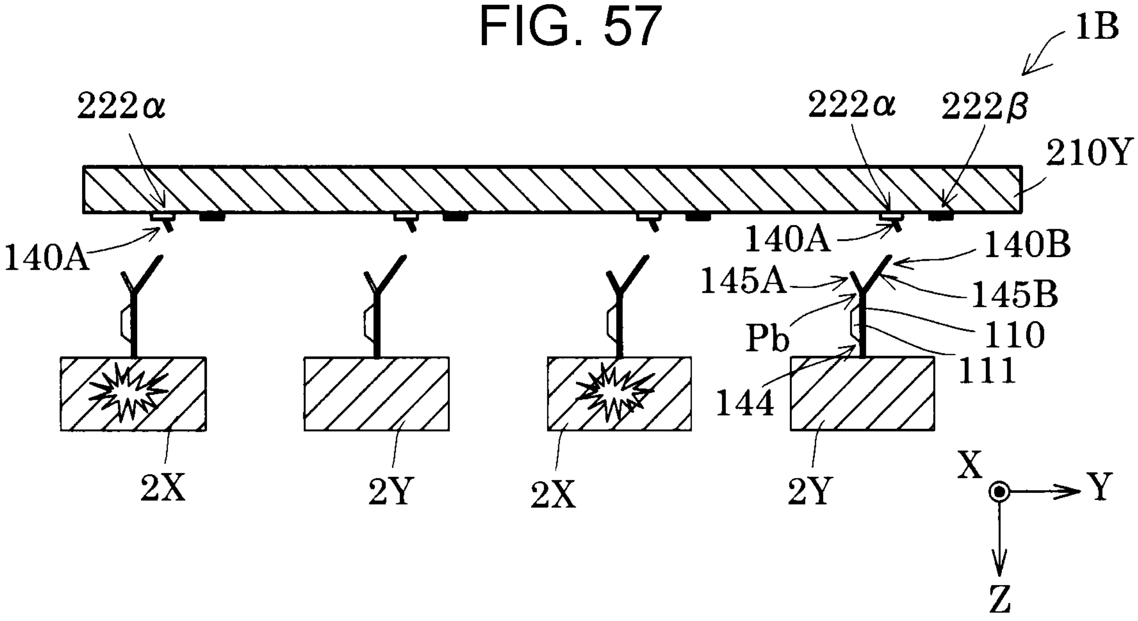
FIG. 57 is a schematic view for describing the manufacturing method of the liquid ejecting head according to the eighth embodiment.
Figure 58:
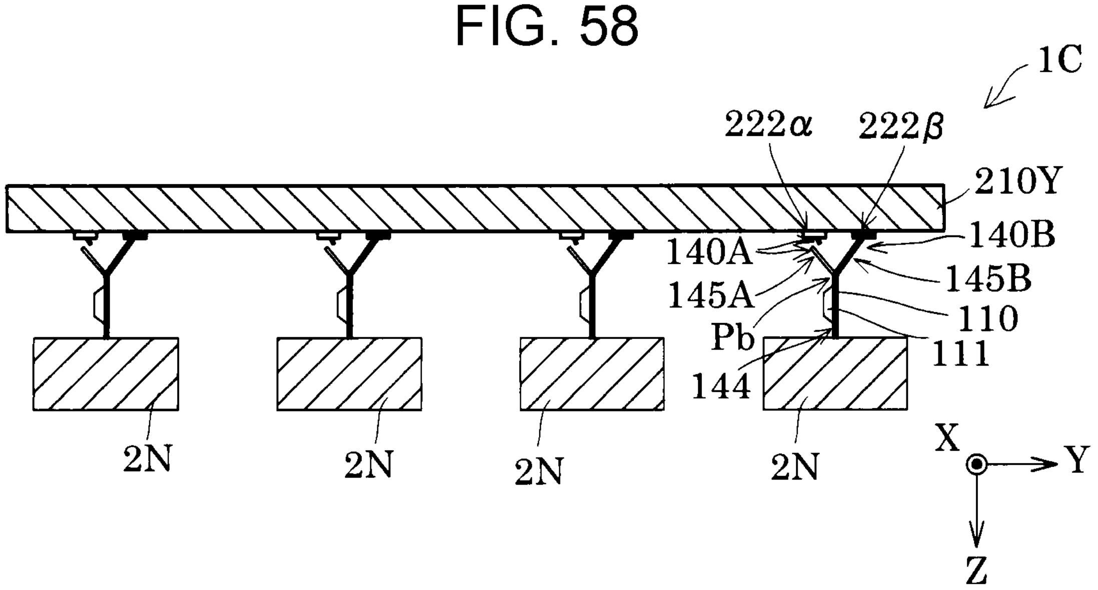
FIG. 58 is a schematic view for describing the manufacturing method of the liquid ejecting head according to the eighth embodiment.

FIGS. 56 to 58 are views schematically illustrating a manufacturing method of a liquid ejecting head 1C according to an eighth embodiment of the present disclosure. The same reference signs will be given to the same members as those in the above-described embodiment, and overlapping description thereof will be omitted. Further, in the present embodiment, a configuration in which a terminal group 222α and a terminal group 222β are provided on a second surface 210*b* of a relay substrate 210 will be described, but the present disclosure is not particularly limited thereto.

In the present embodiment, the failed liquid ejecting head 1 including a component to be reused is referred to as a liquid ejecting head 1B, and a liquid ejecting head 1 manufactured by reusing a portion of the liquid ejecting head 1B is referred to as a liquid ejecting head 1C. In addition, in the present embodiment, the relay substrate 210 of the liquid ejecting head 1B is referred to as a relay substrate 210Y. Further, in the present embodiment, the failed head chip 2 provided in the liquid ejecting head 1B is referred to as a head chip 2X, the head chip 2 provided in the liquid ejecting head 1B is referred to as a head chip 2Y, and a new head chip 2 that are compatible with the head chips 2X and 2Y is referred to as a head chip 2N.

As illustrated in FIGS. 56 to 58, in the present embodiment, the liquid ejecting head 1C is manufactured by reusing a portion of the liquid ejecting head 1B including the head chips 2X and 2Y, and the relay substrate 210Y including a terminal group 222α and a terminal group 222β that are electrical coupling terminals to the head chip 2X and a terminal group 222α and a terminal group 222β that are electrical coupling terminals to the head chip 2Y.

Specifically, a step of reusing the relay substrate 210Y of the liquid ejecting head 1B for the liquid ejecting head 1C is performed.

This step includes a first step of electrically separating the non-failed relay substrate 210Y from the head chips 2X and 2Y in the liquid ejecting head 1B including the failed head chip 2X, the non-failed head chip 2Y, and the non-failed relay substrate 210Y, and a second step of manufacturing the liquid ejecting head 1C by adhering or bonding the relay substrate 210Y separated in the first step to the new head chip 2N.

In the first step, as illustrated in FIG. 57, the failed head chip 2X and the non-failed head chip 2Y of the liquid ejecting head 1B are electrically separated from the non-failed relay substrate 210Y. As in the fifth embodiment described above, the first step may be performed by breaking the adhesion portion or bonding portion between the head chips 2X and 2Y and the terminal group 222α, or may be performed by breaking portions other than the adhesion portion or bonding portion between the head chips 2X and 2Y and the terminal group 222α, that is, by cutting the wiring member 110.

In the second step, as illustrated in FIG. 58, the liquid ejecting head 1C is manufactured by adhering or bonding the relay substrate 210Y separated from the liquid ejecting head 1B to the head chip 2N. In the second step, the terminal group 140B of the head chip 2N is adhered or bonded to the terminal group 222β of the relay substrate 210Y. Since the head chip 2N is a new product, in the second step, the unused terminal group 140A of the head chip 2N may be adhered or bonded to the terminal group 222β of the relay substrate 210Y.

It is possible to manufacture the liquid ejecting head 1C by performing the step including the first step and the second step in this manner to reuse the relay substrate 210Y of the liquid ejecting head 1B having the failed head chip 2.

In the liquid ejecting head 1B, all of the head chips 2 may have failed, in other words, the liquid ejecting head 1B may be configured to include only the head chip 2X.

Although the manufacturing method of the liquid ejecting head 1 according to the first embodiment described above has been described, the manufacturing method in the present embodiment can also be applied to other embodiments.

Ninth Embodiment

Figure 59:
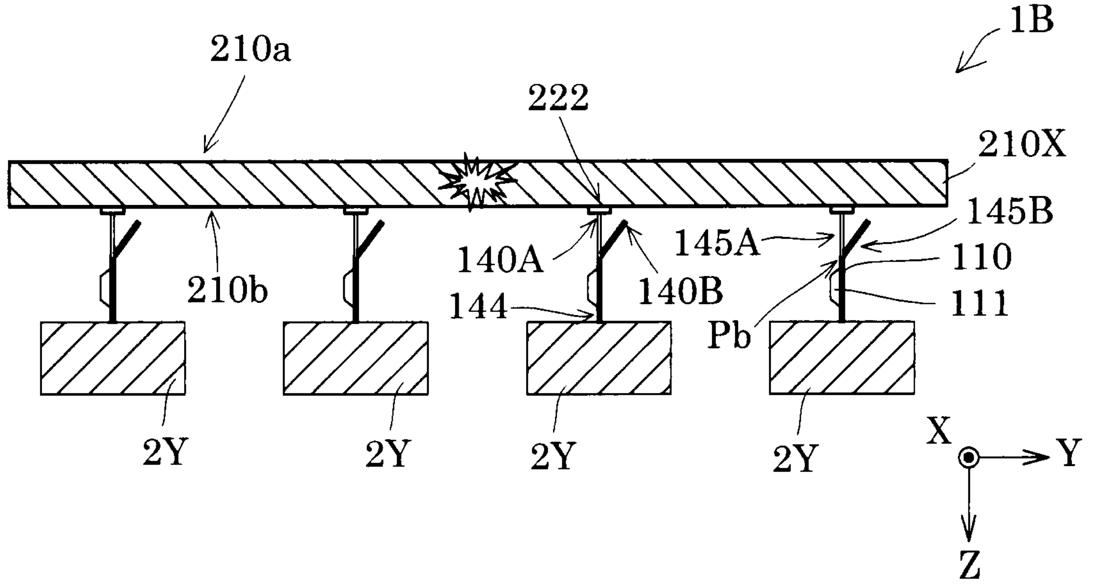
FIG. 59 is a schematic view for describing a manufacturing method of a liquid ejecting head according to a ninth embodiment.
Figure 60:
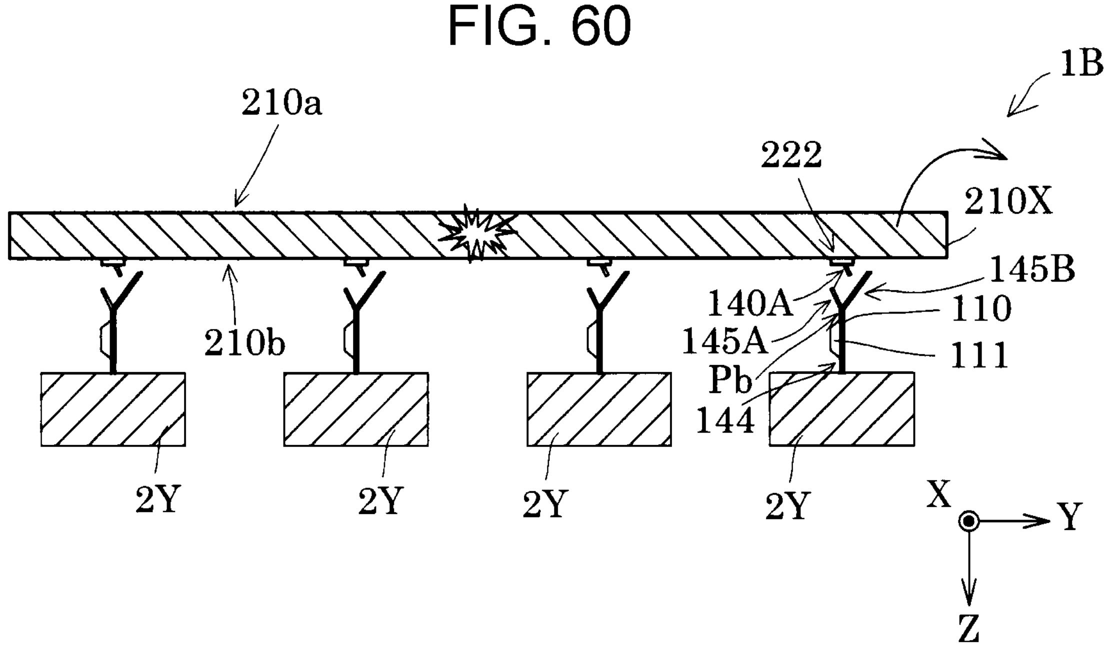
FIG. 60 is a schematic view for describing the manufacturing method of the liquid ejecting head according to the ninth embodiment.
Figure 61:
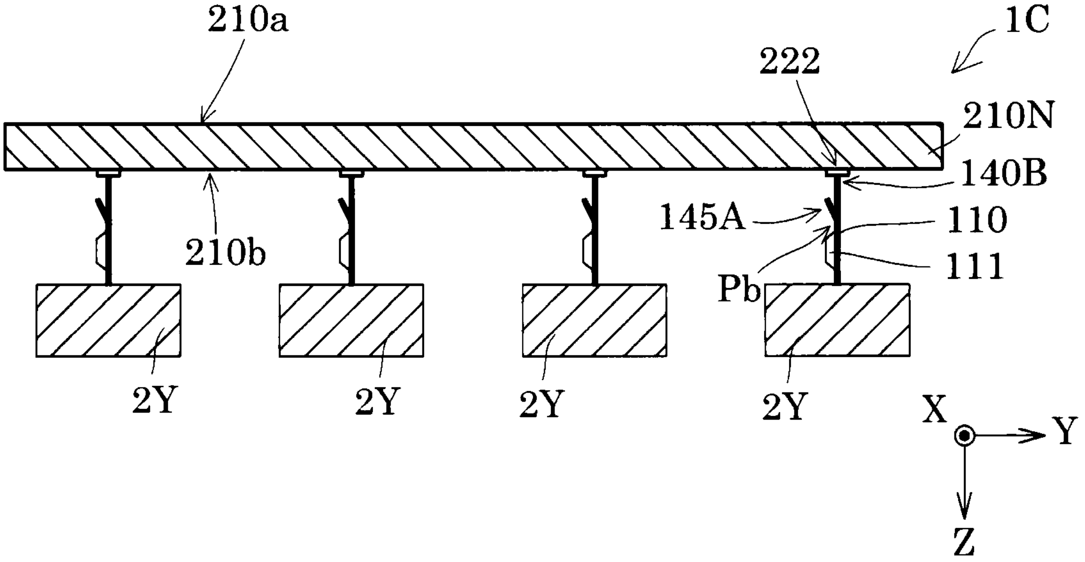
FIG. 61 is a schematic view for describing the manufacturing method of the liquid ejecting head according to the ninth embodiment.

FIGS. 59 to 61 are views schematically illustrating a manufacturing method of a liquid ejecting head 1C according to a ninth embodiment of the present disclosure. The same reference signs will be given to the same members as those in the above-described embodiment, and overlapping description thereof will be omitted. Further, in the present embodiment, a configuration in which a terminal group 222α are provided on a second surface 210*b* of a relay substrate 210 will be described, but the present disclosure is not particularly limited thereto.

In the present embodiment, a liquid ejecting head 1 including a relay substrate 210 and a head chip 2 having a terminal group 140A and a terminal group 140B that are electrical coupling terminals to the relay substrate 210 is regenerated. In the present embodiment, the liquid ejecting head 1 before regeneration, in other words, the failed liquid ejecting head 1 is referred to as a liquid ejecting head 1B, and the liquid ejecting head 1 after the regeneration is referred to as the liquid ejecting head 1C. In addition, in the present embodiment, the failed relay substrate 210 provided in the liquid ejecting head 1B is referred to as a relay substrate 210X, and the relay substrate 210 compatible with the relay substrate 210X is referred to as a relay substrate 210N. Further, in the present embodiment, the non-failed head chip 2 of the liquid ejecting head 1B is referred to as a head chip 2Y.

As illustrated in FIG. 59, the liquid ejecting head 1B includes the relay substrate 210X and the head chip 2Y. The present embodiment is different from the seventh embodiment in that the relay substrate 210X includes one terminal group 222 for one head chip 2Y. That is, the relay substrate 210X in the present embodiment is not provided with a plurality of terminal groups 222 corresponding to one head chip 2Y. Further, the head chip 2Y includes the terminal group 140A and the terminal group 140B that are electrical coupling terminals to the relay substrate 210X. The terminal group 140A and the terminal group 222α of the relay substrate 210X are electrically coupled to each other.

When the relay substrate 210X of the liquid ejecting head 1B has failed, a replacing step of replacing the relay substrate 210X with the relay substrate 210N is performed.

In the replacing step, a first step of electrically separating the relay substrate 210X from the head chip 2Y and a second step of electrically coupling the head chip 2Y separated from the relay substrate 210X and the new relay substrate 210N are performed.

In the first step, as illustrated in FIG. 60, the failed relay substrate 210X and the head chip 2Y are electrically separated from each other. As in the fifth embodiment described above, the first step may be performed by breaking the adhesion portion or bonding portion between the terminal group 140A of the head chip 2Y and the terminal group 222, or may be performed by breaking portions other than the adhesion portion or bonding portion between the terminal group 140A of the head chip 2Y and the terminal group 222, that is, by cutting the wiring member 110. In the present embodiment, the head chip 2Y and the relay substrate 210X are electrically separated from each other by cutting the wiring member 110.

As illustrated in FIG. 61, in the second step, the terminal group 140B of the head chip 2Y separated in the first step is electrically coupled to the terminal group 222 of the relay substrate 210N that is the new relay substrate 210 compatible with the relay substrate 210X. Even when only one terminal group 222 is formed at the relay substrate 210N, since the terminal group 140B is provided in the head chip 2Y, the relay substrate 210N and the head chip 2Y can be adhered or bonded to each other.

It is possible to manufacture the liquid ejecting head 1C by performing the replacing step including the first step and the second step in this manner to regenerate the failed liquid ejecting head 1B.

In the present embodiment, the liquid ejecting head 1C illustrated in FIG. 61 can also be referred to as the liquid ejecting head 1 having the "damaged portion" described in the first modification example of the fifth embodiment described above.

The manufacturing method in the present embodiment can also be applied to other embodiments.

Tenth Embodiment

Figure 62:
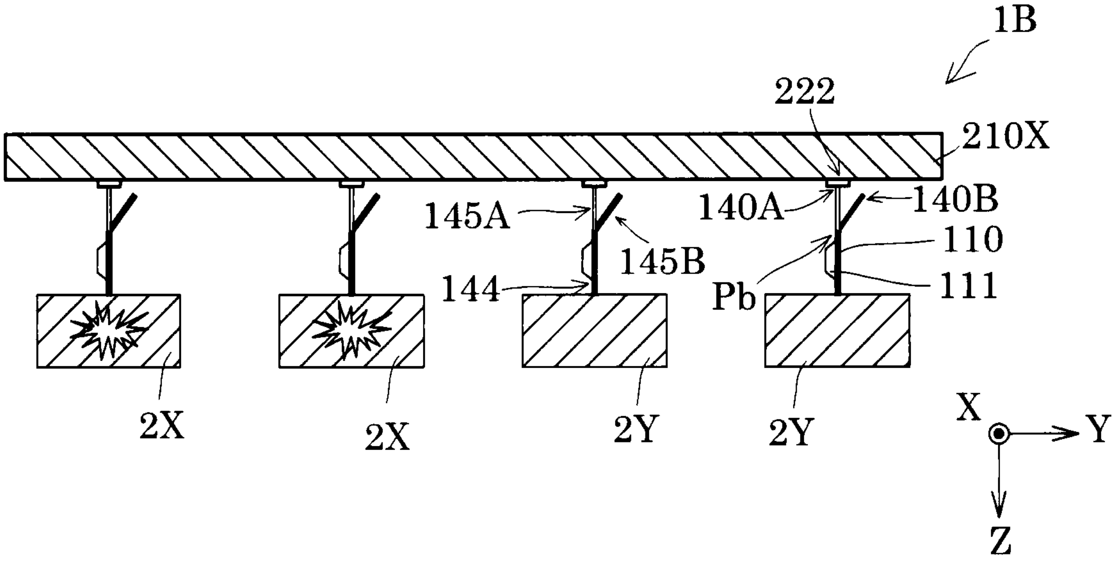
FIG. 62 is a schematic view for describing a manufacturing method of a liquid ejecting head according to a tenth embodiment.
Figure 63:
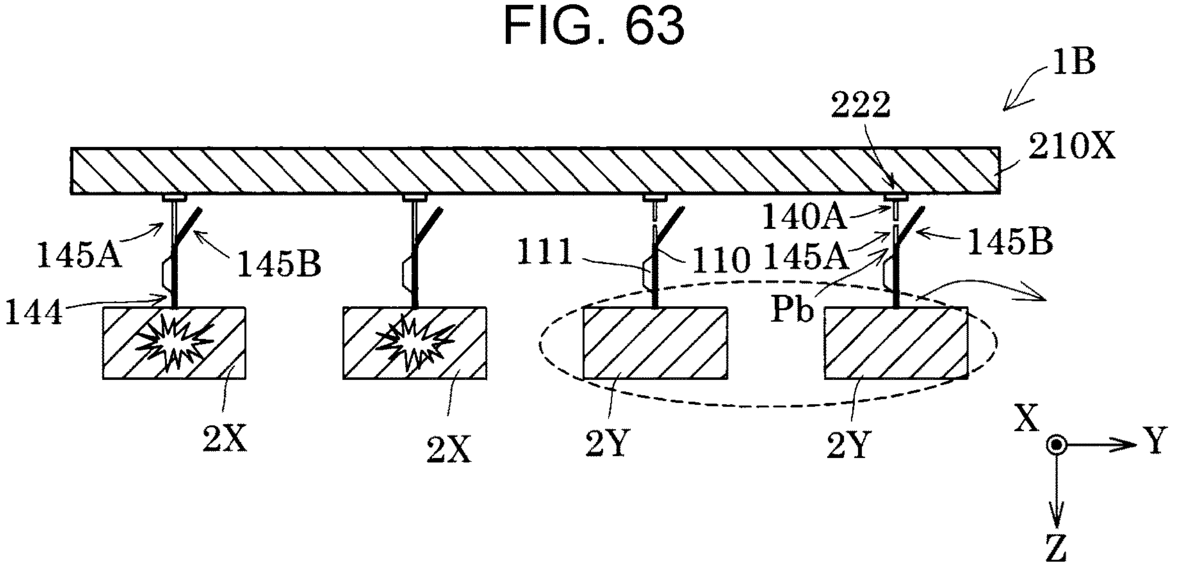
FIG. 63 is a schematic view for describing the manufacturing method of the liquid ejecting head according to the tenth embodiment.
Figure 64:
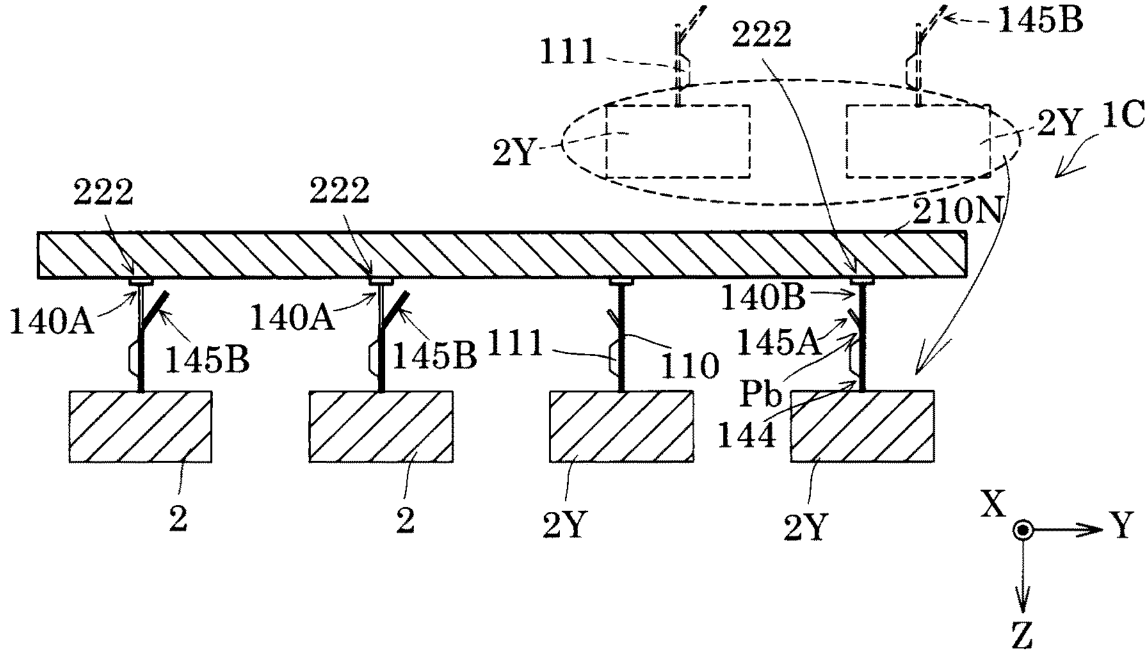
FIG. 64 is a schematic view for describing the manufacturing method of the liquid ejecting head according to the tenth embodiment.

FIGS. 62 to 64 are views schematically illustrating a manufacturing method of a liquid ejecting head 1C according to a tenth embodiment of the present disclosure. The same reference signs will be given to the same members as those in the above-described embodiment, and overlapping description thereof will be omitted. Further, in the present embodiment, a configuration in which a terminal group 222 are provided on a second surface 210*b* of a relay substrate 210 will be described, but the present disclosure is not particularly limited thereto.

In the present embodiment, the failed liquid ejecting head 1 including a component to be reused is referred to as a liquid ejecting head 1B, and a liquid ejecting head 1 manufactured by reusing a portion of the liquid ejecting head 1B is referred to as a liquid ejecting head 1C. In addition, in the present embodiment, regarding a relay substrate 210, the failed relay substrate 210 is referred to as a relay substrate 210X, and a new relay substrate 210 compatible with the relay substrate 210X is referred to as a relay substrate 210N. Further, in the present embodiment, the failed head chip 2 provided in the liquid ejecting head 1B is referred to as a head chip 2X, and a non-failed head chip 2 provided in the liquid ejecting head 1B is referred to as a head chip 2Y.

As illustrated in FIG. 62, the liquid ejecting head 1B includes the relay substrate 210X, and the head chips 2X and 2Y. The present embodiment is different from the sixth embodiment in that the relay substrate 210X includes one terminal group 222 for one head chip 2X and one terminal group 222 for one head chip 2Y. That is, the relay substrate 210X in the present embodiment is not provided with a plurality of terminal groups 222 corresponding to one head chip 2X, and is not provided with a plurality of terminal groups 222 corresponding to one head chip 2Y. In addition, each of the head chip 2Y and the head chip 2X has the terminal group 140A and the terminal group 140B that are electrical coupling terminals to the relay substrate 210X, and the terminal group 140A of each of the head chip 2Y and the head chip 2X is electrically coupled to the terminal group 222 of the relay substrate 210X.

As illustrated in FIGS. 62 to 64, in the present embodiment, the liquid ejecting head 1C is manufactured by reusing a portion of the liquid ejecting head 1B including the relay substrate 210X and the head chip 2 having a terminal group 140A and a terminal group 140B that are electrical coupling terminals to the relay substrate 210X.

In the manufacturing method of the present embodiment, a step of reusing the non-failed head chip 2Y of the liquid ejecting head 1B for the liquid ejecting head 1C is performed.

This step includes a first step of electrically separating the relay substrate 210X from the non-failed head chip 2Y in the liquid ejecting head 1B, and a second step of electrically coupling the non-failed head chip 2Y separated in the first step to the relay substrate 210N of the liquid ejecting head 1C.

As illustrated in FIG. 62, the terminal group 140A of the head chip 2Y is electrically coupled to a terminal group 222 of the relay substrate 210X. Therefore, in the first step, as illustrated in FIG. 63, the relay substrate 210X of the liquid ejecting head 1B and the non-failed head chip 2Y are electrically separated from each other. As in the sixth embodiment described above, the first step may be performed by breaking the adhesion portion or the bonding portion between the terminal group 140A of the head chip 2Y and the terminal group 222 of the relay substrate 210X, or may be performed by breaking portions other than the adhesion portion or the bonding portion between the terminal group 140A of the head chip 2Y and the terminal group 222 of the relay substrate 210X, that is, by cutting the wiring member 110. In the present embodiment, the head chip 2Y and the relay substrate 210X are electrically separated from each other by cutting the wiring member 110.

As illustrated in FIGS. 63 and 64, in the second step, the liquid ejecting head 1C is manufactured by adhering or bonding the terminal group 140B of the head chip 2Y separated from the liquid ejecting head 1B to the terminal group 222 of the relay substrate 210N. In addition, in the second step, the terminal group 140A or the terminal group 150B of a new head chip 2 or the used head chip 2 separated from another liquid ejecting head 1 is adhered or bonded to the relay substrate 210N.

It is possible to manufacture the liquid ejecting head 1C by performing the step including the first step and the second step in this manner to reuse the head chip 2Y of the failed liquid ejecting head 1B.

In the present embodiment, the liquid ejecting head 1C illustrated in FIG. 64 can also be referred to as the liquid ejecting head 1 having the damaged portion described in the first modification example of the sixth embodiment described above.

The manufacturing method in the present embodiment can also be applied to other embodiments.

Eleventh Embodiment

Figure 65:
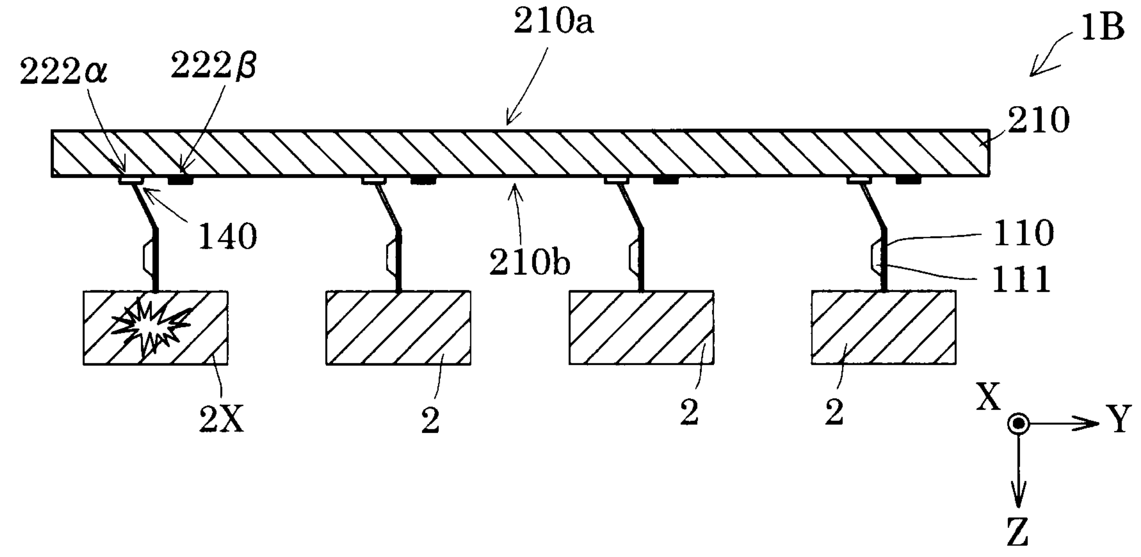
FIG. 65 is a schematic view for describing a manufacturing method of a liquid ejecting head according to an eleventh embodiment.
Figure 66:
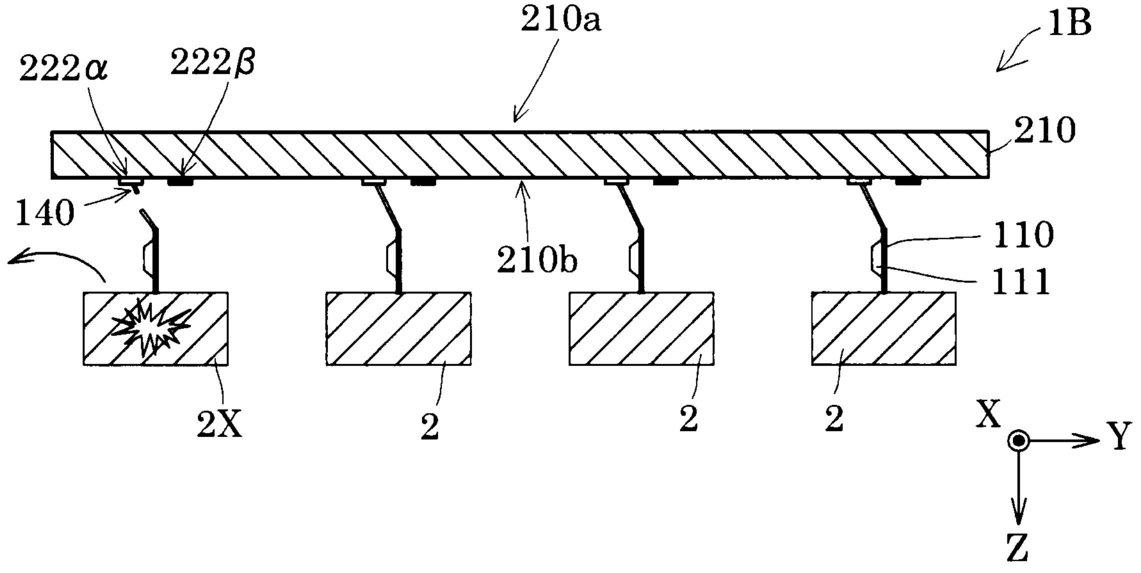
FIG. 66 is a schematic view for describing the manufacturing method of the liquid ejecting head according to the eleventh embodiment.
Figure 67:
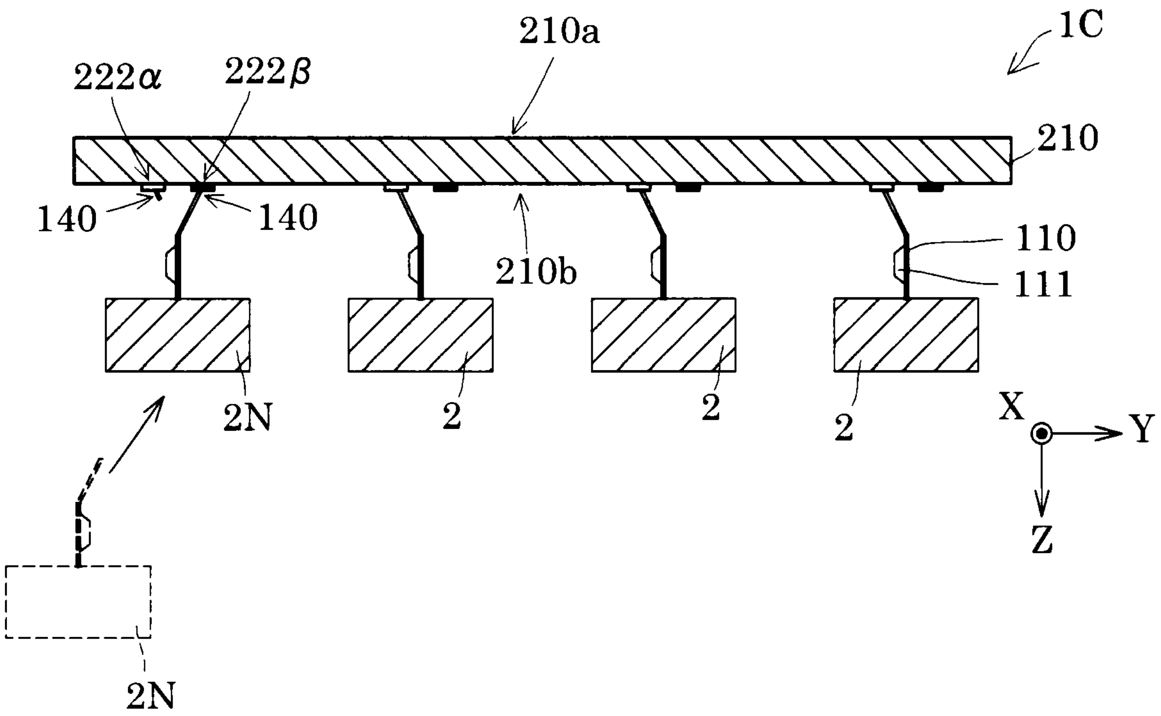
FIG. 67 is a schematic view for describing the manufacturing method of the liquid ejecting head according to the eleventh embodiment.

FIGS. 65 to 67 are views schematically illustrating a manufacturing method of a liquid ejecting head 1C according to an eleventh embodiment of the present disclosure. The same reference signs will be given to the same members as those in the above-described embodiment, and overlapping description thereof will be omitted. Further, in the present embodiment, a configuration in which a terminal group 222α and a terminal group 222β are provided on a second surface 210*b* of a relay substrate 210 will be described, but the present disclosure is not particularly limited thereto.

In the present embodiment, a liquid ejecting head 1 including a head chip 2 and the relay substrate 210 having the terminal group 222α and the terminal group 222β that are electrical coupling terminals to the head chip 2 is regenerated. In the present embodiment, the liquid ejecting head 1 before regeneration, in other words, the failed liquid ejecting head 1 is referred to as a liquid ejecting head 1B, and the liquid ejecting head 1 after the regeneration is referred to as the liquid ejecting head 1C. Further, in the present embodiment, the failed head chip 2 provided in the liquid ejecting head 1B is referred to as a head chip 2X, and a new head chip 2 compatible with the head chip 2X is referred to as a head chip 2N.

As illustrated in FIG. 65, the liquid ejecting head 1B includes the relay substrate 210 and the head chip 2. The relay substrate 210 includes the terminal group 222α and the terminal group 222β that are electrical coupling terminals to the head chip 2. Further, the present embodiment is different from the fifth embodiment only in that one head chip 2 includes only one terminal group 140 that is an electrical coupling terminal to the relay substrate 210. In the liquid ejecting head 1B, the terminal group 140 of the head chip 2 is electrically coupled to the terminal group 222α of the relay substrate 210. That is, the head chip 2 in the present embodiment is not provided with a plurality of terminal groups 222 corresponding to one head chip 2.

A replacing step of replacing the failed head chip 2X among the plurality of head chips 2 of such a liquid ejecting head 1B with a head chip 2N compatible with the head chip 2X is performed.

In the replacing step, a first step of electrically separating the relay substrate 210 from the head chip 2X and a second step of electrically coupling the relay substrate 210 and the head chip 2N are performed.

In the first step, as illustrated in FIG. 66, the relay substrate 210 of the liquid ejecting head 1B is electrically separated from the failed head chip 2X. As in the fifth embodiment described above, the first step may be performed by breaking the adhesion portion or the bonding portion between the terminal group 140 of the head chip 2X and the terminal group 222α of the relay substrate 210, or may be performed by breaking portions other than the adhesion portion or the bonding portion between the terminal group 140 of the head chip 2X and the terminal group 222α of the relay substrate 210, that is, by cutting the wiring member 110. In the present embodiment, the head chip 2X and the relay substrate 210 are electrically separated from each other by cutting the wiring member 110.

In the second step, the terminal group 222β of the relay substrate 210 is electrically coupled to the terminal group 140 of the head chip 2N compatible with the head chip 2X.

It is possible to manufacture the liquid ejecting head 1C by performing the replacing step including the first step and the second step in this manner to regenerate the liquid ejecting head 1B.

In the present embodiment, the liquid ejecting head 1C illustrated in FIG. 67 can also be referred to as the liquid ejecting head 1 having the "damaged portion" described in the fifth embodiment described above.

The manufacturing method in the present embodiment can also be applied to other embodiments.

Other Embodiments

Although the embodiments and the modification examples of the present disclosure has been described above, the basic configuration of the present disclosure is not limited to the above-described one.

For example, in the embodiments and the modification examples described above, the configuration in which one liquid ejecting head 1 is provided with four head chips 2 has been described, but the present disclosure is not particularly limited thereto. The number of head chips 2 provided in one liquid ejecting head 1 may be one, or may be plural number that is equal to or more than two other than four.

For example, in the replacing step of the embodiments and the modification examples described above, the failed head chip 2 or the failed relay substrate 210 is set as a replacement target. From the use history, the print inspection, and the like, the head chip 2 or relay substrate 210 that does not fail and has a short life may be set as the replacement target.

In addition, in the embodiments and the modification examples described above, the "driving element" that causes the pressure change in the pressure chamber 12 has been described by using the thin-film type piezoelectric actuator 300. The present disclosure is not particularly limited thereto. As the "driving element", for example, a thick-film type piezoelectric actuator formed by a method such as sticking a green sheet can be used. In addition, as the "driving element", a longitudinal vibration type piezoelectric actuator in which a piezoelectric material and an electrode forming material are alternately stacked and expanded and contracted in an axial direction can be used. In addition, as the "driving element", for example, an element in which a heat generating element is disposed in the pressure chamber to eject the droplets from the nozzle by bubbles generated due to the heat of the heat generating element, or a so-called electrostatic actuator that generates static electricity between a diaphragm and an electrode, deforms the diaphragm by the electrostatic force, and ejects the droplets from the nozzle can be used.

Figure 68:
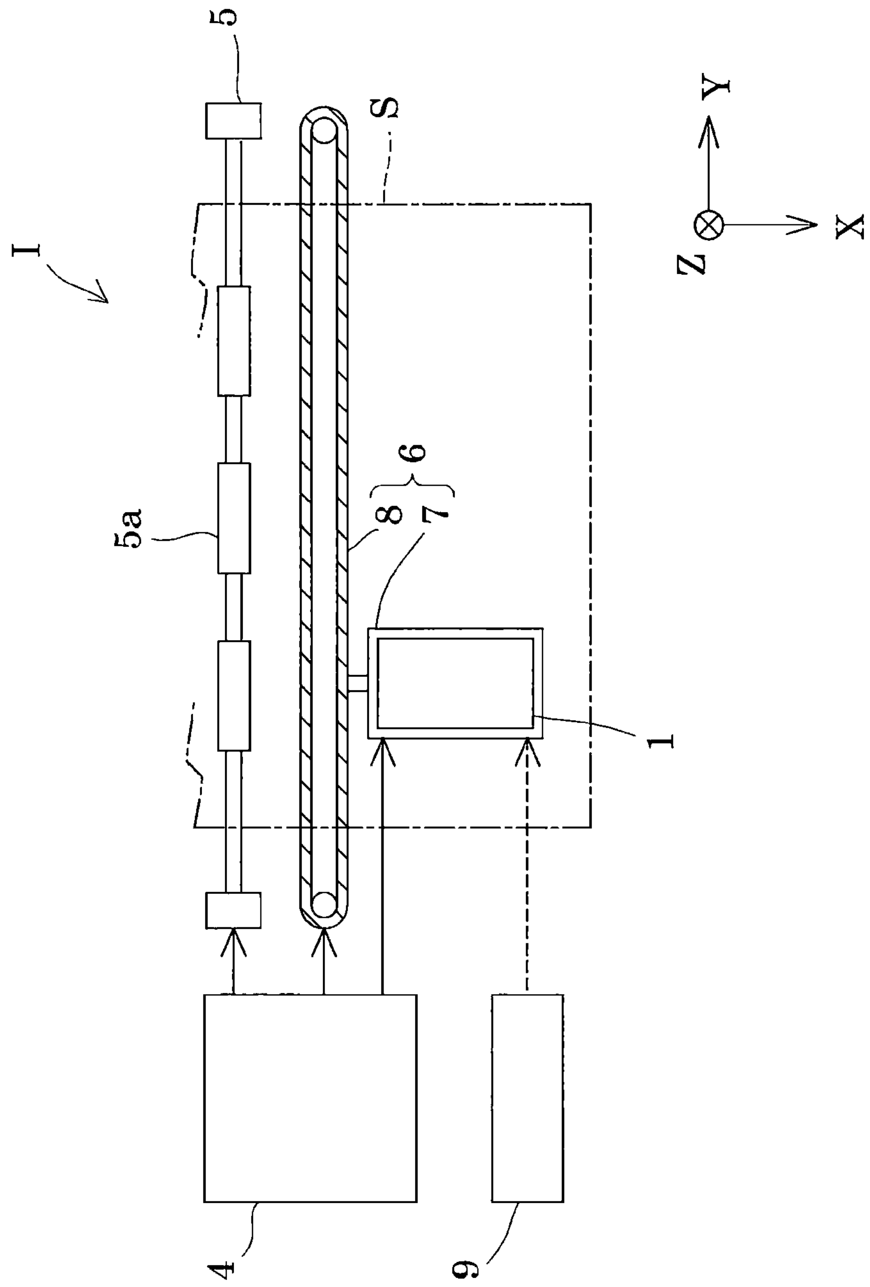
FIG. 68 is a view illustrating a schematic configuration of a liquid ejecting apparatus according to an embodiment.

Further, the liquid ejecting head 1 in the embodiments and the modification examples is mounted on a liquid ejecting apparatus I. FIG. 68 is a view illustrating a schematic configuration of the liquid ejecting apparatus I according to another embodiment.

As illustrated in FIG. 68, the liquid ejecting apparatus I is an ink jet recording apparatus that causes ink, which is a type of liquid, to be ejected and land on a printing medium S, and prints an image or the like based on an arrangement of dots formed on the medium S. As the medium S, any material such as a resin film or cloth can be used in addition to the recording paper.

The liquid ejecting apparatus I includes a liquid ejecting head 1, a liquid storage section 9, a control unit 4 that is a controller, a transport mechanism 5 that feeds out a medium S, and a moving mechanism 6.

The liquid ejecting head 1 ejects an ink supplied from the liquid storage section 9 that stores the ink as ink droplets in the +Z direction.

The liquid storage section 9 individually stores a plurality of types, for example, a plurality of colors of ink ejected from the liquid ejecting head 1. Examples of the liquid storage section 9 include a cartridge that can be attached to and detached from the liquid ejecting apparatus I, a bag-shaped ink pack formed of a flexible film, an ink tank that can be refilled with ink, and the like. In addition, for example, a plurality of types of inks having different colors, components, and the like are stored in the liquid storage section 9. Further, the liquid storage section 9 may be divided into a main tank and a sub tank. The sub tank may be coupled to the liquid ejecting head 1, and the sub tank is refilled with the ink consumed by ejecting the ink droplets from the liquid ejecting head 1 from the main tank.

The control unit 4 includes a control device such as a central processing unit (CPU) or a field programmable gate array (FPGA), and a storage device such as a semiconductor memory. The control unit 4 also includes a power supply device that supplies power supplied from an external power supply such as a commercial power supply to each element of the liquid ejecting apparatus I. The control unit 4 is electrically coupled to the relay substrate 210 via an external wiring (not illustrated) electrically coupled to the connector 211 of the relay substrate 210. The control unit 4 totally controls each element of the liquid ejecting apparatus I, that is, the liquid ejecting head 1, the transport mechanism 5, the moving mechanism 6, and the like by executing the program stored in the storage device by the control device.

The transport mechanism 5 transports the medium S in the X-axis direction, and has a transport roller 5*a*. That is, the transport mechanism 5 transports the medium S in the X-axis direction by rotating the transport roller 5*a*. The transport roller 5*a* is rotated by driving a transport motor (not illustrated). The control unit 4 controls the transport of the medium S by controlling the drive of the medium transport motor. The transport mechanism 5 that transports the medium S is not limited to the one including the transport roller 5*a*, and may transport the medium S by a belt or a drum.

The moving mechanism 6 is a mechanism for reciprocating the liquid ejecting head 1 in the Y-axis direction, and includes a support member 7 and a transport belt 8. The support member 7 is a so-called carriage that supports the liquid ejecting head 1, and is fixed to the transport belt 8. The transport belt 8 is an endless belt erected along the Y-axis direction. The transport belt 8 is rotated by driving a transport motor (not illustrated). The control unit 4 rotates the transport belt 8 by controlling the drive of the transport motor to reciprocate the liquid ejecting head 1 together with the support member 7 in the Y-axis direction. The support member 7 may be configured to mount the liquid storage section 9 together with the liquid ejecting head 1.

Under the control of the control unit 4, the liquid ejecting head 1 performs an ejection operation of ejecting the ink supplied from the liquid storage section 9 in the +Z direction as ink droplets from each of a plurality of nozzles 21. The ejection operation by the liquid ejecting head 1 is performed in parallel with the transporting of the medium S by the transport mechanism 5 and the reciprocating movement of the liquid ejecting head 1 by the moving mechanism 6, so that so-called printing is performed in which an image is formed on the surface of the medium S using ink.

In the liquid ejecting apparatus I described above, the configuration in which the liquid ejecting head 1 is mounted on the support member 7 and moves in the Y-axis direction that is a main scanning direction has been described, but the present disclosure is not particularly limited thereto. For example, the present disclosure can be applied to a so-called line type recording apparatus in which the liquid ejecting head 1 is fixed to a housing and the printing is performed by only moving the medium S in a sub-scanning direction.

Further, the present disclosure is intended for a wide range of liquid ejecting apparatuses including liquid ejecting heads. Examples of the liquid ejecting head include recording heads such as various ink jet recording heads used in an image recording apparatus such as a printer, and coloring material ejecting heads used for manufacturing color filters in liquid crystal displays and the like. Examples of the liquid ejecting head include an electrode material ejecting head used for forming an electrode in an organic EL display, a field emission display (FED), and the like, and a bioorganic substance ejecting head used for manufacturing a biochip. The present disclosure can also be applied to a liquid ejecting apparatus including the liquid ejecting head.

In addition, although the ink jet recording apparatus has been described as an example of the liquid ejecting apparatus, the present disclosure can also be used for a liquid ejecting apparatus using the other liquid ejecting head described above.

Supplementary Notes

From the embodiments exemplified above, for example, the following configuration can be grasped.

According to Aspect 1 that is a preferred aspect, a liquid ejecting head 1 includes a first head chip that includes a first wiring member having flexibility and ejects a liquid, and a relay substrate that includes a first terminal group α and is electrically coupled to the first wiring member, in which the first wiring member includes a first terminal group A that is adhered or bonded to the first terminal group α of the relay substrate, and a first terminal group B that is not adhered or bonded to the relay substrate, and the first terminal group A is compatible with the first terminal group B.

In Aspect 2 that is a specific example of Aspect 1, the first wiring member includes a body portion, a first end portion, and a second end portion, the first end portion includes the first terminal group A, the second end portion includes the first terminal group B, and the body portion includes a common wiring group that is wired in common to the first terminal group A and the first terminal group B.

In Aspect 3 that is a specific example of Aspect 2, the first end portion includes an individual wiring group A wired to the first terminal group A, the second end portion includes an individual wiring group B wired to the first terminal group B, and the common wiring group is wired in common to the individual wiring group A and the individual wiring group B.

In Aspect 4 that is a specific example of Aspect 2, the first end portion includes a first fragile portion located between the body portion and the first terminal group A.

In Aspect 5 that is a specific example of Aspect 4, the first fragile portion is a perforated line formed at the first end portion.

In Aspect 6 that is a specific example of Aspect 4, the first fragile portion is closer to the body portion than is the first terminal group A.

In Aspect 7 that is a specific example of Aspect 4, the first fragile portion is closer to the first terminal group A than is the body portion.

In Aspect 8 that is a specific example of Aspect 6, the first wiring member further includes a second fragile portion located between the body portion and the first terminal group A, and the second fragile portion is closer to the first terminal group A than is the body portion. With this configuration, by cutting the first end portion at a position close to the body portion by the first fragile portion, it is possible to shorten the unnecessary first end portion remaining on the wiring member.

In Aspect 9 that is a specific example of Aspect 1, the relay substrate includes a first terminal group β that is not adhered or bonded to the first wiring member, and the first terminal group α is compatible with the first terminal group β.

In Aspect 10 that is a specific example of Aspect 9, the relay substrate includes a first surface and a second surface on an opposite side of the first surface, the first terminal group α is disposed on the first surface, and the first terminal group β is disposed on the second surface.

In Aspect 11 that is a specific example of Aspect 10, the first terminal group α overlaps the first terminal group β when viewed in a thickness direction of the relay substrate.

In Aspect 12 that is a specific example of Aspect 11, the first terminal group α and the first terminal group β are wired via a through-hole that penetrates the relay substrate in the thickness direction.

In Aspect 13 that is a specific example of Aspect 9, each of the first terminal group α and the first terminal group β is configured by arranging a plurality of terminals in a first direction, an opening through which the first wiring member is inserted is formed in the relay substrate, and the first terminal group α and the first terminal group β are disposed on the same surface of the relay substrate so as to interpose the opening in a second direction intersecting the first direction.

In Aspect 14 that is a specific example of Aspect 13, the first terminal group α and the first terminal group β are disposed substantially point-symmetrically to interpose the opening.

In Aspect 15 that is a specific example of Aspect 9, each of the first terminal group α and the first terminal group β is configured by arranging a plurality of terminals in a first direction, the relay substrate includes a first surface, a second surface on an opposite side of the first surface, a first opening that penetrates the second surface from the first surface, and a second opening that penetrates the second surface from the first surface, and the first terminal group α and the first terminal group β are arranged between the first opening and the second opening in a second direction intersecting the first direction on the same surface of the relay substrate.

In Aspect 16 that is a specific example of Aspect 9, each of the first terminal group α and the first terminal group β is configured by arranging a plurality of terminals in a first direction, and the first terminal group α and the first terminal group β are arranged in the first direction on the same surface of the relay substrate.

In Aspect 17 that is a specific example of Aspect 2, a length from the body portion to the first terminal group A is different from a length from the body portion to the first terminal group B.

In Aspect 18 that is a specific example of Aspect 2, the first head chip includes a plurality of driving elements that drive for ejecting a liquid, the first wiring member includes a drive signal selection circuit including a plurality of switching elements for selecting whether or not to drive each of the plurality of driving elements, and a portion of the common wiring group is located between the drive signal selection circuit, and the first terminal group A and the first terminal group B.

In Aspect 19 that is a specific example of Aspect 1, the liquid ejecting head further includes a second head chip that includes a second wiring member having flexibility and ejects a liquid, in which the second wiring member includes a second terminal group A that is adhered or bonded to the relay substrate, and a second terminal group B that is not adhered or bonded to the relay substrate, the relay substrate includes a first terminal group β that is not adhered or bonded to the first wiring member, a second terminal group α that is adhered or bonded to the second terminal group A, and a second terminal group β that is not adhered or bonded to the second wiring member, the first terminal group α is compatible with the first terminal group β, the second terminal group α is compatible with the second terminal group β, and the first terminal group A, the first terminal group B, the second terminal group A, and the second terminal group B are compatible with each other.

In Aspect 20 that is a specific example of Aspect 1, the first wiring member further includes a first terminal group C that is not adhered or bonded to the relay substrate, and the first terminal group A, the first terminal group B, and the first terminal group C are compatible with each other.

According to Aspect 21 that is a preferred aspect, a liquid ejecting head includes a first head chip that includes a first wiring member having flexibility and ejects a liquid, and a relay substrate electrically coupled to the first wiring member, in which the relay substrate includes a first terminal group α that is adhered or bonded to the first wiring member, and a first terminal group β that is not adhered or bonded to the first wiring member, and the first terminal group α and the first terminal group β are compatible with each other.

According to Aspect 22 that is a preferred aspect, a head chip includes a nozzle plate that includes a plurality of nozzles ejecting a liquid, a common wiring group, and a plurality of terminal groups that are wired in common to the common wiring group and are compatible with each other.

What is claimed is:

1. A liquid ejecting head comprising:
a first head chip including a first wiring member having flexibility and configured to eject a liquid; and
a relay substrate that includes a first terminal group α and is electrically coupled to the first wiring member, wherein
the first wiring member includes
a first terminal group A that is adhered or bonded to the first terminal group α of the relay substrate, and
a first terminal group B that is not adhered or bonded to the relay substrate, and
the first terminal group A is compatible with the first terminal group B.

2. The liquid ejecting head according to claim 1, wherein
the first wiring member includes a body portion, a first end portion, and a second end portion,
the first end portion includes the first terminal group A,
the second end portion includes the first terminal group B, and
the body portion includes a common wiring group that is wired in common to the first terminal group A and the first terminal group B.

3. The liquid ejecting head according to claim 2, wherein
the first end portion includes an individual wiring group A wired to the first terminal group A,
the second end portion includes an individual wiring group B wired to the first terminal group B, and
the common wiring group is wired in common to the individual wiring group A and the individual wiring group B.

4. The liquid ejecting head according to claim 2, wherein
the first end portion includes a first fragile portion located between the body portion and the first terminal group A.

5. The liquid ejecting head according to claim 4, wherein
the first fragile portion is a perforated line formed at the first end portion.

6. The liquid ejecting head according to claim 4, wherein
the first fragile portion is closer to the body portion than is the first terminal group A.

7. The liquid ejecting head according to claim 4, wherein
the first fragile portion is closer to the first terminal group A than is the body portion.

8. The liquid ejecting head according to claim 2, wherein
a length from the body portion to the first terminal group A is different from a length from the body portion to the first terminal group B.

9. The liquid ejecting head according to claim 2, wherein
the first head chip includes a plurality of driving elements that drive for ejecting a liquid,
the first wiring member includes a drive signal selection circuit including a plurality of switching elements for selecting whether or not to drive each of the plurality of driving elements, and
a portion of the common wiring group is located between the drive signal selection circuit, and the first terminal group A and the first terminal group B.

10. The liquid ejecting head according to claim 1, wherein
the relay substrate includes a first terminal group β that is not adhered or bonded to the first wiring member, and
the first terminal group α is compatible with the first terminal group β.

11. The liquid ejecting head according to claim 10, wherein
the relay substrate includes a first surface and a second surface on an opposite side of the first surface,
the first terminal group α is disposed on the first surface, and
the first terminal group β is disposed on the second surface.

12. The liquid ejecting head according to claim 11, wherein
the first terminal group α overlaps the first terminal group β when viewed in a thickness direction of the relay substrate.

13. The liquid ejecting head according to claim 12, wherein
the first terminal group α and the first terminal group β are wired via a through-hole that penetrates the relay substrate in the thickness direction.

14. The liquid ejecting head according to claim 10, wherein
each of the first terminal group α and the first terminal group β is configured by arranging a plurality of terminals in a first direction,
an opening through which the first wiring member is inserted is formed in the relay substrate, and
the first terminal group α and the first terminal group β are disposed on the same surface of the relay substrate to interpose the opening in a second direction intersecting the first direction.

15. The liquid ejecting head according to claim 14, wherein
the first terminal group α and the first terminal group β are disposed substantially point-symmetrically to interpose the opening.

16. The liquid ejecting head according to claim 10, wherein
each of the first terminal group α and the first terminal group β is configured by arranging a plurality of terminals in a first direction, and
the first terminal group α and the first terminal group β are arranged in the first direction on the same surface of the relay substrate.

17. The liquid ejecting head according to claim 1, further comprising:
a second head chip including a second wiring member having flexibility and configured to eject a liquid, wherein
the second wiring member includes
a second terminal group A that is adhered or bonded to the relay substrate, and
a second terminal group B that is not adhered or bonded to the relay substrate,
the relay substrate includes
a first terminal group β that is not adhered or bonded to the first wiring member,
a second terminal group α that is adhered or bonded to the second terminal group A, and
a second terminal group β that is not adhered or bonded to the second wiring member,
the first terminal group α is compatible with the first terminal group β,
the second terminal group α is compatible with the second terminal group β, and
the first terminal group A, the first terminal group B, the second terminal group A, and the second terminal group B are compatible with each other.

18. The liquid ejecting head according to claim 1, wherein
the first wiring member further includes a first terminal group C that is not adhered or bonded to the relay substrate, and the first terminal group A, the first terminal group B, and the first terminal group C are compatible with each other.

* * * * *